United States Patent

Van Bemmel et al.

[19]

[11] Patent Number: 6,151,555
[45] Date of Patent: Nov. 21, 2000

[54] SEISMIC SIGNAL PROCESSING METHOD AND APPARATUS FOR GENERATING A CUBE OF VARIANCE VALUES

[75] Inventors: Peter P. Van Bemmel, Houston; Randolph E. F. Pepper, Sugar Land, both of Tex.

[73] Assignee: Schlumberger Technology Corporation, Houston, Tex.

[21] Appl. No.: 09/377,573

[22] Filed: Aug. 19, 1999

Related U.S. Application Data

[60] Provisional application No. 60/123,412, Mar. 9, 1999.

[51] Int. Cl.[7] ................................................. G01V 1/28
[52] U.S. Cl. ............................................. 702/14; 702/16
[58] Field of Search .................................. 702/14, 6, 16; 367/70, 72, 68

[56] References Cited

U.S. PATENT DOCUMENTS

| | | | |
|---|---|---|---|
| 4,799,200 | 1/1989 | Cheung | 367/30 |
| 5,245,587 | 9/1993 | Hutson | 367/100 |
| 5,563,949 | 10/1996 | Bahorich et al. | 364/421 |
| 5,870,691 | 2/1999 | Partyka et al. | 702/16 |
| 5,920,828 | 7/1999 | Norris et al. | 702/14 |
| 5,940,778 | 10/1999 | Marfurt et al. | 702/16 |
| 5,995,907 | 11/1999 | Van Bemmel et al. | 702/16 |

OTHER PUBLICATIONS

A software product called "AutoPix" publically released on Sep. 23, 1990.
Article by Phillip S. Schlutz and August Lau, "Poststack estimation of three dimensional crossline statics" appearing in "Geophysics", vol. 49, No. 3, Mar. 1984, pp. 227–236.
A software product called "ASSESS" publically released in 1982.

*Primary Examiner*—Christine K. Oda
*Assistant Examiner*—Victor J. Taylor
*Attorney, Agent, or Firm*—John H. Bouchard

[57] ABSTRACT

A workstation computer system, and its associated method and program storage device, stores a novel software package known as "Variance Cube". The computer system is responsive to a plurality of seismic signals propagating through a cubic volume of an earth formation for generating a cube, representing said cubic volume of earth, where the cube includes a plurality of seismic data samples and where each seismic data sample has a corresponding "variance value" assigned thereto. The computer system also generates one or more maps, such as a time slice map, representing one or more slices through the cube. Each map displays and is used to determine certain geologic features which exist along the corresponding slice through the cube, each map including a plurality of the variance values representing the geologic features, each such variance value being defined as the degree to which an amplitude of each seismic data sample in the cube at a particular reflection time "t" varies about an average amplitude. When the Variance Cube software is executed, the method of this invention determines the plurality of variance values by: dividing the cube into a plurality of slices, dividing each slice into a plurality of cells, calculating an average of the amplitudes of a plurality of seismic data samples in each cell on the slice, subtracting that average from each amplitude of each seismic data sample in each cell thereby producing a plurality of differences, summing the squares of the plurality of differences thereby producing a numerator, summing the squares of the plurality of amplitudes of the plurality of seismic data samples in each cell thereby producing a denominator, dividing the numerator by the denominator to thereby produce an approximate variance value which is assigned to a center seismic data sample in each cell on the time slice.

31 Claims, 24 Drawing Sheets

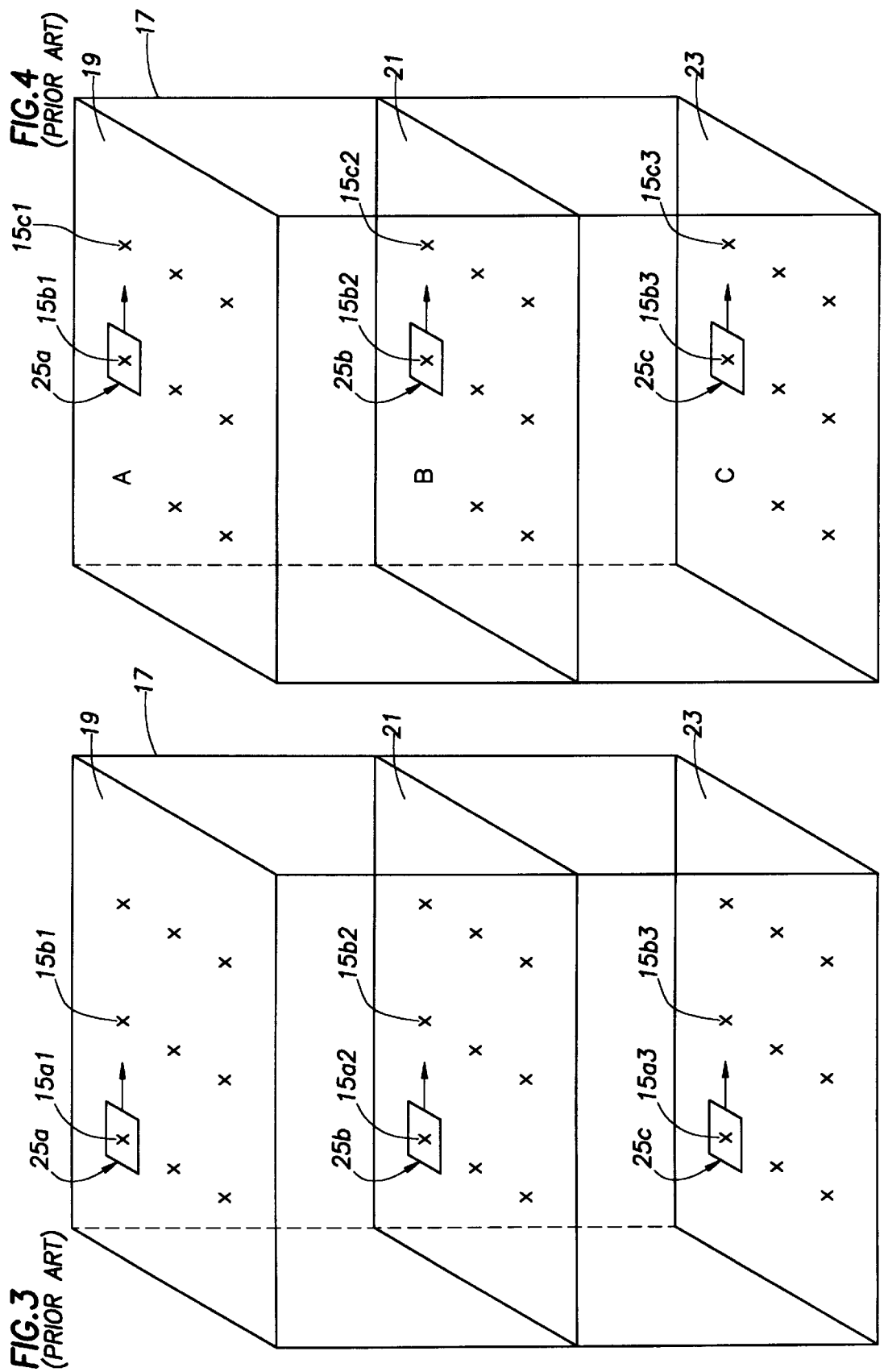

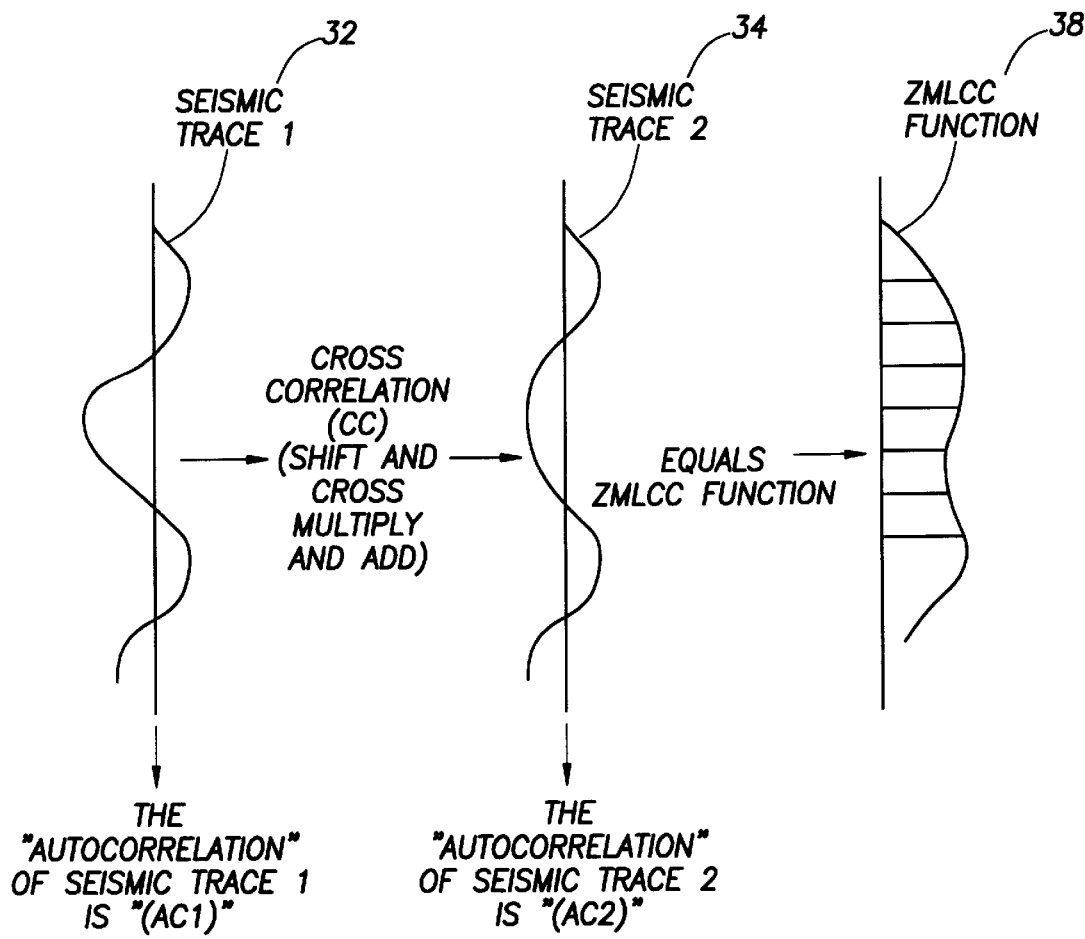
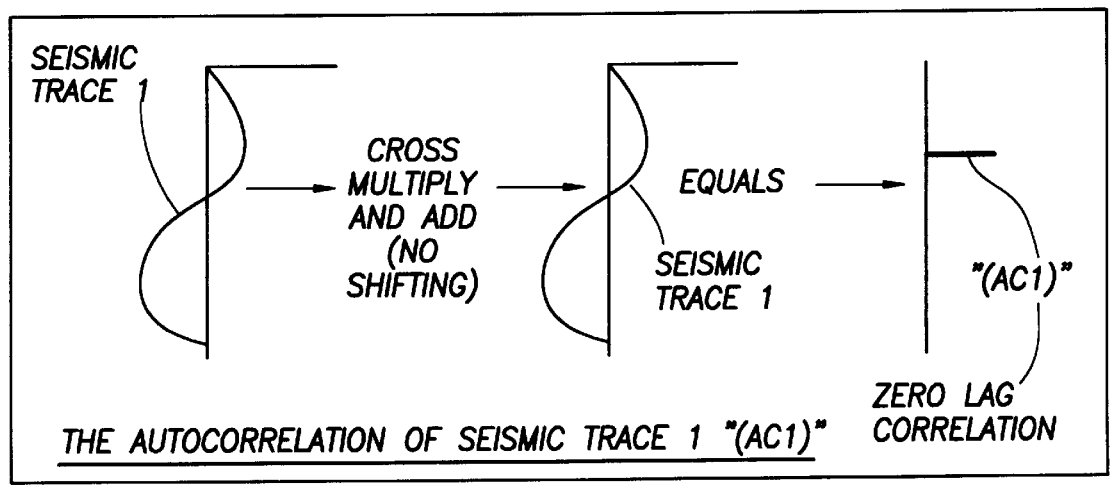
FIG. 20
(PRIOR ART)

FIG.24
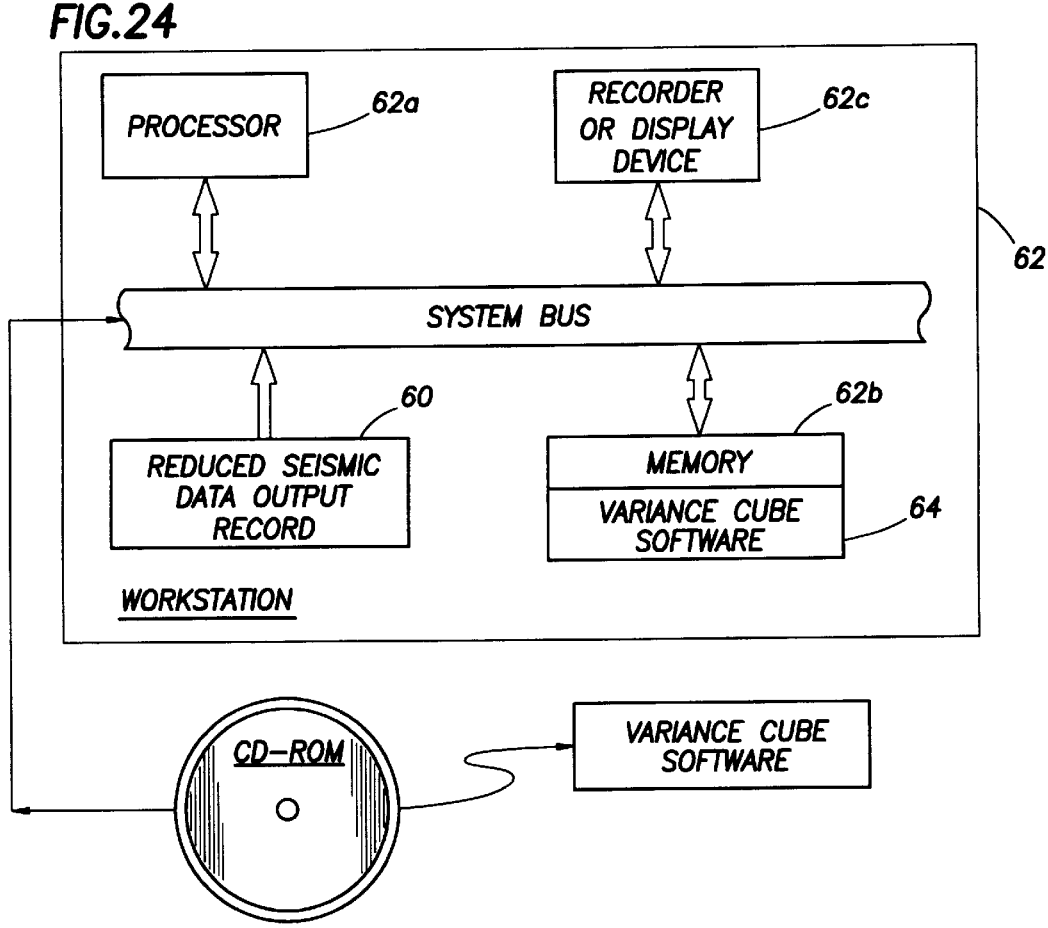
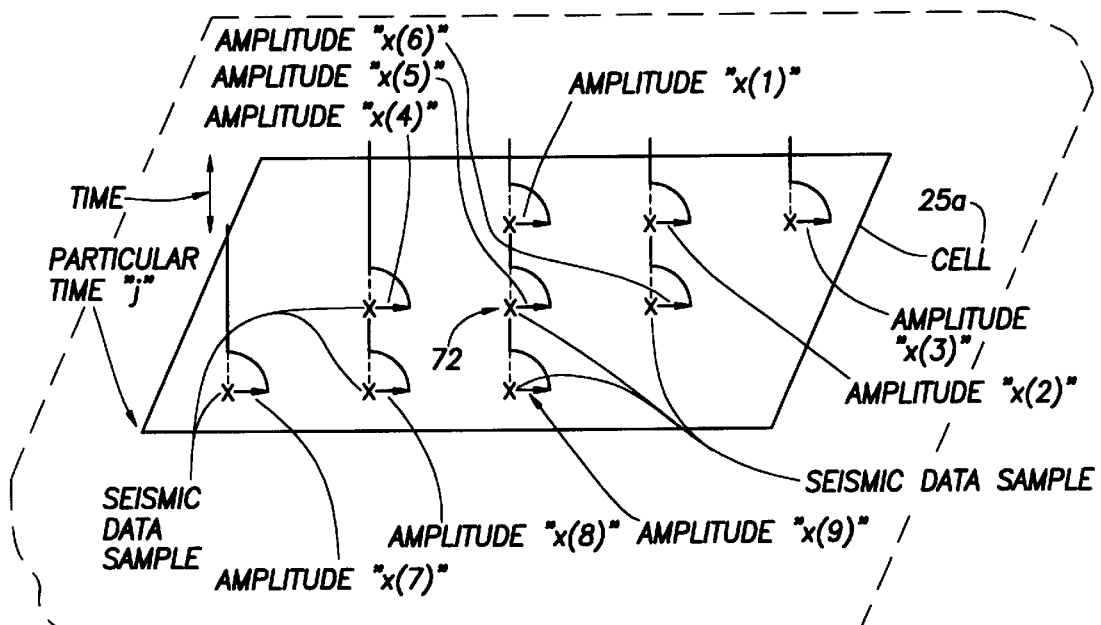
FIG.25

FIG.26
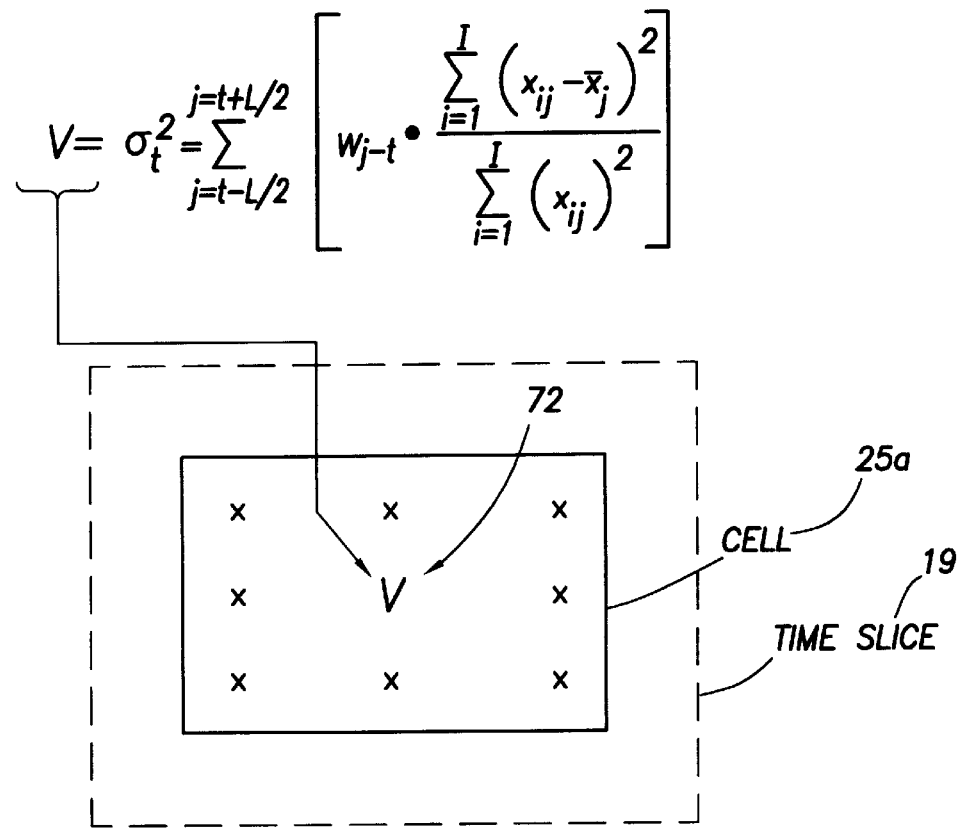
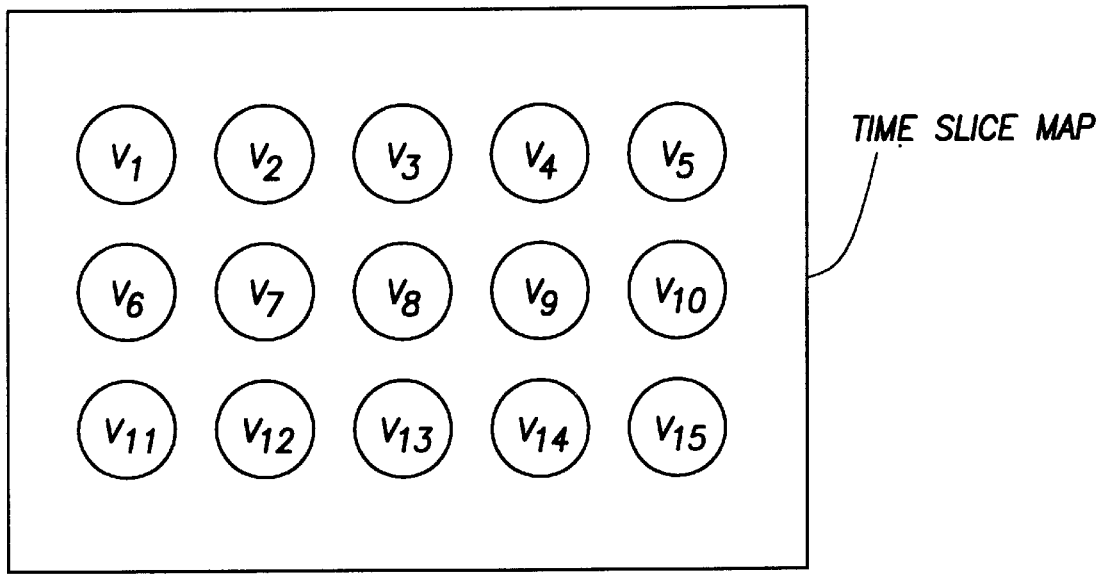
FIG.27

MAIN USER DIALOG FOR THE VARIANCE CUBE SOFTWARE

DIALOG FOR SELECTION OF ENTIRE SURVEY TO PROCESS WITH TIME RANGE RESTRICTION

DIALOG FOR SELECTION OF RECTANGULAR PATH WITHIN SEISMIC SURVEY

INPUT SECTION—WCAM, LINE 258, MIGRATION

OUTPUT SECTION—VARIANCE CUBE, 25 SAMPLE WINDOW

INPUT TIME SLICE 1258ms — WCAM MIGRATION, IN 100-300, CDP 300-550

OUTPUT TIME SLICE 1258ms — VARIANCE CUBE, 25 SAMPLE WINDOW

VARIANCE CUBE FENCE DISPLAY

SEISMIC SIGNAL PROCESSING METHOD AND APPARATUS FOR GENERATING A CUBE OF VARIANCE VALUES

CROSS REFERENCE TO RELATED APPLICATIONS

This application is a Utility application of prior pending Provisional application Ser. No. 60/123,412 filed Mar. 9, 1999 and entitled "Specifications for Generation of a Variance Cube Volume from a 3D Seismic Data Volume".

BACKGROUND OF THE INVENTION

The subject matter of the present invention relates to a seismic signal processing method and apparatus and, in particular, a workstation computer system, and its associated method and program storage device, which stores a novel software package known as "Variance Cube". The computer system is responsive to a plurality of seismic signals, which propagated through a cubic volume of an earth formation, for generating a cube representing said cubic volume of earth. The cube includes a plurality of seismic data samples, each seismic data sample having a corresponding "variance value" and a unique color assigned thereto. The computer system further generates one or more maps, such as a time slice map, representing one or more slices through the cube, each map displaying and being used to determine certain geologic features which exist along the corresponding slice through the cube. Each map includes a plurality of the variance values representing the geologic features, each such variance value being defined as the degree to which an amplitude of each seismic data sample in a cell in the cube at a particular reflection time "t" varies about an average amplitude of the samples in the cell.

Two dimensional seismic data is acquired along lines that consist of geophone arrays onshore or hydrophone streamers offshore. The geophones or hydrophones act as sensors which receive seismic energy from an earth formation. The seismic energy is transmitted into the earth formation, reflected back toward a surface of the earth from subsurface horizon interfaces in the earth formation, and propagates through a cubic volume of the earth formation before reaching the sensors. In three dimensional (3-D) seismic, the principle is the same except that the arrays of geophones and hydrophones are more closely spaced to provide more detailed subsurface coverage. As a result, extremely large volumes of digital seismic data are received by a computer and stored therein, the computer processing the seismic data by executing certain software stored in the computer and displaying the results of that processing. Following that processing, final interpretation of the processed seismic data can be made.

The processing of the digital seismic data requires computer resources which store and execute complex software for enhancing the received digital data/seismic signals and for muting any accompanying noise which masks the signals. Once the digital data/seismic signals are processed, the resultant processed signals are recorded and displayed in the form of a "cube" and a plurality of "maps" which represent slices through the cube, such as horizontal time slice maps or horizon maps, which display various geologic features situated on the corresponding slice through the cube. As a result, three dimensional seismic is used extensively to provide a more detailed structural and stratigraphic image of subsurface reservoirs.

During the computer processing of the seismic data, the computer responds to a set of seismic data which was digitally generated when seismic energy "sound" waves were transmitted through a cubic volume of earth. The computer operates on a cubic portion of the received seismic data (hereinafter called a "cube") which corresponds to that portion of the seismic energy that propagated through the cubic volume of earth. The seismic data in the cube comprises a plurality of seismic traces, where each trace further comprises a multitude of seismic data samples. If a horizontal plane were to pass through corresponding seismic data samples in the cube, that plane would be called a "time slice", since all the corresponding seismic data samples on that time slice have the same reflection time. Therefore, a plurality of such time slices pass through a plurality of corresponding seismic data samples in the cube (see FIG. 2). During the computer processing of the seismic data, a cell on a first time slice in the cube encompasses a first seismic data sample on the first time slice in the cube, similar such cells on other time slices in the cube encompass the same corresponding first seismic data sample on the other time slices in the cube, and a mathematical operation is performed on the seismic data samples in each of the plurality of cells on each of the plurality of time slices in the cube thereby producing a plurality of values or results corresponding, respectively, to a first plurality of the first seismic data samples in the plurality of cells of the cube. The plurality of values or results are then assigned, respectively, to the first plurality of first seismic data samples in the respective plurality of cells of the cube, one such value or result being assigned to each of the first seismic data samples. Then, the plurality of cells on each time slice in the cube move (or sequentially progress) from the first plurality of first seismic data samples to a second plurality of second seismic data samples, the above referenced mathematical operation is performed on the seismic data samples in each of the plurality of cells which now encompass the second plurality of second seismic data samples, and a second plurality of values or results is produced corresponding, respectively, to the second plurality of second seismic data samples in the plurality of cells of the cube, one such value or result being assigned to each of the second plurality of second seismic data samples. Then, the plurality of cells move or sequentially progress from the second plurality of second seismic data samples to a third plurality of third seismic data samples, and the above process is repeated until all of the seismic data samples on each of the time slices in the cube have a value or result assigned thereto. A color is assigned to each value or result corresponding to each seismic data sample. Therefore, each of the seismic data samples in the cube have a unique color assigned thereto. By slicing through the cube along the time axis, a time slice "map" is produced having a plurality of colors disposed thereon which correspond, respectively, to the plurality of values or results which further correspond to the plurality of seismic data samples on that time slice (see FIGS. 13-15). Similarly, by slicing vertically through the cube along a vertical axis, another "map" is produced having another plurality of colors disposed thereon which correspond, respectively, to the plurality of seismic data samples on that vertical slice (see FIG. 39). Consequently, the entire cube now has values or results and unique colors assigned to each of the seismic data samples in the cube and a plurality of maps can be produced which reflect the geologic features on the maps.

However, as good as the above referenced computer processing of the seismic data has become, improvements are needed. For example, there are different ways for performing the above referenced mathematical operation on the plurality seismic data samples in each of the plurality of cells on each of the slices in the cube.

For example, in U.S. Pat. No. 5,563,949 to Bahorich et al (the disclosure of which is incorporated by reference into this specification), in each of the cells on each of the time slices, a "coherency" is determined between two seismic data samples which are disposed in an "in-line" direction, and another "coherency" is determined between two seismic data samples which are disposed in a "cross-line" direction; the geometric mean of the coherency in the in-line direction and the coherency in the "cross-line" direction is determined; and that geometric mean value is assigned to one of the seismic data samples in each of the particular cells. The "coherency" is defined below with reference to FIG. 20.

In addition, in U.S. patent application Ser. No. 09/019,180 filed Feb. 5, 1998 to Peter P. Van Bemmel et al and entitled "Seismic signal processing method and apparatus for generating time slice or horizon maps in response to seismic traces and quadrature traces to determine geologic features" (hereinafter called the "Van Bemmel application"), the disclosure of which is incorporated by reference in this specification, a seismic signal trace and its quadrature trace undergo cross correlation for determining a cross correlation function (from which a plurality of values are determined for assignment to the seismic data samples) and generating the aforementioned "maps".

However, the method disclosed in the Bahorich patent (which discloses a mathematical operation for calculating the geometric mean of two coherency values to represent the value to assign to a seismic data sample in each cell on a time slice of a cube) and the method disclosed in the Van Bemmel application (which discloses a mathematical operation for calculating the cross correlation between a seismic trace and its quadrature trace) represent only two such methods and mathematical operations for generating a "cube" and a plurality of corresponding "maps" that display a set of geologic features of the earth formation in the cube.

There exist other methods for performing other mathematical operations for calculating other values or results for assignment to a seismic data sample in each of the cells on each of the slices in the cube for the ultimate generation of a "cube" and corresponding "maps" that display the geologic features of an earth formation in the cube.

SUMMARY OF THE INVENTION

Accordingly, it is a primary object of the present invention to disclose another such method and associated apparatus for calculating another value or result (i.e., a "variance value") for assignment to a seismic data sample in each cell on each time slice in a cube and for generating a cube and one or more maps from the cube, such as time slice maps, for displaying, via the variance values, the various geologic features of the earth formation in the cube.

It is a primary feature of the present invention to use a particular mathematical operation to calculate a value or result for assignment to a seismic data sample in each cell on each time slice through a cube, and to produce a cube and a plurality of corresponding maps, such as a time slice map, for displaying the geologic features of an earth formation along each slice through the cube, the calculation of that value or result being accomplished by: assigning a variance value to each such seismic data sample on each such slice through the cube and assigning a unique color to each such variance value thereby producing a cube and a plurality of corresponding maps representing slices through that cube which display, via the variance values, a set of geologic features of the earth formation along that slice through the cube.

It is another feature of the present invention to use a particular mathematical operation to calculate a value or result for assignment to a seismic data sample in each cell on each time slice through a cube, and to produce a cube and a corresponding map, such as a time slice map, that displays the geologic features of an earth formation along that slice through the cube, the calculation of that value or result being accomplished by: dividing the cube into a plurality of time slices and dividing each time slice in the cube at a particular reflection time "j" into a plurality of cells where each cell has (for example) nine seismic data samples disposed therein; calculating the average of the amplitudes of the nine seismic data samples in a particular cell at the time "j"; subtracting that average from the amplitude of each seismic data sample in the particular cell thereby producing a plurality of difference values; summing the squares of the plurality of difference values thereby producing a final summation value; dividing that final summation value by the sum of the squares of the amplitudes of the seismic data samples in the particular cell thereby producing a final variance value which is assigned to a center one of the nine seismic data samples in the particular cell; repeating the above steps for another adjacent cell on each of the time slices of the cube having another nine seismic data samples disposed therein until all of the seismic data samples on each of the time slices of the cube have variance values assigned thereto; and assigning colors to each of the variance values on each of the slices through the cube to thereby produce a plurality of color maps corresponding to each of the slices through the cube, the colors on each map representing a set of geologic features along a slice through the cubic volume of the earth formation.

In accordance with the above object and other features of the present invention, a "Variance Cube" software is disclosed which is adapted for storage in a memory of a computer workstation. The Variance Cube software is initially stored on a program storage device, such as a CD-Rom, the software being loaded from the program storage device into the memory of the computer workstation. That workstation includes a processor, and when the processor executes the Variance Cube software stored in the memory, a method is practiced. When the workstation processor executes the Variance Cube software, the workstation processor will respond to a set of seismic data which was digitally generated when seismic energy "sound" waves were transmitted through a cubic volume of earth. The computer operates on a cubic portion of the received seismic data (hereinafter called a "cube") which corresponds to that portion of the seismic energy that is propagated through the cubic volume of earth. The seismic data in the cube comprises a plurality of seismic traces, where each trace further comprises a multitude of seismic data samples. When a plurality of horizontal planes (called 'time slices') pass through each corresponding set of seismic data samples in the cube, that cube is divided into a plurality of the time slices where each time slice has a particular reflection time "j". During the processing of the seismic signal traces by the workstation processor, a first plurality of cells on the respective plurality of time slices in the cube will encompass a corresponding first plurality of seismic data samples on the plurality of time slices of the cube. Each cell on each time slice includes a plurality of seismic data samples having a corresponding plurality of amplitudes at the reflection time "j", the plurality of seismic data samples in said each cell including a center seismic data sample. In each cell on each time slice, a mathematical operation is performed. During that mathematical operation which is performed in connection with each cell on each time slice, the following mathematical steps are performed: calculating an average of the amplitudes of the plurality of seismic data samples in said each cell at said reflection time "j"; subtracting that average from each amplitude of each seismic data sample of the plurality of seismic data samples in said each cell thereby producing a plurality of differences; summing the squares of the plurality of differences thereby producing a numerator; summing the squares of the plurality of amplitudes of the plurality of seismic data samples in said each cell thereby producing a denominator; dividing the numerator by the denominator to thereby produce an approximate variance value; mathematically operating said approximate variance value with respect to a weighting factor to produce a final variance value which is assigned to the center seismic data sample of the plurality of seismic samples in said each cell on the time slice; assigning a color to the final variance value; and repeating the above steps until all the seismic data samples on each slice through the cube have a final variance value and a corresponding unique color assigned thereto thereby producing a cube enclosing a plurality of seismic data samples wherein a unique variance value and a corresponding unique color is assigned to each seismic data sample in the cube. When any horizontal or vertical slice passes through that cube, that slice can be represented by a "map" which also includes a plurality of seismic data samples, each such seismic data sample having a unique variance value and a corresponding unique color assigned thereto.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be imitative of the present invention, and wherein:

FIGS. 3 through 12 illustrate how a mathematical operation is performed in each cell in connection with a plurality of corresponding cells on a plurality of time slices associated with a plurality of corresponding seismic data samples in the cube and how the plurality of corresponding cells sequentially progress through the cube for the purpose of determining a unique value or result for each seismic data sample in the cube, each value or result corresponding to a unique color which is subsequently assigned to each seismic data sample in the cube;

FIGS. 16 through 22 illustrate the specific mathematical operation performed in each of the cells of FIGS. 3–12 as disclosed in U.S. Pat. No. 5,563,949 to Bahorich et al.

FIG. 24 illustrate a computer system, such as a workstation, which stores the "variance cube software" in accordance with the present invention;

FIGS. 25 through 28 illustrate the specific "variance oriented" mathematical operation (different from the mathematical operation of FIGS. 16–22 in the Bahorich patent, and different from the mathematical operation of the Van Bemmel application) performed in each of the cells of FIGS. 3–12 as disclosed in the present application when the "variance cube software" of the present invention is executed by the workstation processor of FIG. 24;

DETAILED DESCRIPTION OF THE PREFERRED EMBODIMENT

Referring to FIGS. 1a through 15, the following paragraphs will discuss a prior art "sequential progression" method for determining a unique value or result for each seismic data sample in a cube (i.e., a cubic volume of earth) and a corresponding unique color for each such seismic data sample in the cube and for generating one or more "maps" associated with each slice through the cube.

Figure 1A:
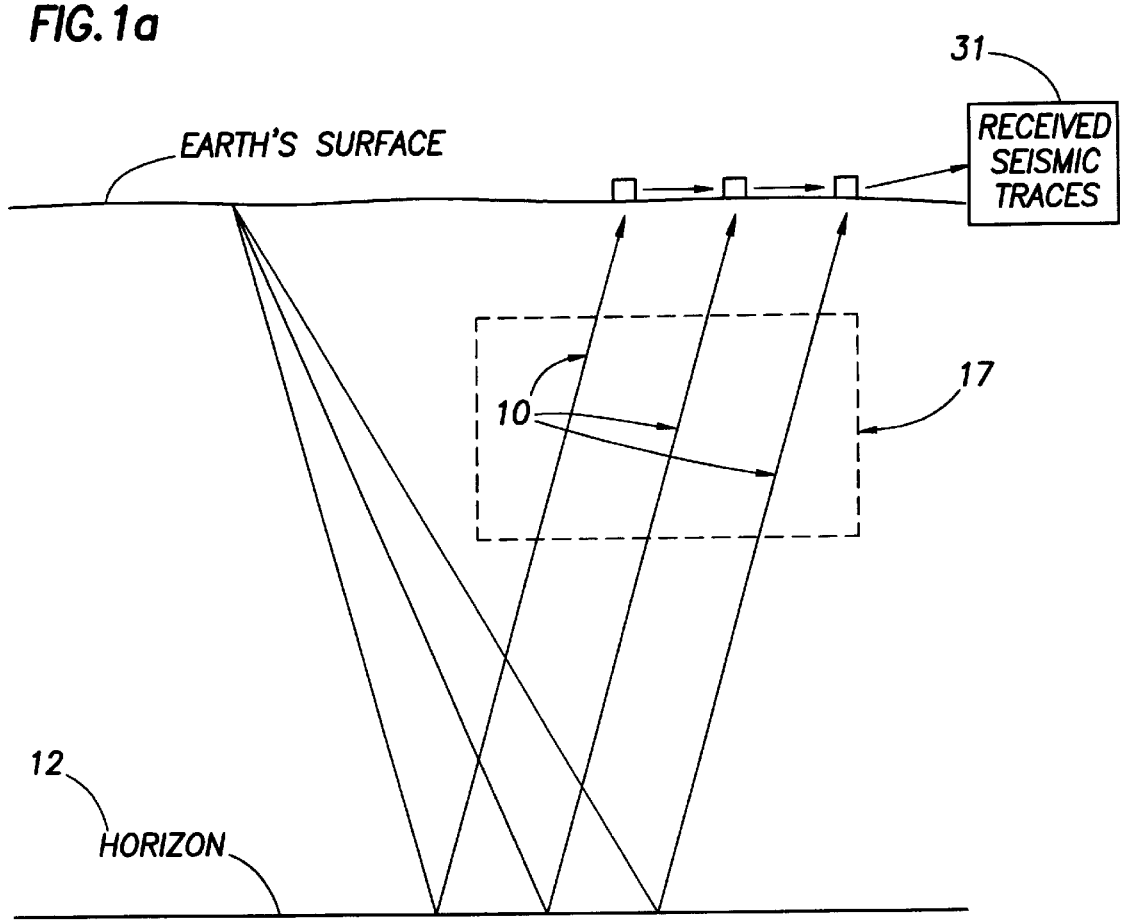
FIGS. 1a–1b and 2 illustrate a plurality of seismic traces reflecting off a horizon in an earth formation and propagating through a cubic volume (i.e., a "cube") of the formation.
Figure 1B:
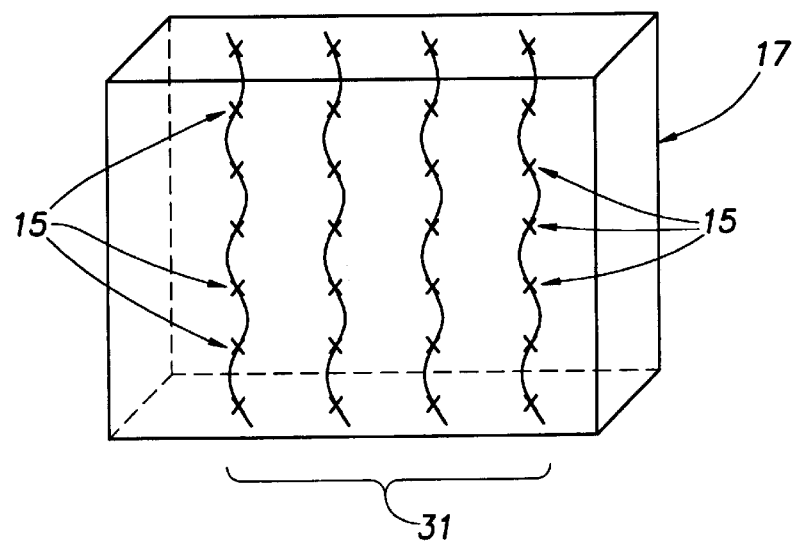

In FIGS. 1a and 1b, starting with FIG. 1a, a plurality of seismic waves 10 originating from an explosive energy source reflect off a horizon 12 in an earth formation. The seismic waves 10 will propagate through a cubic volume of earth 17 (hereinafter, called a "cube 17") during its travel toward the Earth's surface. At the Earth's surface, the seismic waves 10 are received, in the form of seismic traces 31. However, each of the seismic traces 31 actually consist of a sequential series of seismic data samples. In FIG. 1b, the seismic traces 31 propagating through the cube 17 is illustrated. Each of the traces 31 include a series of interconnected seismic data samples 15. Therefore, in FIG. 1b, the cube 17 (representing the cubic volume of earth 17 in FIG. 1a) contains a plurality of seismic data samples 15 representing a plurality of seismic traces 31 propagating through the cube 17.

Figure 2:
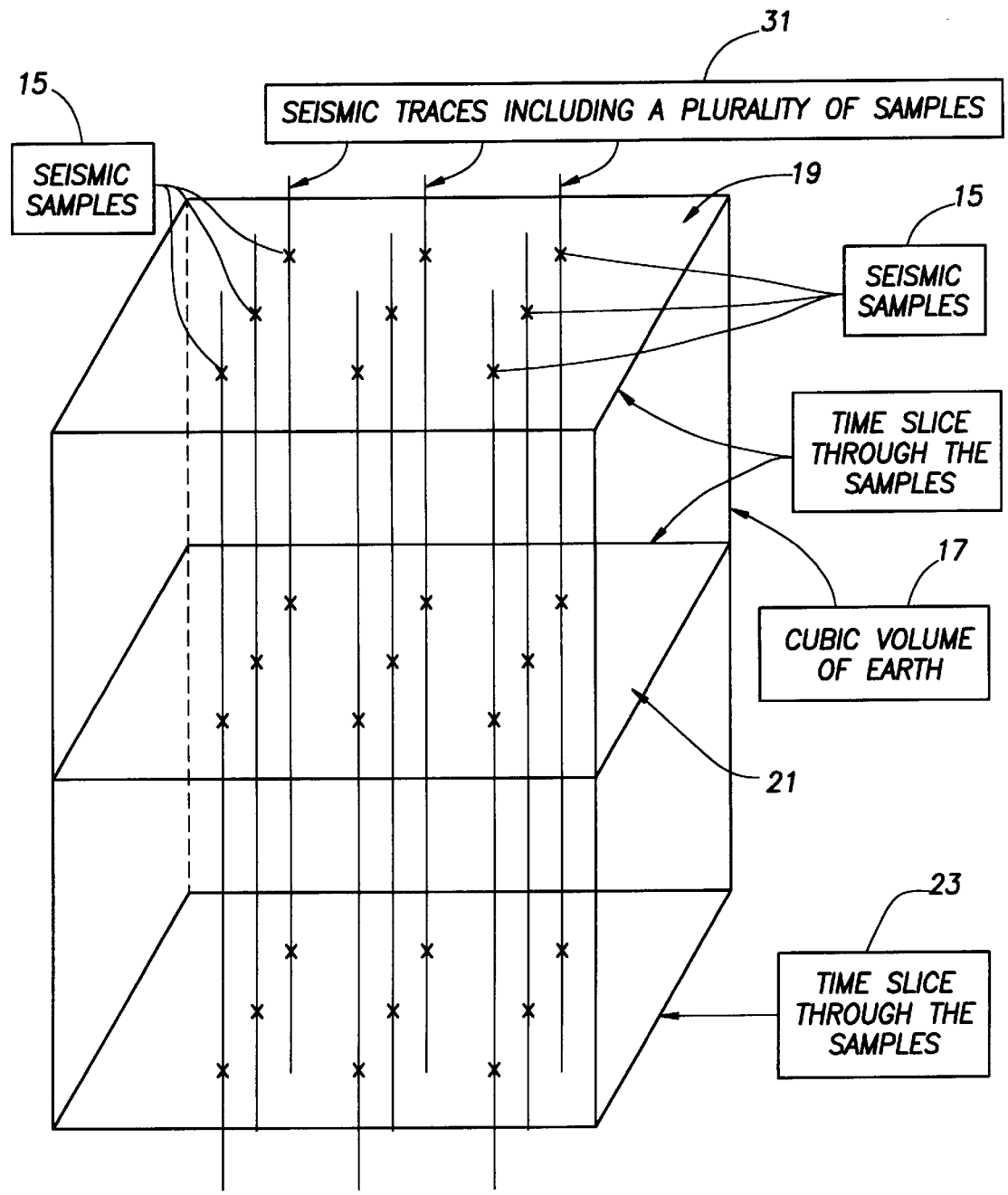

In FIG. 2, the cube 17 of FIG. 1b is again illustrated; however, in FIG. 2, a slice (called a time slice) passes through each of the corresponding seismic data samples. For example, in FIG. 2, each of the seismic traces 10 include three (3) seismic data samples, a top sample, a middle sample, and a bottom sample. A time slice 19 passes through each of the top seismic data samples, a time slice 21 passes through each of the middle seismic data samples, and a time slice 23 passes through each of the bottom seismic data samples. The resultant cube of FIG. 2 is illustrated again in FIG. 3.

In FIG. 3, a plurality of cells enclosed corresponding seismic data samples on the time slices of the cube. For example, in FIG. 3, a first cell 25a encloses a first seismic data sample 15a1 on time slice 19, a second cell 25b encloses a corresponding first seismic data sample 15a2 on time slice 21, and a third cell 25c encloses a corresponding first seismic data sample 15a3 on time slice 23. A mathematical operation takes place in each cell 15a1, 15a2, 15a3, and a value or result "A" is determined for sample 15a1, a value or result "B" is determined for sample 15a2, and a value or result "C" is determined for sample 15a3. The cells 25a, 25b, and 25c "sequentially progress" to the next adjacent samples 15b1, 15b2, 15b3. In FIG. 4, note that "A" is assigned to sample 15a1, "B" is assigned to sample 15a2, and "C" is assigned to sample 15a3.

Figure 6:
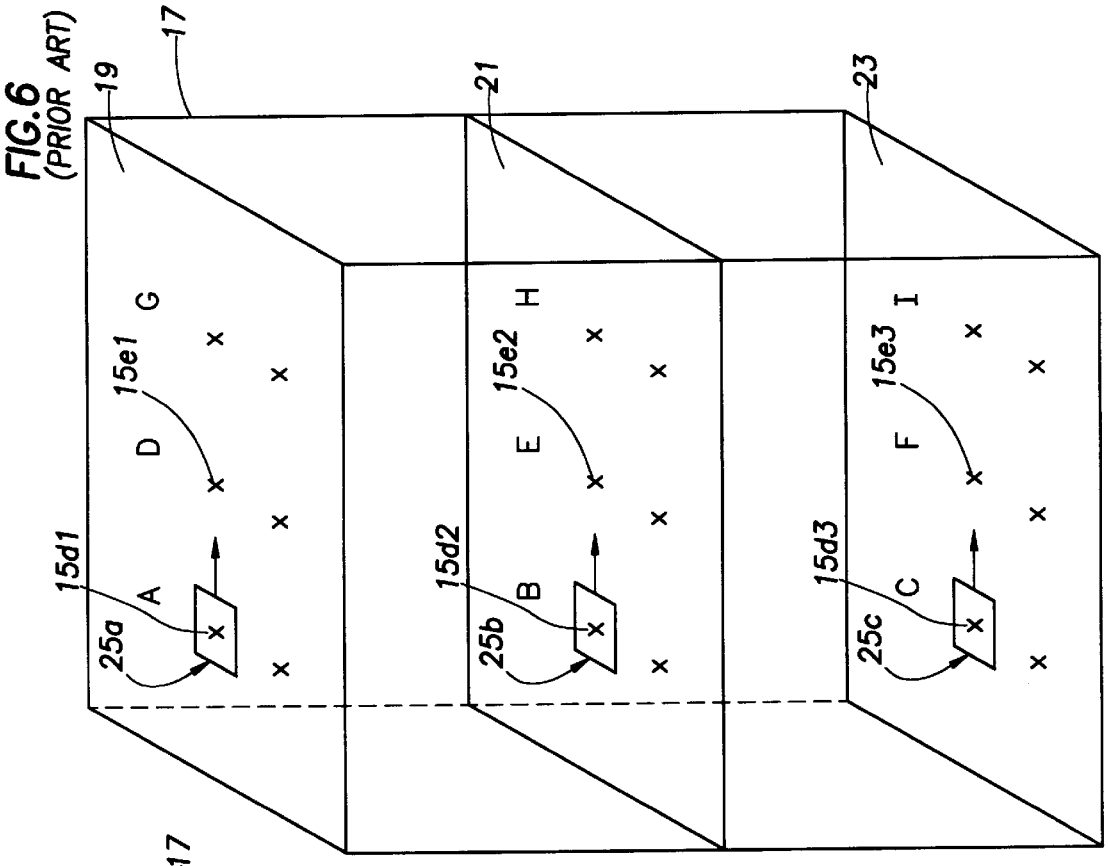
Figure 5:
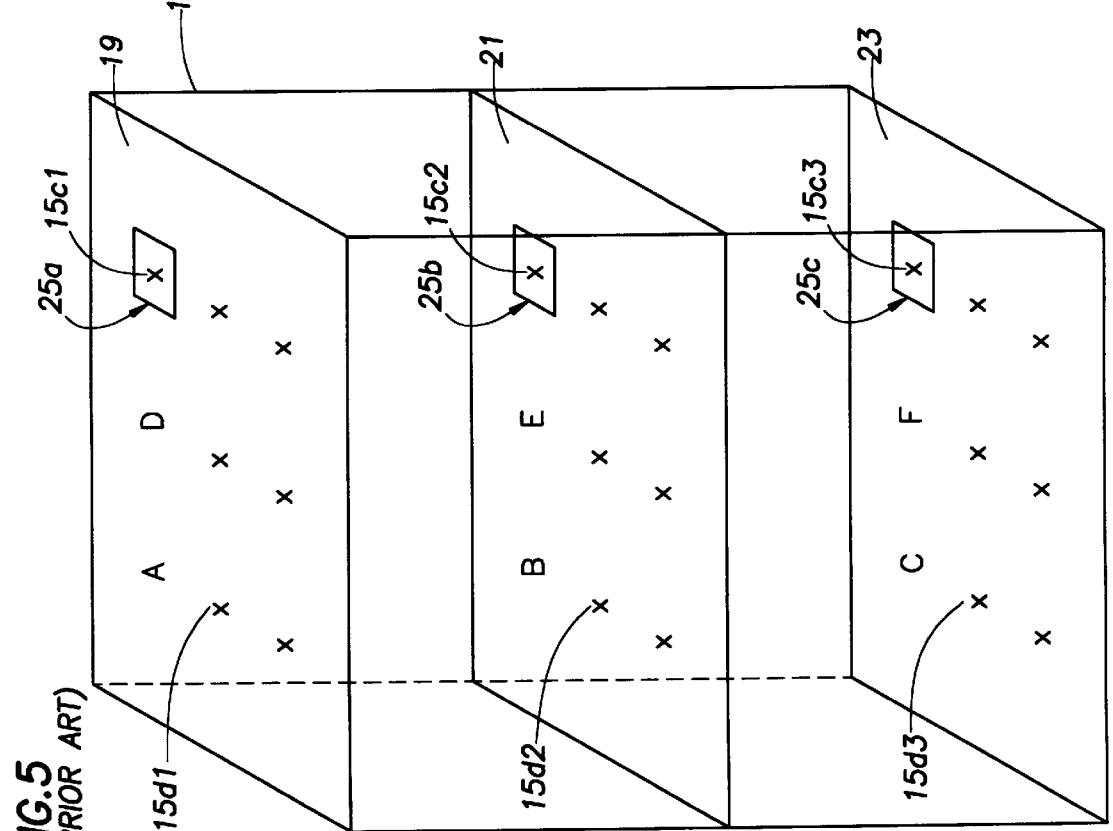
Figure 7:
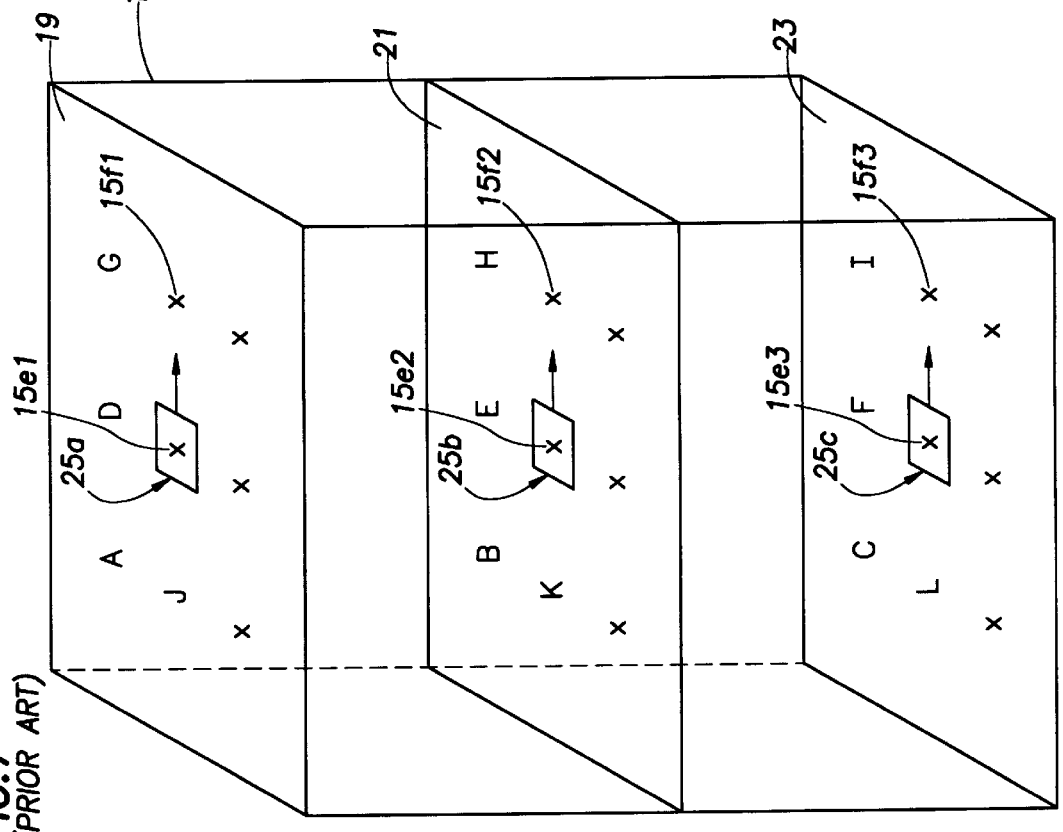

In FIG. 4, the first cell 25a encloses a second seismic data sample 15b1 on time slice 19, the second cell 25b encloses a corresponding second seismic data sample 15b2 on time slice 21, and the third cell 25c encloses a corresponding second seismic data sample 15b3 on time slice 23. The mathematical operation takes place in each cell 15b1, 15b2, 15b3, and a value or result "D" is determined for sample 15b1, a value or result "E" is determined for sample 15b2, and a value or result "F" is determined for sample 15b3. The cells 25a, 25b, and 25c "sequentially progress" to the next adjacent samples 15c1, 15c2, 15c3. In FIG. 5, note that value "D" is assigned to sample 15b1, value "E" is assigned to sample 15b2, and value "F" is assigned to sample 15b3. In FIG. 5, the first, second, and third cells 25a, 25b, and 25c enclose the third and corresponding seismic data samples 15c1, 15c2, 15c3, the mathematical operation is performed in the cells 25a, 25b, 25c and a value or result "G", "H", and "I" is determined for samples 15c1, 15c2, and 15c3, respectively. The cells 25a–25c sequentially progress to the next adjacent samples 15d1, 15d2, 15d3 and note, in FIG. 6, that values G, H, and I have been assigned to samples 15c1, 15c2, and 15c3, respectively. In FIG. 6, the first, second, and third cells 25a, 25b, and 25c enclose the fourth and corresponding seismic data samples 15d1, 15d2, 15d3, the mathematical operation is performed in the cells 25a, 25b, 25c and a value or result "J", "K", and "L" is determined for samples 15d1, 15d2, and 15d3, respectively. The cells 25a–25c sequentially progress to the next adjacent samples 15c1, 15c2, 15c3 and note, in FIG. 7, that values J, K, and L have been assigned to samples 15d1, 15d2, and 15d3, respectively. In FIG. 7, the first, second, and third cells 25a, 25b, and 25c enclose the fifth and corresponding seismic data samples 15e1, 15e2, 15e3, the mathematical operation is performed in the cells 25a, 25b, 25c and a value or result "M", "M", and "O" is determined for samples 15e1, 15e2, and 15e3, respectively. The cells 25a–25c sequentially progress to the next adjacent samples 15f1, 15f2, 15f3 and note, in FIG. 8, that values M, N, and O have been assigned to samples 15e1, 15e2, and 15e3, respectively.

Figure 8:
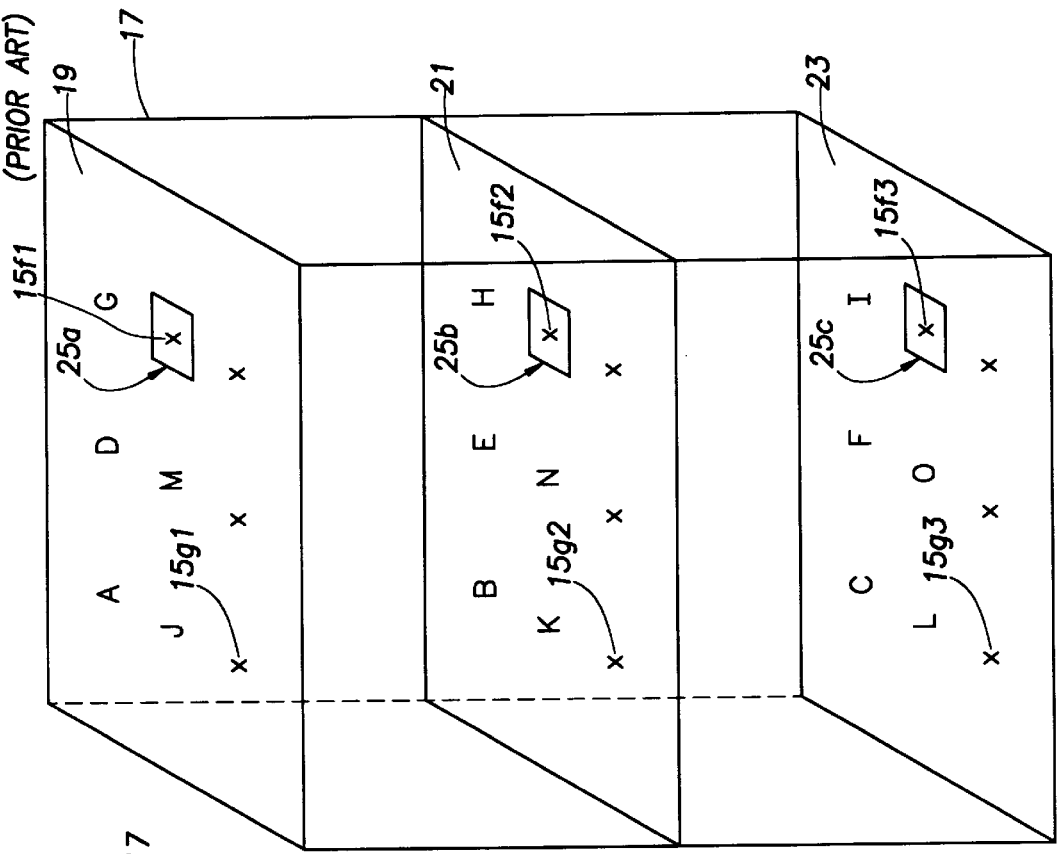
Figure 9:
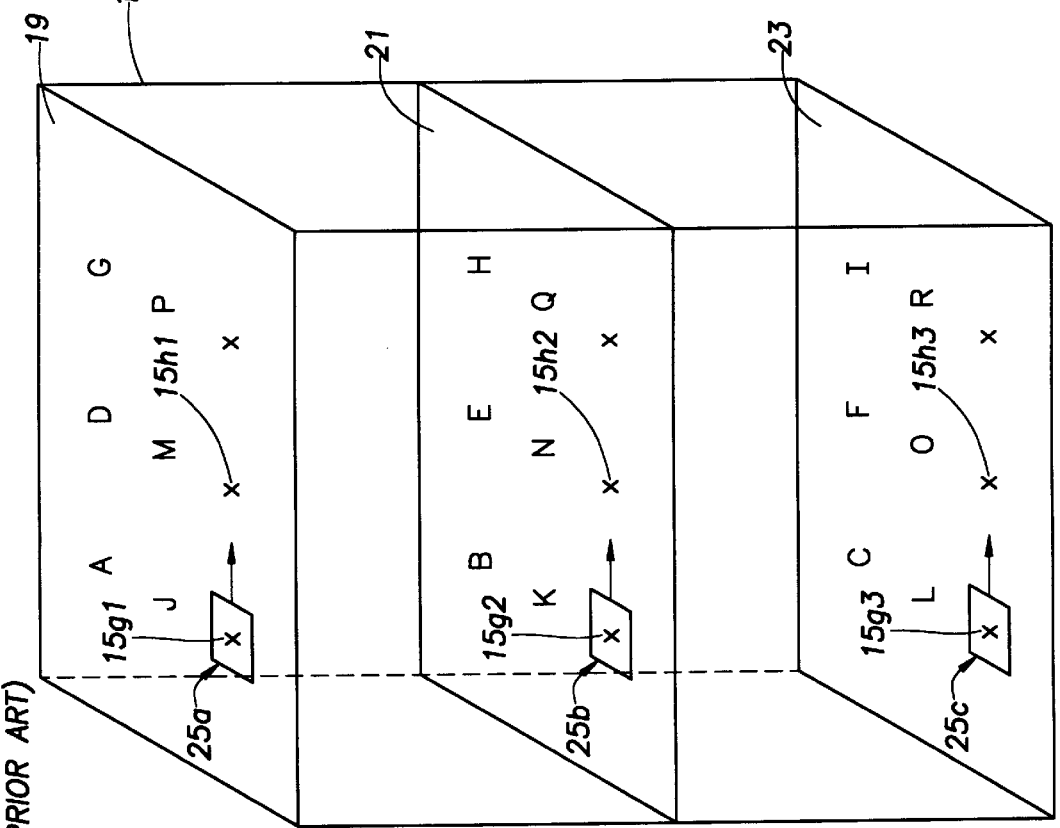

In FIG. 8, the first, second, and third cells 25a, 25b, and 25c enclose the sixth and corresponding seismic data samples 15f1, 15f2, 15f3, the mathematical operation is performed in the cells 25a, 25b, 25c and a value or result "P", "Q", and "R" is determined for samples 15f1, 15f2, and 15f3, respectively. The cells 25a–25c sequentially progress to the next adjacent samples 15g1, 15g2, 15g3 and note, in FIG. 9, that values P, Q, and R have been assigned to samples 15f1, 15f2, and 15f3, respectively. In FIG. 9, the first, second, and third cells 25a, 25b, and 25c enclose the seventh and corresponding seismic data samples 15g1, 15g2, 15g3, the mathematical operation is performed in the cells 25a, 25b, 25c and a value or result "S", "T", and "U" is determined for samples 15g1, 15g2, and 15g3, respectively. The cells 25a–25c sequentially progress to the next adjacent samples 15h1, 15h2, 15h3 and note, in FIG. 10, that values S, T, and U have been assigned to samples 15g1, 15g2, and 15g3, respectively.

Figure 10:
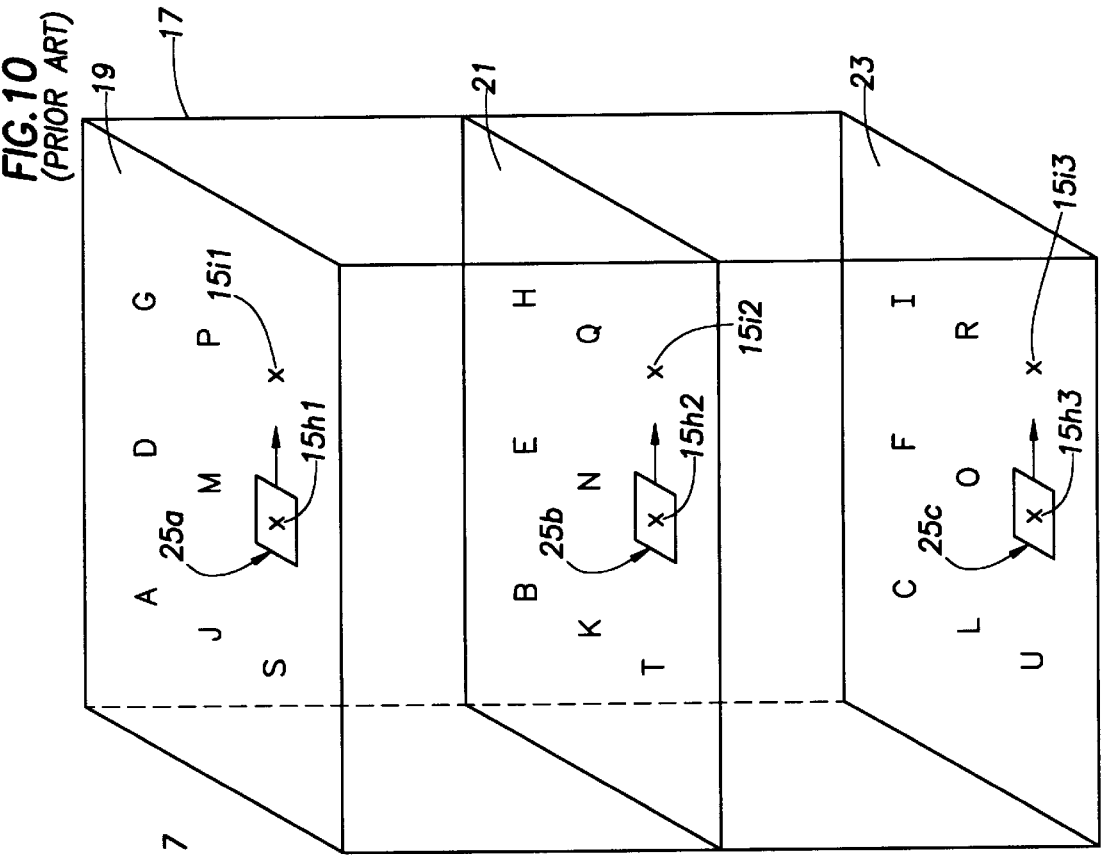

In FIG. 10, the first, second, and third cells 25a, 25b, and 25c enclose the eighth and corresponding seismic data samples 15h1, 15h2, 15h3, the mathematical operation is performed in the cells 25a, 25b, 25c and a value or result "V", "W", and "X" is determined for samples 15h1, 15h2, and 15h3, respectively. The cells 25a–25c sequentially progress to the next adjacent samples 15i1, 15i2, 15i3 and note, in FIG. 11, that values V, W, and X have been assigned to samples 15h1, 15h2, and 15h3, respectively.

Figure 11:
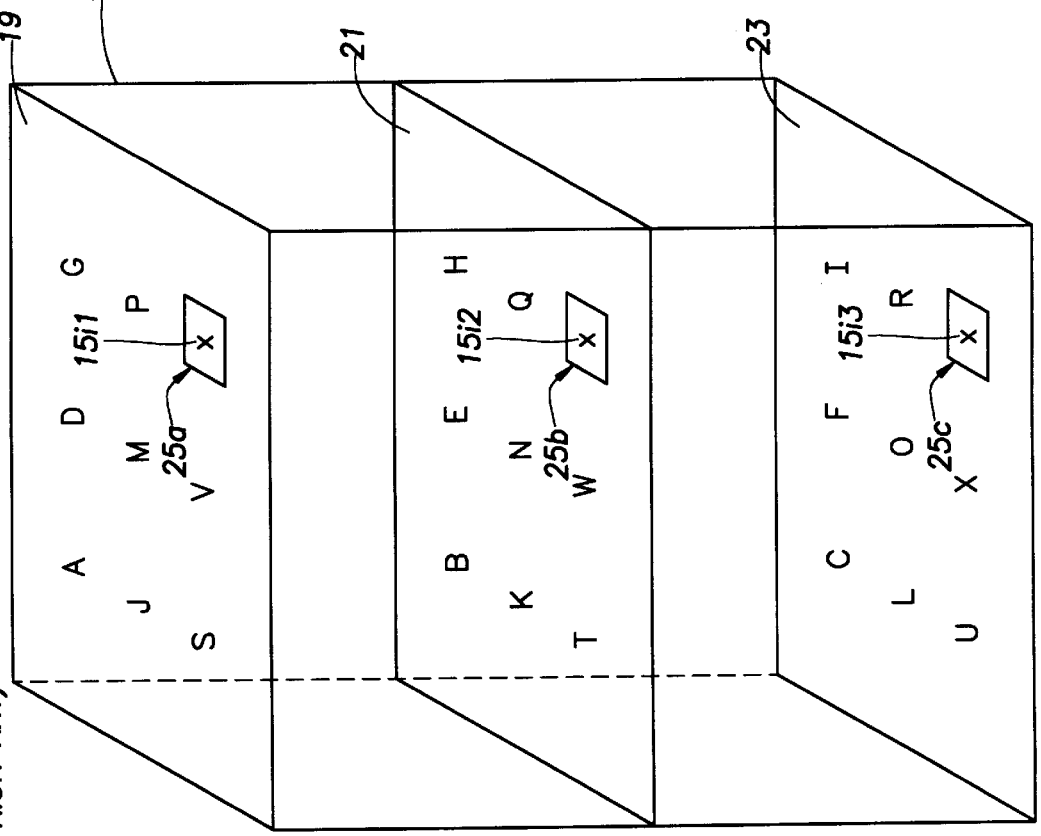

In FIG. 11, the first, second, and third cells 25a, 25b, and 25c enclose the ninth and corresponding seismic data samples 15i1, 15i2, 15i3, the mathematical operation is performed in the cells 25a, 25b, 25c and a value or result "Y", "Z", and "AB" is determined for samples 15i1, 15i2, and 15i3, respectively. The sequential progression of the cells 25a–25c stops at this point, since values or results have been assigned to each and all of the seismic data samples in the cube 17. Note, in FIG. 12, that values Y, Z, and AB have been assigned to samples 15i1, 15i2, and 15i3, respectively.

Figure 12:
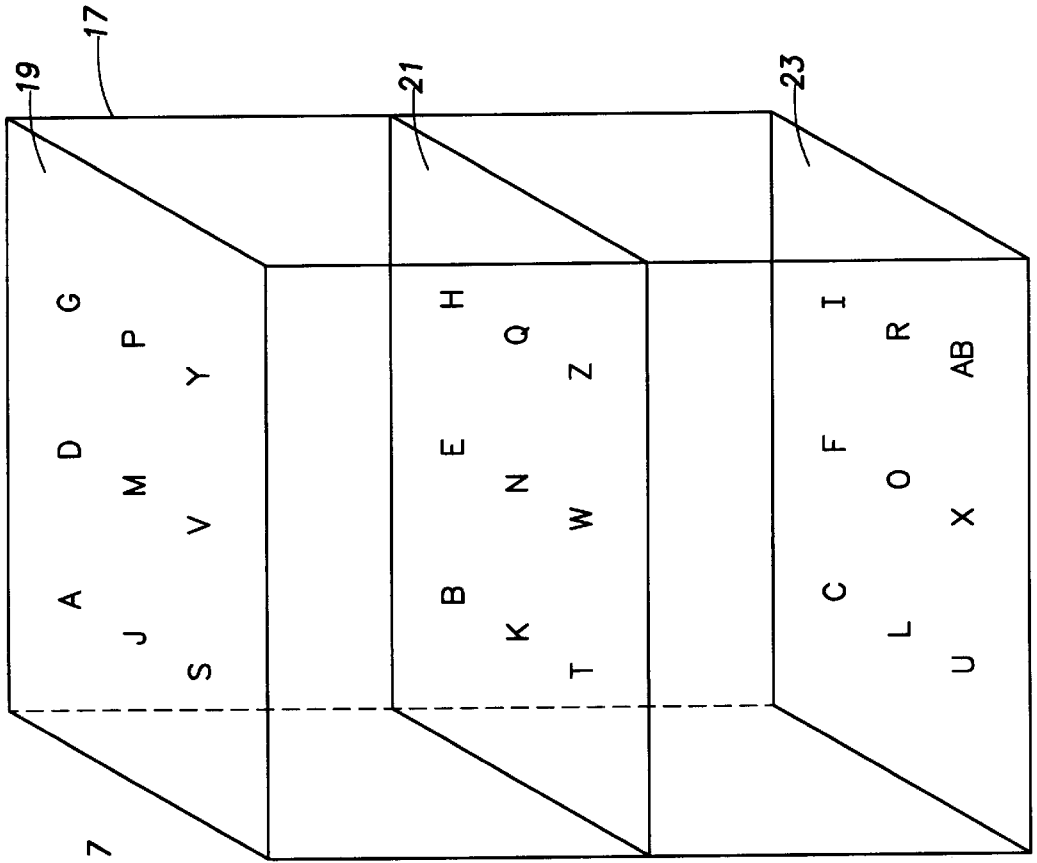

In FIG. 12, as a result of the above "sequential progression" movement of the cells 25a, 25b, and 25c which was discussed above with reference to FIGS. 3 through 11, wherein the mathematical operation was performed in each of the cells 25a and 25b and 25c, all of the seismic data samples "x" on each of the time slices 19, 21, and 23 of the cube 17 have a "value or result" assigned thereto. Recall that a unique color is determined for each such unique value or result.

Figure 13:
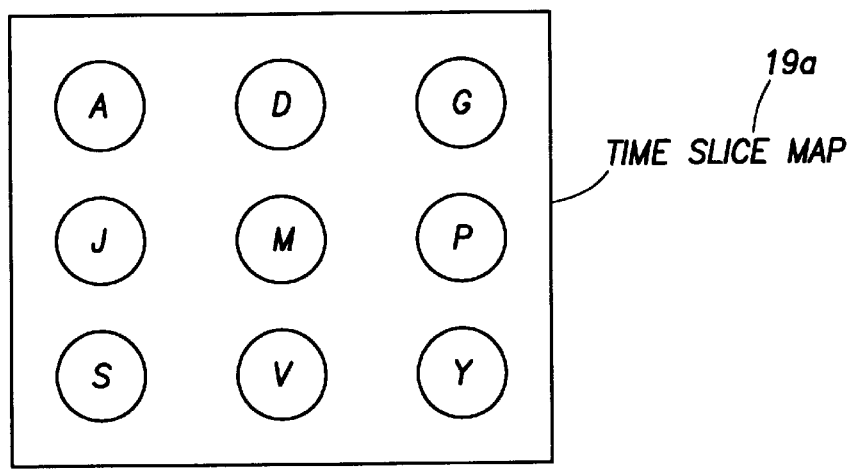
FIGS. 13–15 illustrate time slice maps resulting from the cube of FIG. 12.
Figure 14:
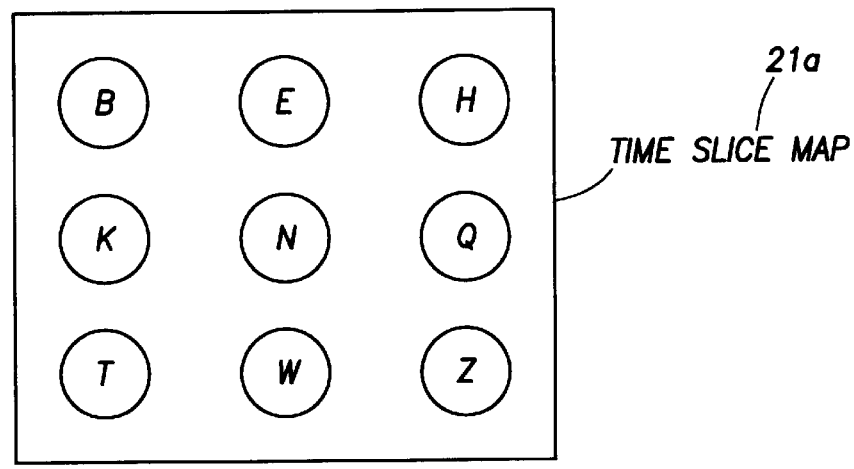
Figure 15:
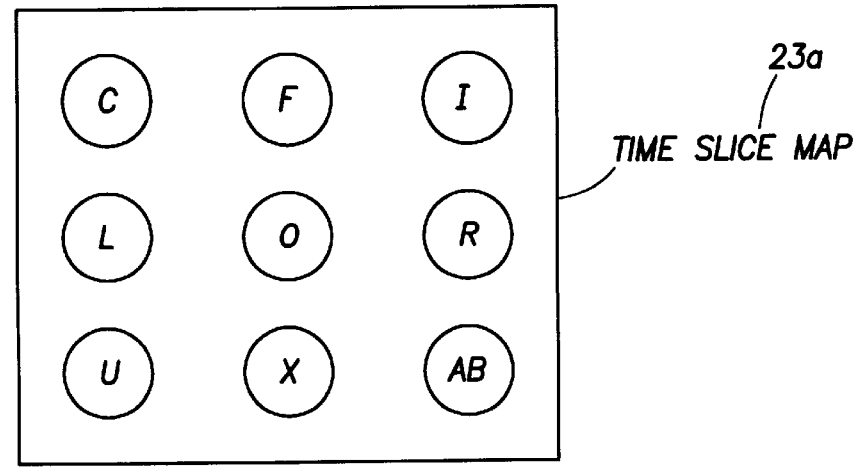

In FIGS. 13 through 15, a simple time slice map 19a is illustrated corresponding to time slice 19 of FIG. 12, a simple time slice map 23a is illustrated corresponding to time slice 21 of FIG. 12, and a simple time slice map 23a is illustrated corresponding to time slice 23 of FIG. 12. However, see FIGS. 35 through 39 for more realistic time slice (and vertical slice) maps which are generated in accordance with the present invention.

Referring to FIGS. 16 through 22, recall that, in U.S. Pat. No. 5,563,949 to Bahorich et al, a "first mathematical operation" is performed in each of the cells 25a, 25b, and 25c of FIGS. 3 through 12 for the purpose of determining a value or result to assign to each seismic data sample in the cube. That "first mathematical operation", performed in each of the cells of each time slice in the cube of the Bahorich et al patent, is discussed below with reference to FIGS. 16 through 22 of the drawings.

Figure 16:
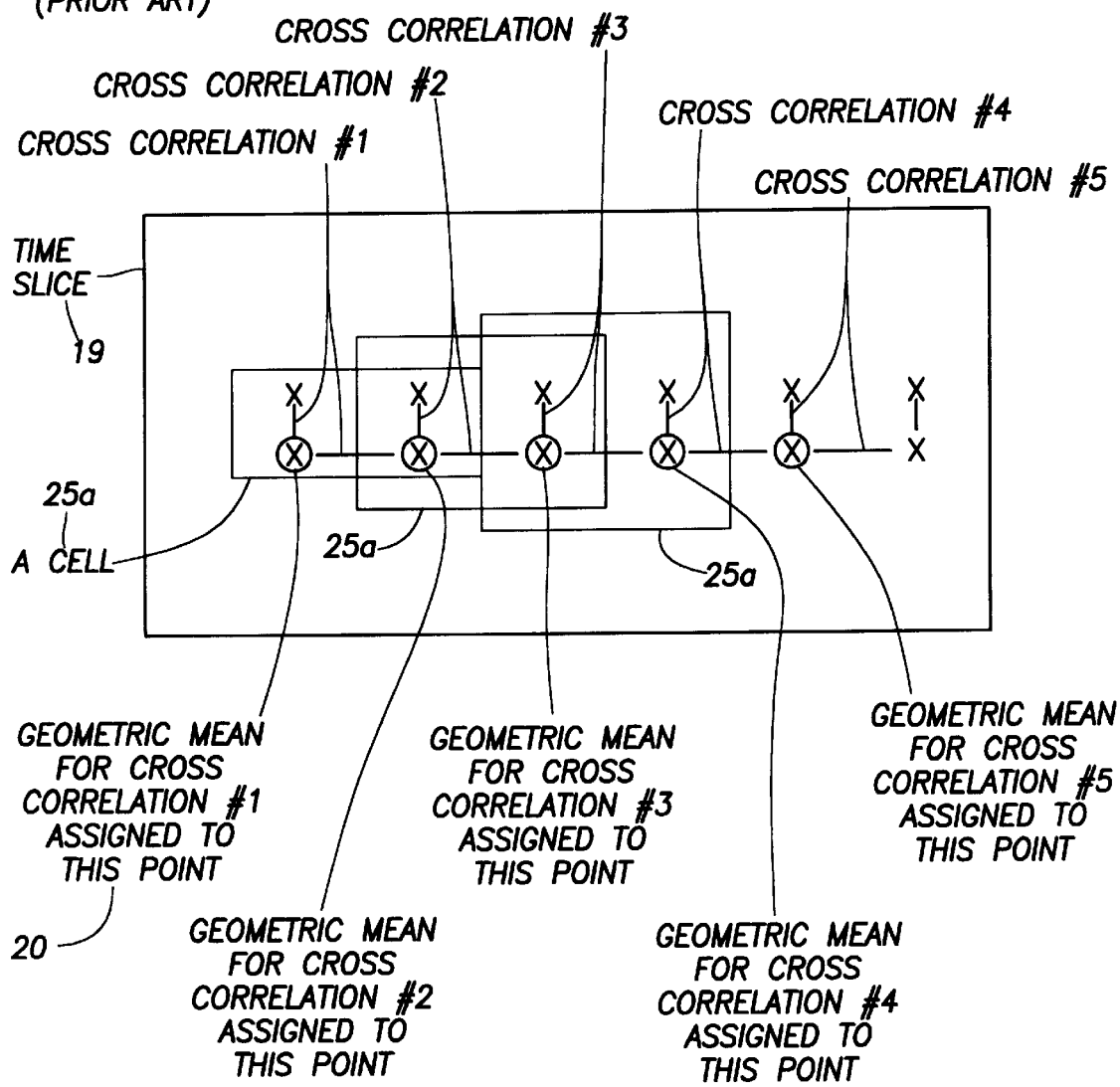

In FIG. 16, the time slice 19 of FIG. 3 is illustrated. The time slice 19 includes the sequentially progressing cell 25a of FIG. 3. Each cell 25a contains four seismic data samples "x", three of the seismic data samples "x" being used during "cross correlation".

For example, when "cross correlation #1" is complete, "cross correlation #2" takes place, followed by "cross correlation #3", "cross correlation #4", and "cross correlation #5" in "sequential progression" order. In FIG. 16, when "cross correlation #1" is complete, a "Geometric Mean" 20 is assigned to the seismic data sample "x" 20 (which is the corner sample). Similarly, in FIG. 16, when cross correlations 2, 3, 4, and 5 are completed, a separate Geometric mean is assigned to each of their corner seismic data samples "x" as indicated in FIG. 16. This concept is explained more fully below with reference to FIG. 4.

Figure 17:
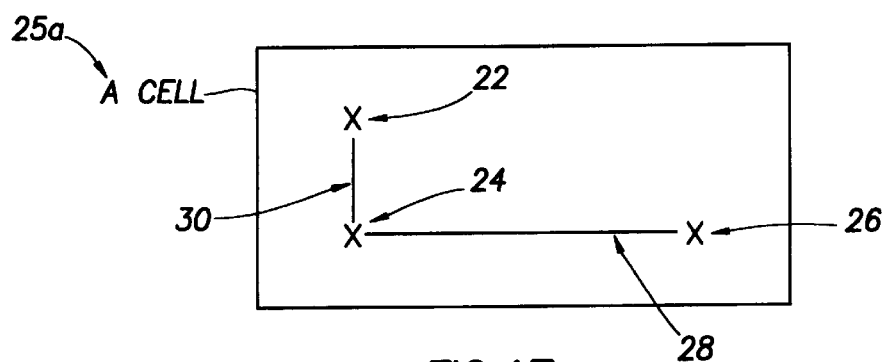

In FIG. 17, one of the cells 25a of FIG. 16 is illustrated. The cell 25a contains three seismic data samples "x":

seismic sample 22, seismic sample 24, and seismic sample 26. An "in-line" cross correlation 28 takes place between samples 24 and 26 thereby producing a "coherency" value along the x-direction: "Px(t, tlagx)". Then, a "cross-line" cross correlation 30 takes place between samples 22 and 24 thereby producing a "coherency" value along the y-direction: "Py(t, tlagy)". The "Geometric mean" of the two coherency values "Px(t, tlagx)" and "Py(t, tlagy)" is determined. The "Geometric mean" for two (2) values is defined to be the square-root of the product of the two values. Therefore, since there are two coherency values "Px(t, tlagx)" and "Py(t, tlagy)", the Geometric mean of the two coherency values "Px(t, tlagx)" and "Py(t, tlagy)" is defined as follows:

$$\text{Geometric mean} = \sqrt{[Px(t, tlagx)][Py(t, tlagy)]}$$

The above referenced "Geometric mean" is assigned to the corner sample 24 in FIG. 17. Ultimately, a color is associated with the corner sample 24, that color being indicative of the above referenced "Geometric mean" value.

The "in-line" cross correlation 28 and the "cross-line" cross correlation 30 of FIGS. 16 and 17 will be discussed in greater detail below with reference to FIGS. 18 and 19.

Figure 18:
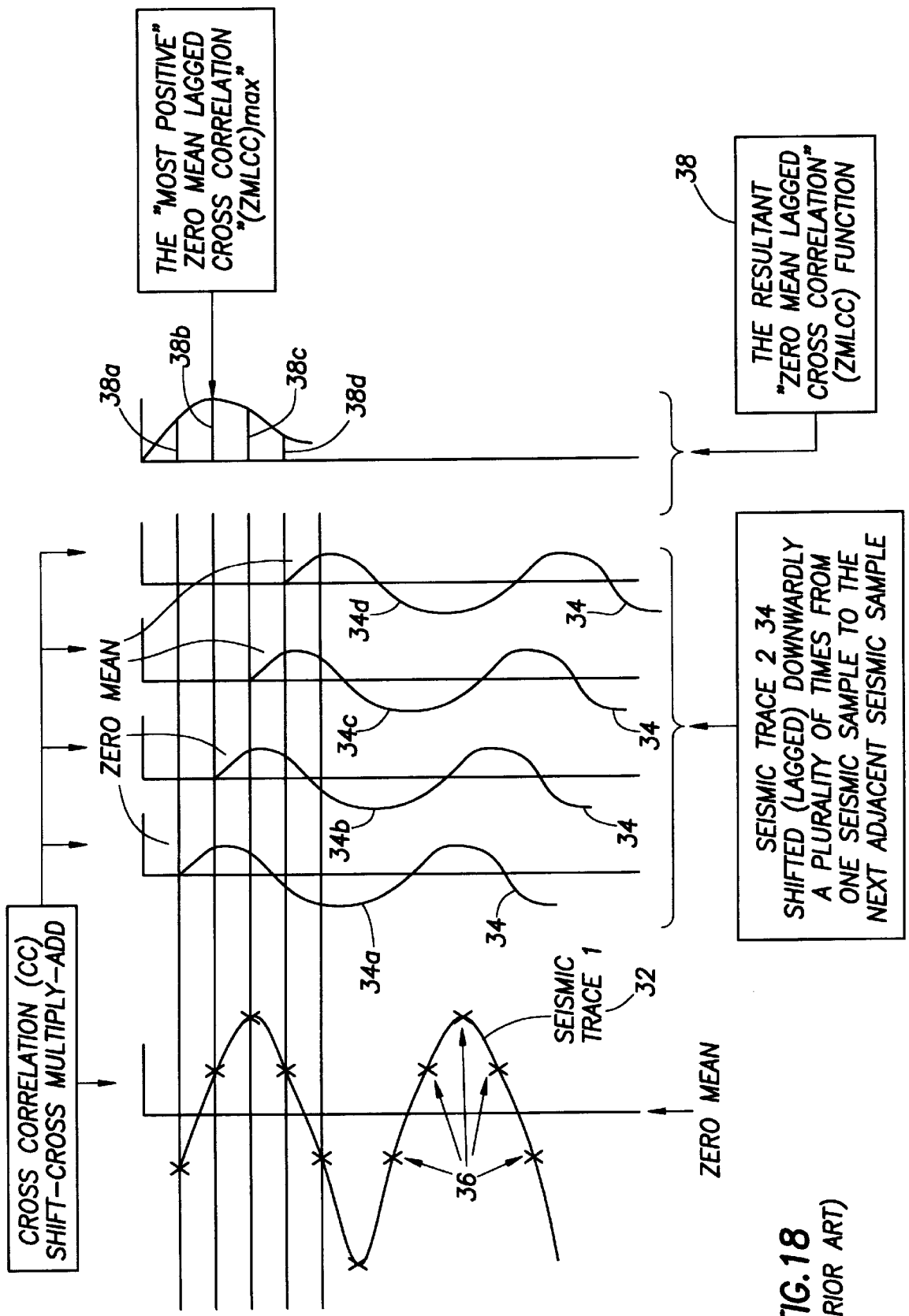
Figure 19:
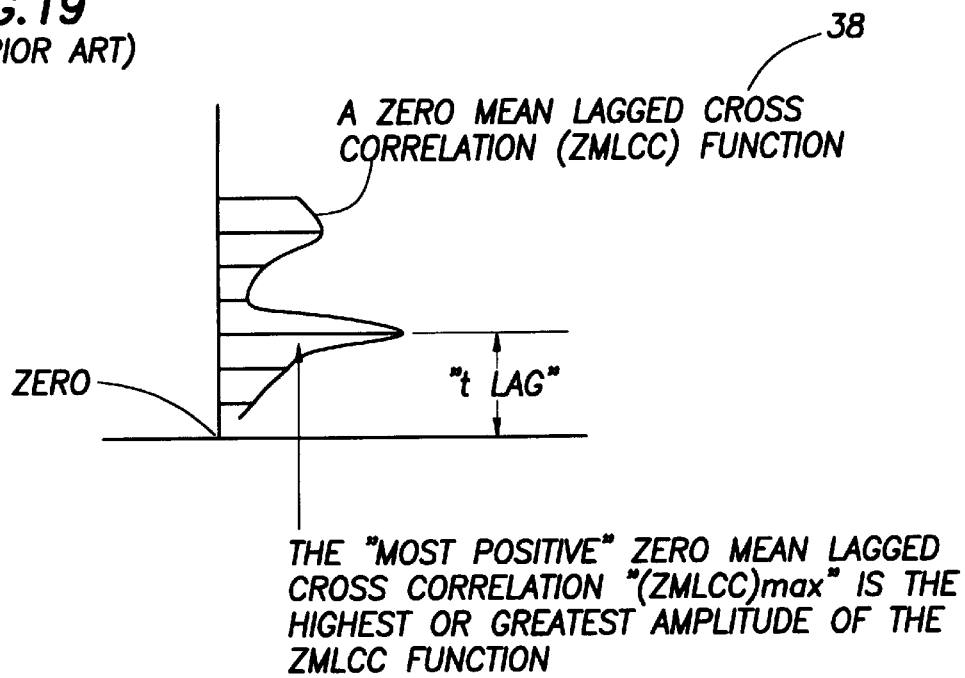
Figure 22:
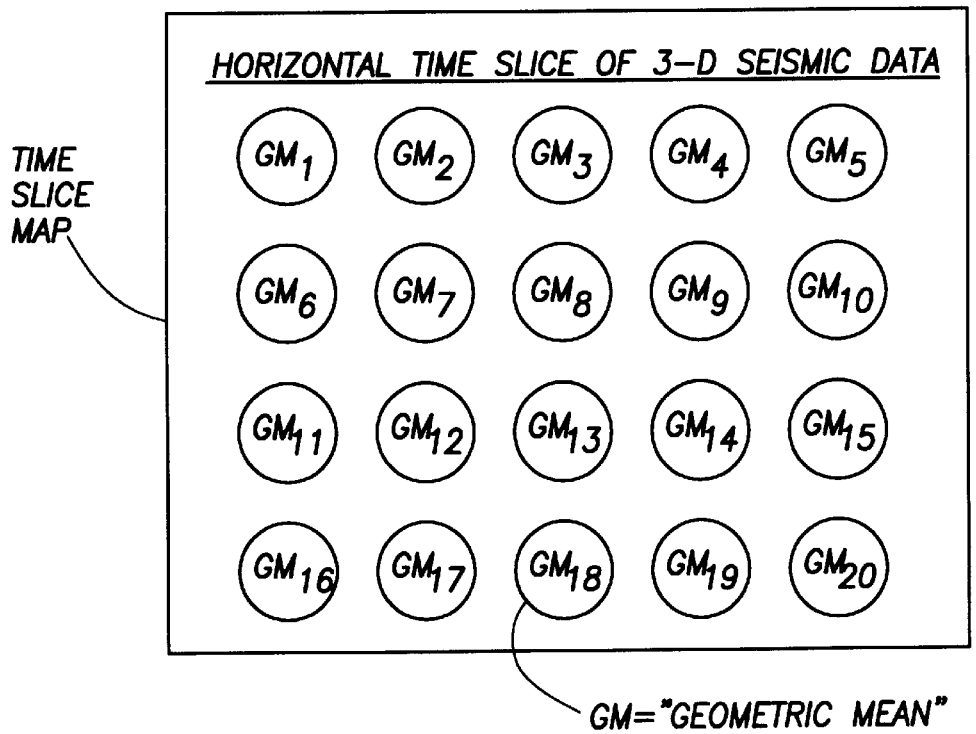

In FIGS. 18 and 19, the method for performing the "in-line" cross correlation 28 and the "cross-line" cross correlation 30 of FIG. 17 is illustrated. In FIG. 18, "seismic trace 1" 32 is "cross correlated" with "seismic trace 2" 34. "Seismic trace 1" 32 in FIG. 18 can be seismic trace 24 in FIG. 17 and "seismic trace 2" 34 in FIG. 18 can be either seismic trace 22 or seismic trace 26 in FIG. 17. The "seismic trace 1" 32 has a "zero mean" and it includes a plurality of seismic samples 36. The "seismic trace 2" 34 also has a "zero mean" and it is successively shifted or "lagged" downwardly in FIG. 18 by an amount equal to the distance between the seismic samples 36. For example, "seismic trace 2" 34a has a "zero mean" and it is not shifted or lagged downwardly; "seismic trace 2" 34b has a "zero mean" and it is shifted or lagged downwardly by one seismic sample 36; "seismic trace 2" 34c has a "zero mean" and it is shifted or lagged downwardly by two seismic samples 36; and "seismic trace 2" 34d has a "zero mean" and it is shifted or lagged downwardly by three seismic samples 36. In FIG. 18, in order to perform the cross correlation operation, a "shift and cross multiply and add" operation is performed, and, when the "seismic trace 1" 32 (which has a "zero mean") is successively cross correlated with each of the "seismic traces 2" 34a through 34d (each of which have a "zero mean" and are successively "lagged" downwardly in FIG. 18), a "Zero Mean Lagged Cross Correlation (ZMLCC)" function 38 is produced.

For example, in FIG. 18, "seismic trace 1" 32 and "seismic trace 2" 34a are cross correlated by cross multiplying and adding (no shifting required here) thereby producing a first zero mean lagged cross correlation value 38a, "seismic trace 1" 32 and "seismic trace 2" 34b are cross correlated by shifting and cross multiplying and adding thereby producing a second zero mean lagged cross correlation value 38b, "seismic trace 1" 32 and "seismic trace 2" 34c are cross correlated by shifting and cross multiplying and adding thereby producing a third zero mean lagged cross correlation value 38c, and "seismic trace 1" 32 and "seismic trace 2" 34d are cross correlated by shifting and cross multiplying and adding thereby producing a fourth zero mean lagged cross correlation value 38d. By applying a curve to each of the peaks of the first, second, third, and fourth zero mean lagged cross correlation values 38a–38d in FIG. 18, a "zero mean lagged cross correlation (ZMLCC) function" 38 is produced. In FIG. 18, note that the "second zero mean lagged cross correlation" value 38b is the "Most Positive" Zero Mean Lagged Cross Correlation, the "Most Positive Zero Mean Lagged Cross Correlation" being hereinafter denoted by the term: "(ZMLCC)max".

In FIG. 19, another "Zero Mean Lagged Cross Correlation (ZMLCC) function 38 is illustrated. The "most positive zero mean lagged cross correlation" or "(ZMLCC)max" is the highest or greatest amplitude of the ZMLCC function 38. The term "t lag" is the time-distance between the "zero point" and the "most positive zero mean lagged cross correlation".

In FIG. 20, the "seismic trace 1" 32 is cross correlated with "seismic trace 2" 34 in the manner discussed above with respect to FIGS. 18 and 19 to produce the (ZMLCC) function 38. However, for the purpose of defining terms, the "autocorrelation of seismic trace 1" 32 is "(AC1)", and the "autocorrelation of seismic trace 2" 34 is "(AC2)". In FIG. 20, an "autocorrelation" of a seismic trace is defined. That is, taking "seismic trace 1" 32 as an example, "seismic trace 1" undergoes "autocorrelation" when "seismic trace 1" undergoes a mathematical operation consisting of "cross multiply and add (no shifting)" with "seismic trace 1" to thereby produce the "autocorrelation function of seismic trace 1", which we have defined to be "(AC1)". The "Geometric mean" of "(AC1)" and "(AC2)" has been defined to be $\sqrt{(AC1)(AC2)}$.

In FIG. 20, therefore, the term "coherency", otherwise known as the "coherency-similarity", between "seismic trace 1" 32 and "seismic trace 2" 34 is defined as follows:

$$\frac{(ZMLCC)\text{max}}{\sqrt{(AC1)(AC2)}} = P(t, tlag)$$

By definition, the term "Px(t, tlagx)" is defined to be the "coherency or coherency/similarity in the x-direction", and the term "Py(t, tlagy)" is defined to be the "coherency or coherency/similarity in the y-direction".

Figure 21:
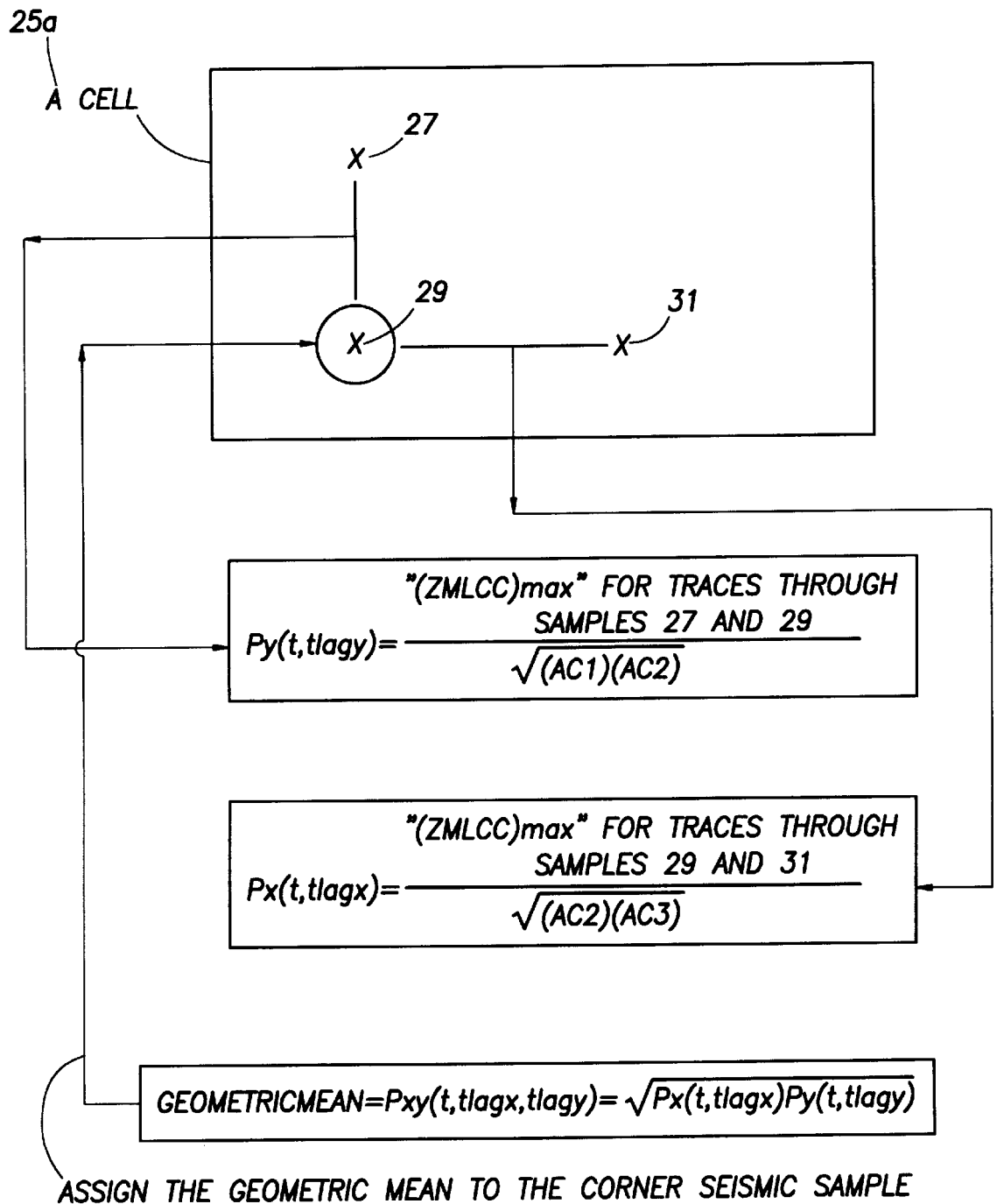

In FIG. 21, utilizing the above concepts, a cell 25a is illustrated. A cross correlation is performed between seismic trace 1 (27) and seismic trace 2 (29) to produce a "coherency value in the y-direction" which is defined to be the term "Py(t, tlagy)". Then, a cross correlation is performed between seismic trace 2 (29) and seismic trace 3 (31) to produce a "coherency value in the x-direction" which is defined to be the term "Px(t, tlagx)". A "Geometric Mean" is then calculated which is defined to be the square root of the coherency value in the x-direction "Px(t, tlagx)" multiplied by the coherency value in the y-direction "Py(t, tlagy)". That "Geometric mean" is then assigned to the corner seismic data sample "x" for seismic trace 2 (29).

In FIG. 22, when the "Geometric mean" associated with all the cells 25a of FIGS. 3 through 11 have been determined in the manner described above with reference to FIGS. 16 through 22, those "geometric mean" values are plotted on a "horizontal time slice map of 3-D seismic data", and a representation of that horizontal time slice "map" is shown in FIG. 22.

Referring to FIGS. 23 through 39, in accordance with the present invention, another "second mathematical operation" is performed in each of the cells 25a, 25b, and 25c of FIGS. 3 through 12 for the purpose of determining a value or result to assign to each seismic data sample "x" in the cube. That "second mathematical operation", performed in each of the cells 25 of each time slice in the cube of FIG. 3 in accordance with the present invention, is discussed below with reference to FIGS. 23 through 39 of the drawings.

The following paragraphs with reference to FIGS. 23 through 39 will discuss the structure and the functional operation of the "variance cube" software in accordance with the present invention when the variance cube software is executed by a processor of a computer workstation.

Figure 23:
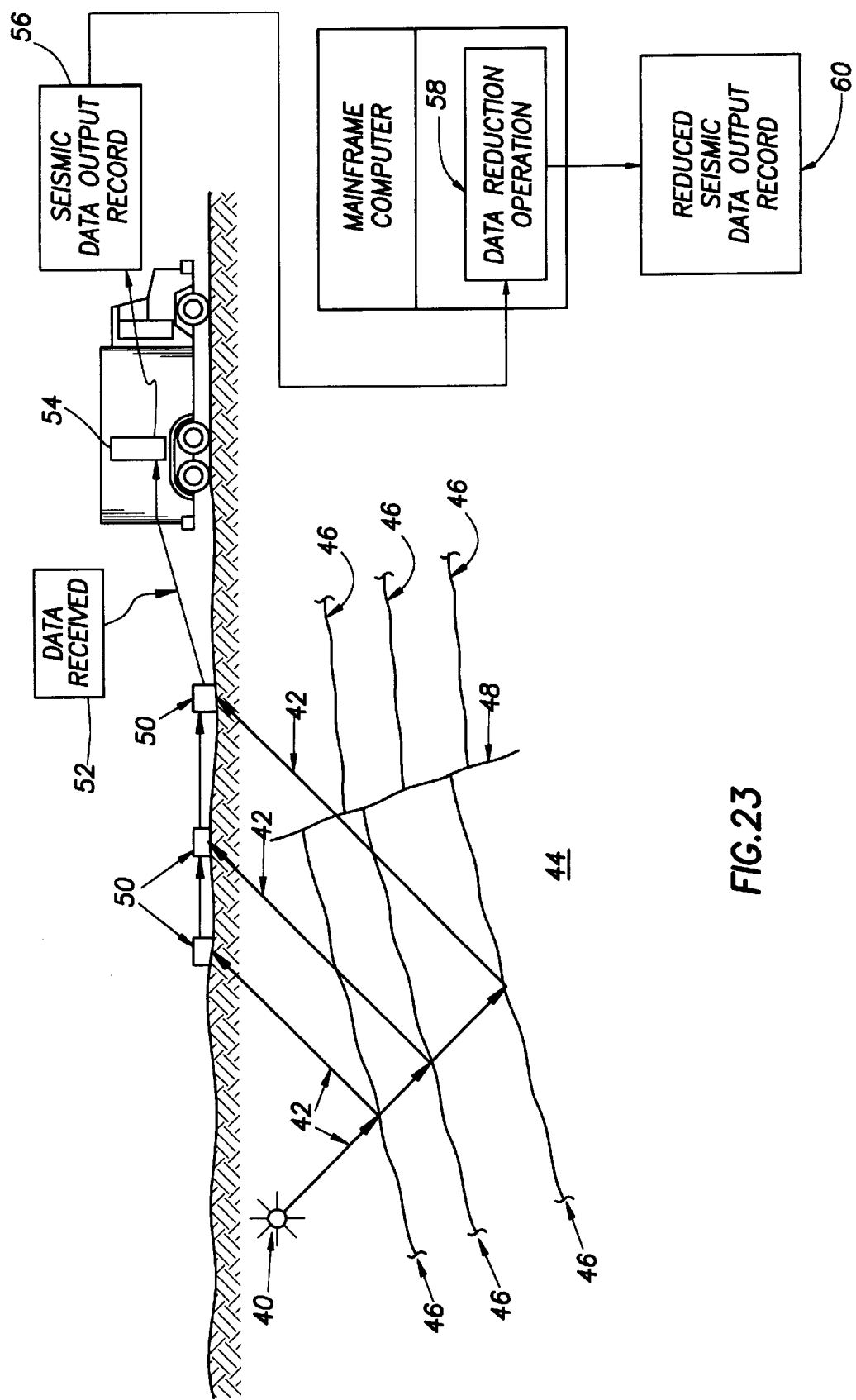
FIG. 23 illustrates a seismic operation where the resultant seismic data output record undergoes data reduction to produce a reduced seismic data output record.

In FIG. 23, an explosive energy source 40 produces a sound vibration 42 which reflects off a horizon 46 of an earth formation 44 which is separated by a fault 48. The sound vibrations 42 are received by geophone receivers 50 thereby producing an electrical signal representing data received 52. The data received signal 52 is received by a computer 54 of a recording truck, that computer 54 generating a seismic data output record 56. The seismic data output record 56 undergoes a data reduction operation 58 in a mainframe computer thereby producing a reduced seismic data output record 60.

In FIG. 24, a workstation computer 62 is illustrated in FIG. 24. The workstation computer 62 includes a processor 62a, a memory 62b which stores a "Variance Cube software" 64 in accordance with the present invention, and a recorder or display device 62c. The reduced seismic data output record 60 is received by a system bus of the workstation 62 and that record 60 is made available to the workstation processor 62a during the processor's execution of the Variance Cube software 64 of the present invention. The Variance Cube software 64 is initially stored on program storage device, such as a CD-Rom. That program storage device, having the Variance Cube software stored thereon, is inserted into the workstation 62 and the Variance Cube software is then loaded from the program storage device into the memory 62b of the workstation 62 for subsequent execution by the processor 62a. When the "Variance Cube software" 64 is executed by the processor 62a, the recorder or display device 62c can print or display a map, such as a time slice map, which reflects the geologic characteristics of the slice (such as time slice 19 of FIG. 2). These maps, such as the time slice maps, which are generated by the "Variance Cube software" of the present invention are illustrated in FIGS. 35 through 39. The "Variance Cube" software 64 will be discussed below in connection with the "second mathematical relation" and a plurality of seismic traces which intersect a time slice at a particular reflection time "j".

In accordance with the present invention, a set of values or results are computed by a second mathematical relation and such values or results are assigned to each seismic data sample "x" in each 'cell' on each time slice of a cube (such as cells 25a and 25b and 25c on time slices 19 and 21 and 23 of cube 17 of FIGS. 3 through 12). Such values or results are computed using the following "second mathematical relation":

$$\sigma_t^2 = \sum_{j=t-L/2}^{j=t+L/2} \left[ w_{j-t} \cdot \frac{\sum_{i=1}^{I}(x_{ij}-\bar{x}_j)^2}{\sum_{i=1}^{I}(x_{ij})^2} \right]$$

Such values or results, that are assigned to each seismic data sample "x" in each cell on each time slice of a cube (such as cells 25a and 25b and 25c on time slices 19 and 21 and 23 of cube 17 of FIGS. 3 through 12), can also be calculated by using the following slightly modified version of the "second mathematical relation":

$$\sigma_t^2 = \frac{\sum_{j=t-L/2}^{j=t+L/2} w_{j-t} \sum_{i=1}^{I}(x_{ij}-\bar{x}_j)^2}{\sum_{j=t-L/2}^{j=t+L/2} w_{j-t} \sum_{i=1}^{I}(x_{ij})^2}$$

The following example with reference to FIG. 25 will demonstrate how the above "second mathematical relation" in accordance with the present invention is used to calculate the values or results that are assigned to each seismic data sample "x" of each cell 25a–25c in the cube 17 of FIGS. 3 through 12.

In FIG. 25, nine seismic data samples "x" are enclosed by the cell 25a (or the cells 25b and 25c) of time slice 19 (or time slice 21 or 23) of FIGS. 3 through 12. An amplitude of a particular seismic data sample is denoted generically by the notation "$X_{ij}$", where "x" is an amplitude, the "i" denotes a particular seismic trace having that amplitude "x", and the "j" denotes a particular reflection time along that particular seismic trace "i" (e.g., the "j" would be a reflection time for a seismic data sample along seismic trace "i"). In FIG. 25, the amplitude $X_{ij}$ of seismic data sample 1 "x" on the time slice 19 is "x(1)". In addition, in FIG. 25, the amplitude $X_{ij}$, of seismic data sample 2 "x" on time slice 19 is "x(2)", the amplitude $X_{ij}$ of seismic data sample 3 "x" on time slice 19 is "x(3)", . . . , and the amplitude $X_{ij}$ of seismic trace 9 "x" on time slice 19 is "x(9)". In FIG. 25, the following table summarizes the amplitudes $X_{ij}$ of each of the seismic data samples 1 through 9 in the cell 25a of time slice 19 in FIG. 25:

| Seismic data sample | Amplitude of the sample for trace "i" and time "j" |
| --- | --- |
| 1 | $X_{ij}$ = X(1) |
| 2 | $X_{ij}$ = X(2) |
| 3 | $X_{ij}$ = X(3) |
| 4 | $X_{ij}$ = X(4) |
| 5 | $X_{ij}$ = X(5) |
| 6 | $X_{ij}$ = X(6) |
| 7 | $X_{ij}$ = X(7) |
| 8 | $X_{ij}$ = X(8) |
| 9 | $X_{ij}$ = X(9) |

In FIG. 25, the average of each of these amplitudes is defined to be $\bar{X}_j$, where the "j" refers to the particular time slice (recall, in a cube, a plurality of time slices pass through a plurality of corresponding seismic data samples at time "j"). Therefore, in our example of FIG. 25, the average "$\bar{X}_j$" of each of these amplitudes is defined as follows:

$\bar{X}_j = [x(1)+x(2)+x(3)+x(4)+x(5)+x(6)+x(7)+x(8)+x(9)]/9$

Next, in FIG. 25, the average $\bar{X}_j$ is subtracted from each amplitude in the above table. Therefore, for seismic data sample 1, the following 'subtraction' takes place:

$(X(1)-\bar{X}_j)$

Similarly, for seismic data samples 2 through 9, the following 'subtractions' take place:

$(X(2)-\bar{X}_j)$, $(X(3)-\bar{X}_j)$, $(X(4)-\bar{X}_j)$, $(X(5)-\bar{X}_j)$, $(X(6)-\bar{X}_j)$, $(X(7)-\bar{X}_j)$, $(X(8)-\bar{X}_j)$, and $(X(9)-\bar{X}_j)$ Next, in FIG. 25, the sum of the squares of each 'subtraction' is calculated; that is:

$$\sum_{i=1}^{I}(x_{ij}-\overline{x}_j)^2 = (x(1)-\overline{x}_j)^2 + (x(2)-\overline{x}_j)^2 +$$
$$(x(3)+\overline{x}_j)^2 + \ldots + (x(9)-\overline{x}_j)^2$$

Next, in FIG. 25, the sum of the squares of the amplitudes of the seismic data samples "x" is calculated, as follows:

$$\sum_{i=1}^{I}(x_{ij})^2 = [x(1)]^2 + [x(2)]^2 + [x(3)]^2 + \ldots + [x(9)]^2$$

Finally, the value or result (which is hereinafter known as the "variance value" and is denoted by the symbol "$\sigma_t^2$" that is assigned to the center sample 72 of the nine seismic data samples "x" in the cell 25a of FIG. 25 is calculated as follows:

$$\sigma_t^2 \approx \frac{\sum_{i=1}^{I}(x_{ij}-\overline{x}_j)^2}{\sum_{i=1}^{I}(x_{ij})^2}$$

$$= \frac{(x(1)-\overline{x}_j)^2 + (x(2)-\overline{x}_j)^2 + (x(3)+\overline{x}_j)^2 + \ldots + (x(9)-\overline{x}_j)^2}{[x(1)]^2 + [x(2)]^2 + [x(3)]^2 + \ldots + [x(9)]^2}$$

In FIG. 25, using our simple example, the variance value "$\sigma_t^2$" is assigned to the center seismic data sample 72 which is associated with seismic trace 5 and has the amplitude of "x(5)".

Note the above equation $$\sigma_t^2 \approx \frac{\sum_{i=1}^{I}(x_{ij}-\overline{x}_j)^2}{\sum_{i=1}^{I}(x_{ij})^2}.$$

Recall the "second mathematical relation":

$$\sigma_t^2 = \sum_{j=t-L/2}^{j=t+L/2}\left[w_{j-t} \cdot \frac{\sum_{i=1}^{I}(x_{ij}-\overline{x}_j)^2}{\sum_{i=1}^{I}(x_{ij})^2}\right]$$

which has been used to calculate the "variance value" that is assigned to the center seismic data sample 72 in FIG. 25. Comparing the above equation with the "second mathematical relation", the only difference is the term "$W_{j-t}$". That term "$W_{j-t}$" is a "triangular weighting function". The function of the triangular weighting function will be discussed below with reference to FIG. 28.

In FIG. 26, the variance value "V" which is equal to "$\sigma_t^2$" is assigned to the center seismic data sample 72 of the nine seismic data samples enclosed by the cell 25a in FIG. 25. Recall from FIGS. 3 through 12 that a plurality of cells 25a, 25b, 25c are sequentially moving or progressing in rows along a plurality of time slices and a corresponding plurality of variance values "V" are calculated for each center seismic data sample "x" in each cell (25a, 25b, 25c).

In FIG. 27, therefore, for a particular time slice, such at time slice 19, when a variance value (V) is calculated for each of the plurality of center seismic data samples "x" 72 for the plurality of sequentially progressing cells 25a on the time slice 19 (that sequential progression being illustrated in FIGS. 3 through 12), the result is a "map" of the time slice 19 through the cube 17 of FIG. 3. That "map" of time slice 19 is illustrated generically in FIG. 27.

The discussion set forth above in connection with FIGS. 25 through 27 described how a "variance value" (V) is assigned to each of the seismic data samples "x" in a cube (i.e., a cubic volume of earth), and how a map of each slice through that cube can be generated. However, when the above identified "second mathematical relation" calculation takes place, the triangular weighting function "$W_{j-t}$" is included in that calculation. The following discussion with reference to FIG. 28 will discuss the involvement of the triangular weighting function "$W_{j-t}$" in that calculation.

Figure 28:
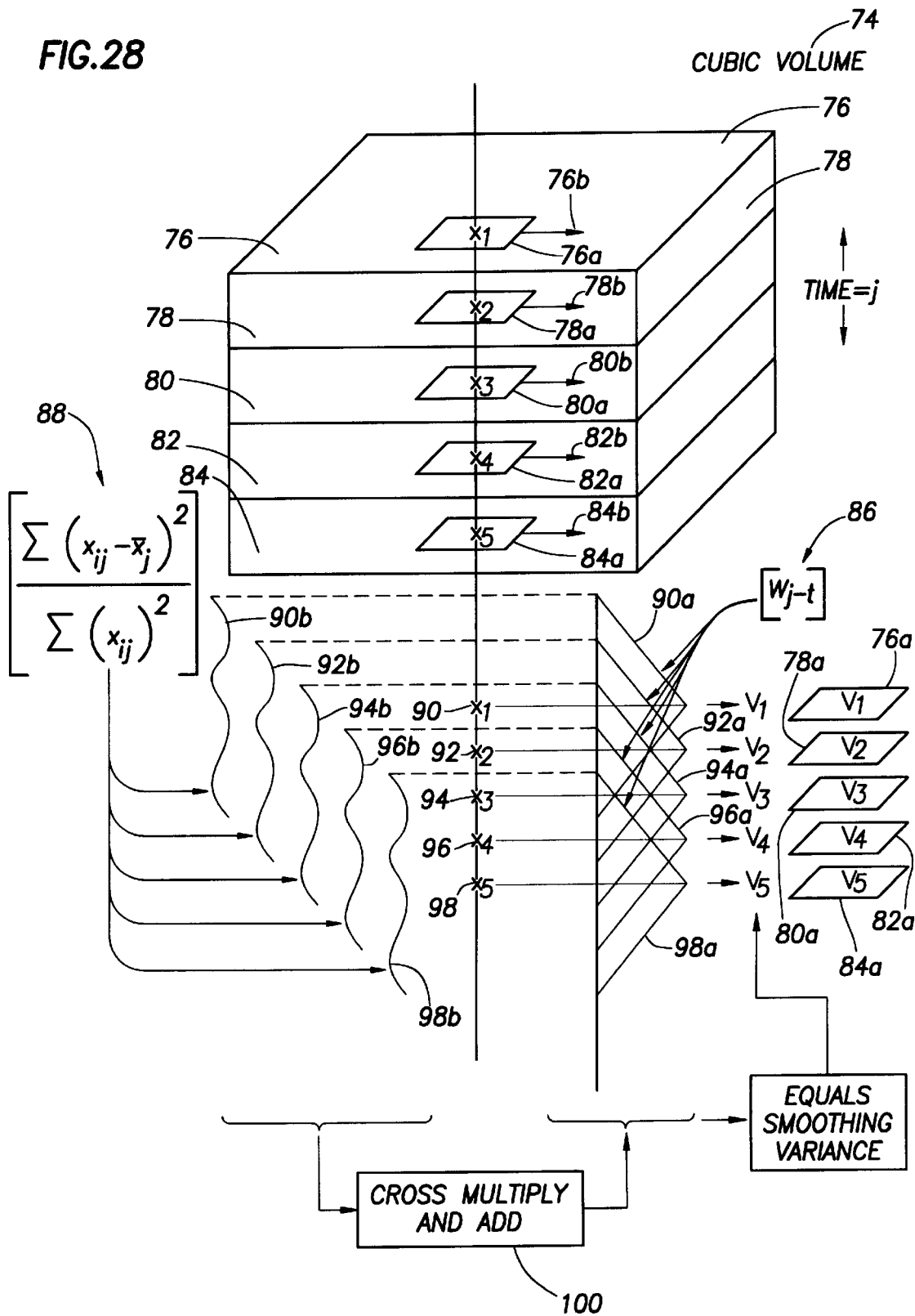

In FIG. 28, a cubic volume of earth 74 (a cube 74) is divided into five time slices 76, 78, 80, 82, and 84. As noted earlier, plurality of cells (25a, 25b, 25c of FIGS. 3 through 12) sequentially progress along a time slice (19, 21, 23) and, during that sequential progression, a corresponding plurality of variance values "V" are calculated for each of the center seismic data samples "x" (72 of FIG. 25) associated with each of the cells. In FIG. 28, a plurality of cells 76a, 78a, 80a, 82a, and 84a, associated with the plurality of time slices 76, 78, 80, 82, and 84 in the cube 74 begin their sequential progression, the cells 76a–84a moving, in synchronism, from left to right, in their respective time slices 76-84, as denoted by the arrows 76b–84b. In FIG. 28, the "center seismic data samples" (72 of FIG. 25) in the cells 76a–84a are denoted by "X1" through "X5". Recall the "second mathematical relation":

$$\sigma_t^2 = \sum_{j=t-L/2}^{j=t+L/2}\left[w_{j-t} \cdot \frac{\sum_{i=1}^{I}(x_{ij}-\overline{x}_j)^2}{\sum_{i=1}^{I}(x_{ij})^2}\right]$$

where the "smoothing" variance value $\sigma_t^2$ is assigned to the center seismic data sample 72 of FIG. 25. In FIG. 28, the "smoothing" variance value $\sigma_t^2$ is a function of two parts: (1) a triangular weighting part 86, and (2) a variance part 88, that is:

Smoothing variance value "V"=$\sigma_t^2$=(triangular weighting part 86)(variance part 88)
where
the triangular weighting part 86=$W_{j-t}$; and $$\text{the variance part } 88 = \frac{\sum_{i=1}^{I}(x_{ij}-\overline{x}_j)^2}{\sum_{i=1}^{I}(x_{ij})^2}.$$

In FIG. 28, the triangular weighting part 86 and the variance part 88 for each of the "center seismic data samples" X1 through X5 is illustrated. For example, in FIG. 28, locate the center seismic data sample X1 (identified by element numeral 90), center seismic data sample X2 (element numeral 92), center seismic data sample X3 (numeral 94), center seismic data sample X4 (numeral 96), and center seismic data sample X5 (numeral 98). Associated with center seismic data sample X1 (90), locate its corresponding triangular weighting part 90a and its variance part 90b; then, for center seismic data sample X2 (92), locate its corresponding triangular weighting part 92a and its variance part 92b; and for center seismic data sample X3 (94), locate its corresponding triangular weighting part 94a and its variance part 94b; and for center seismic data sample X4 (96), locate its corresponding triangular weighting part 96a and its variance part 96b; and for center seismic data sample X5 (98), locate its corresponding triangular weighting part 98a and its variance part 98b. Each of the variance parts 90b through 98b undergo a "cross multiply and add" operation 100 with its corresponding triangular weighting parts 90a through 98a to thereby yield the "smoothing" variance values "V1" through "V5". For example, variance part 90b undergoes the cross multiply and add operation 100 with the triangular weighting part 90a to yield the "smoothing" variance value "V1". Similarly, variance part 92b undergoes the cross multiply and add operation 100 with the triangular weighting part 92a to yield the "smoothing" variance value "V2". Variance part 94b undergoes the cross multiply and add operation 100 with the triangular weighting part 94a to yield the "smoothing" variance value "V3". Variance part 96b undergoes the cross multiply and add operation 100 with the triangular weighting part 96a to yield the "smoothing" variance value "V4". Variance part 98b undergoes the cross multiply and add operation 100 with the triangular weighting part 98a to yield the "smoothing" variance value "V5". Smoothing variance value V1 is assigned to the center seismic data sample X1 of cell 76a and a unique color is assigned to the variance value V1. Similarly, smoothing variance value V2 is assigned to the center seismic data sample X2 of cell 78a and another unique color is assigned to the variance value V2.

Smoothing variance value V3 is assigned to the center seismic data sample X3 of cell 80a and another unique color is assigned to the variance value V3. Smoothing variance value V4 is assigned to the center seismic data sample X4 of cell 82a and another unique color is assigned to the variance value V4. Smoothing variance value V5 is assigned to the center seismic data sample X5 of cell 84a and another unique color is assigned to the variance value V5.

In FIGS. 35 through 39, realistic examples of slices, such as time slices, through the cube 17 of FIG. 12 are illustrated.

Figure 29:
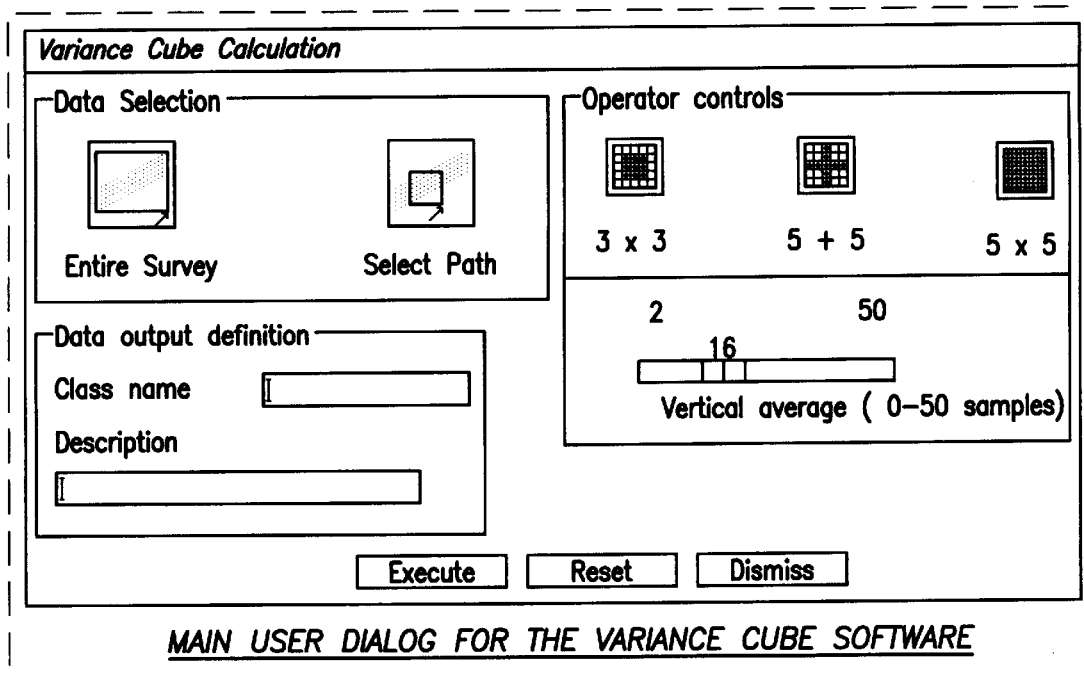
FIGS. 29 through 31 illustrate a set of user interface dialogs which are presented to the operator of the computer workstation of FIG. 24 via the "recorder or display device" when the variance cube software of the present invention is being executed.
Figure 30:
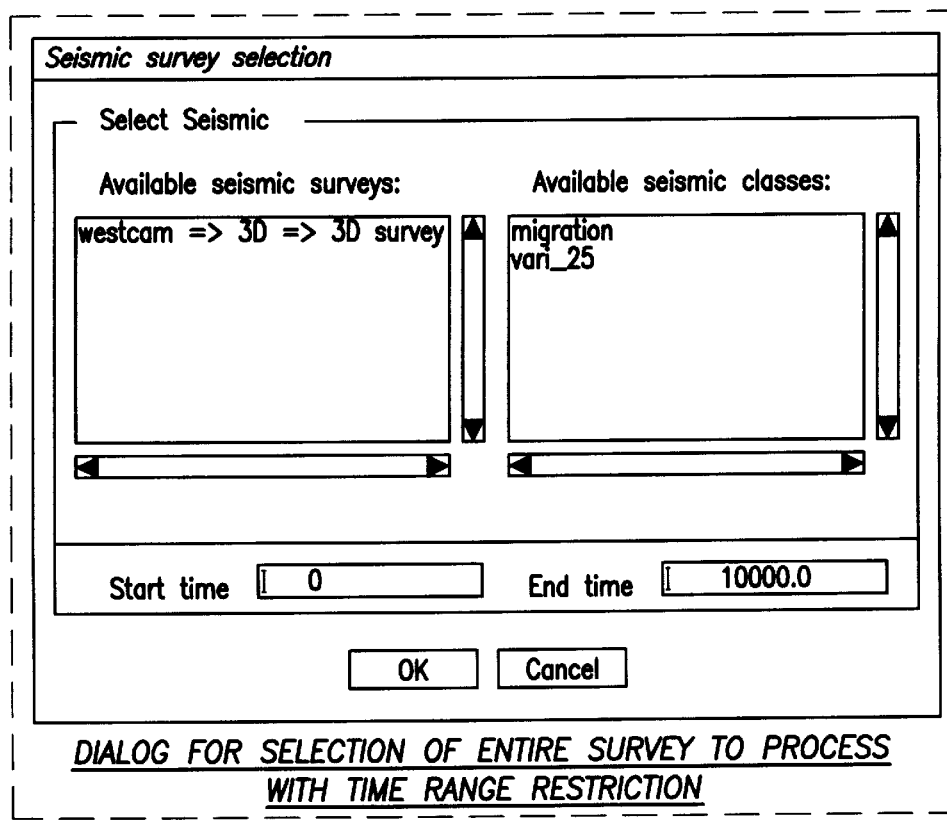
Figure 31:
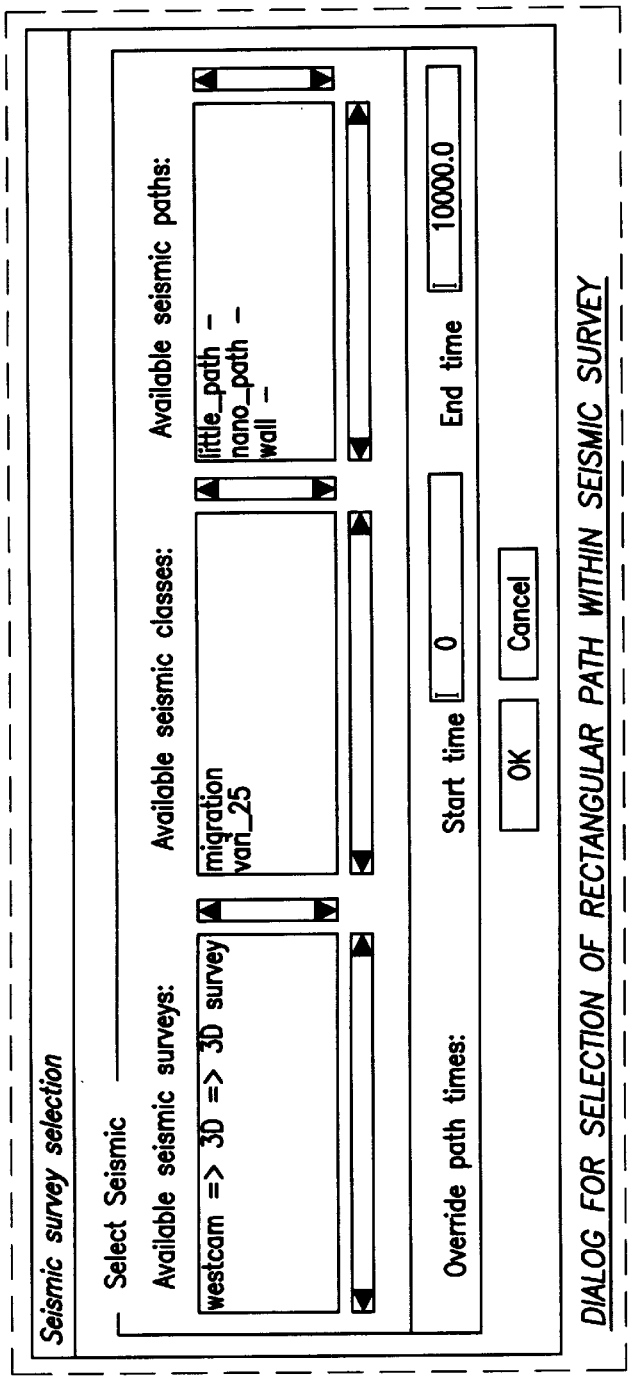

In FIGS. 29 through 31, a plurality of user interface dialogs which are presented to the operator of workstation 62 via the recorder or display device 62c of FIG. 24 are illustrated.

In FIGS. 29 through 31, the parameter requirements for the Variance Cube software 64 of FIG. 24 are: Area of Interest (AOI), Variance Window length, and Output Volume Name. These parameter selections are illustrated in FIGS. 29, 30, and 31. In FIG. 29, the user/operator has the option to select the Area of Interest (AOI) as the entire survey or from a subset of the survey. The "Entire Survey" button in FIG. 29, when selected or "clicked on", will bring up the dialog of FIG. 30, the dialog of FIG. 30 allowing the user operator to select any available 3D seismic survey and, additionally, to set a restrictive time range over which to compute the variance cube values. In FIG. 29, if the user wishes to process only a portion of a 3D seismic survey, they may press the "Select Path" button from the main dialog of FIG. 29. This selection will invoke the dialog box of FIG. 30. The dialog box of FIG. 31 also allows the selection of a previously defined rectangular path, restricting the inline and crossline ranges, in addition to the time range restriction which is still allowed. In FIG. 29, with the input data and the data range defined, the user can now select the processing parameters for the variance cube calculation. The right side of FIG. 29 shows the operator controls. The icons on the right side of FIG. 29 illustrate the user's options to select the specific input seismic traces to use in the calculation of variance. The three options shown are: 3×3, 5+5, and 5×5. The variance cube calculation outputs the results for one trace at a time, but it uses the 'surround traces' in the computation of the variance value. For example, as illustrated in FIG. 25, using the 3×3 operator, the 'variance cube' algorithm will use the sample values from the eight traces which surround the center trace (or operator trace), as the icon illustrates. As we process from one trace to the next adjacent trace, the original input seismic data is used for the eight traces which surround the new trace, etc. In FIG. 29, the other parameter setting at the user's control is labelled "vertical average" on the main dialog. This parameter is used in the algorithm to set the number of samples (such as eight in FIG. 25), which are located above and below the sample at which the calculation is currently being performed, to use in the variance calculation. Finally, the user must name the output variance volume.

Figure 32:
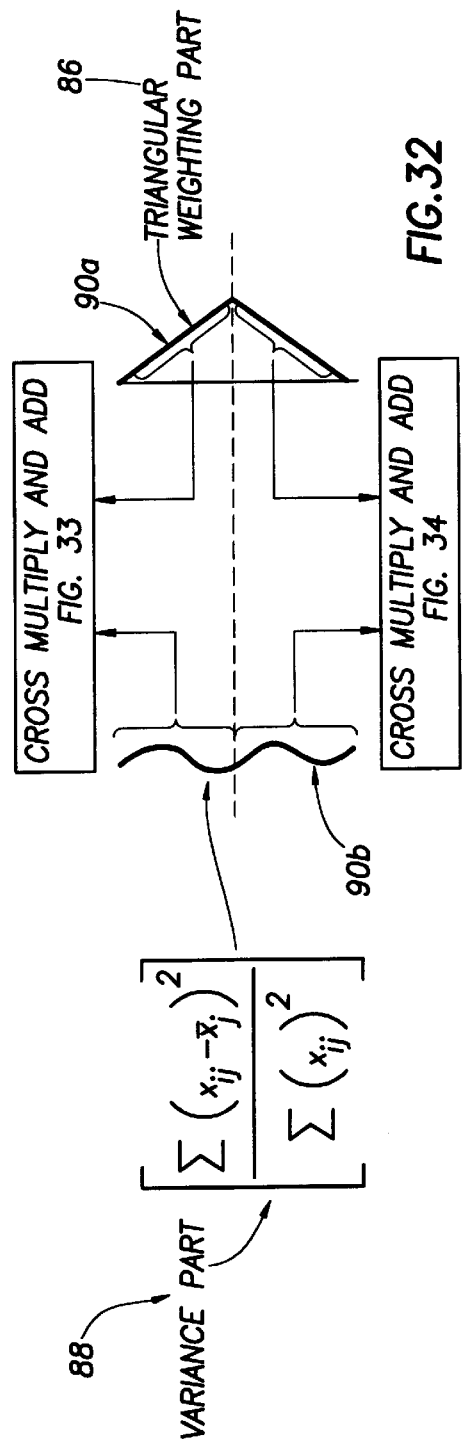
FIG. 32 explains the structure of a flowchart depicting the structure of the "variance cube software" of the present invention of FIGS. 33 and 34.
Figure 33:
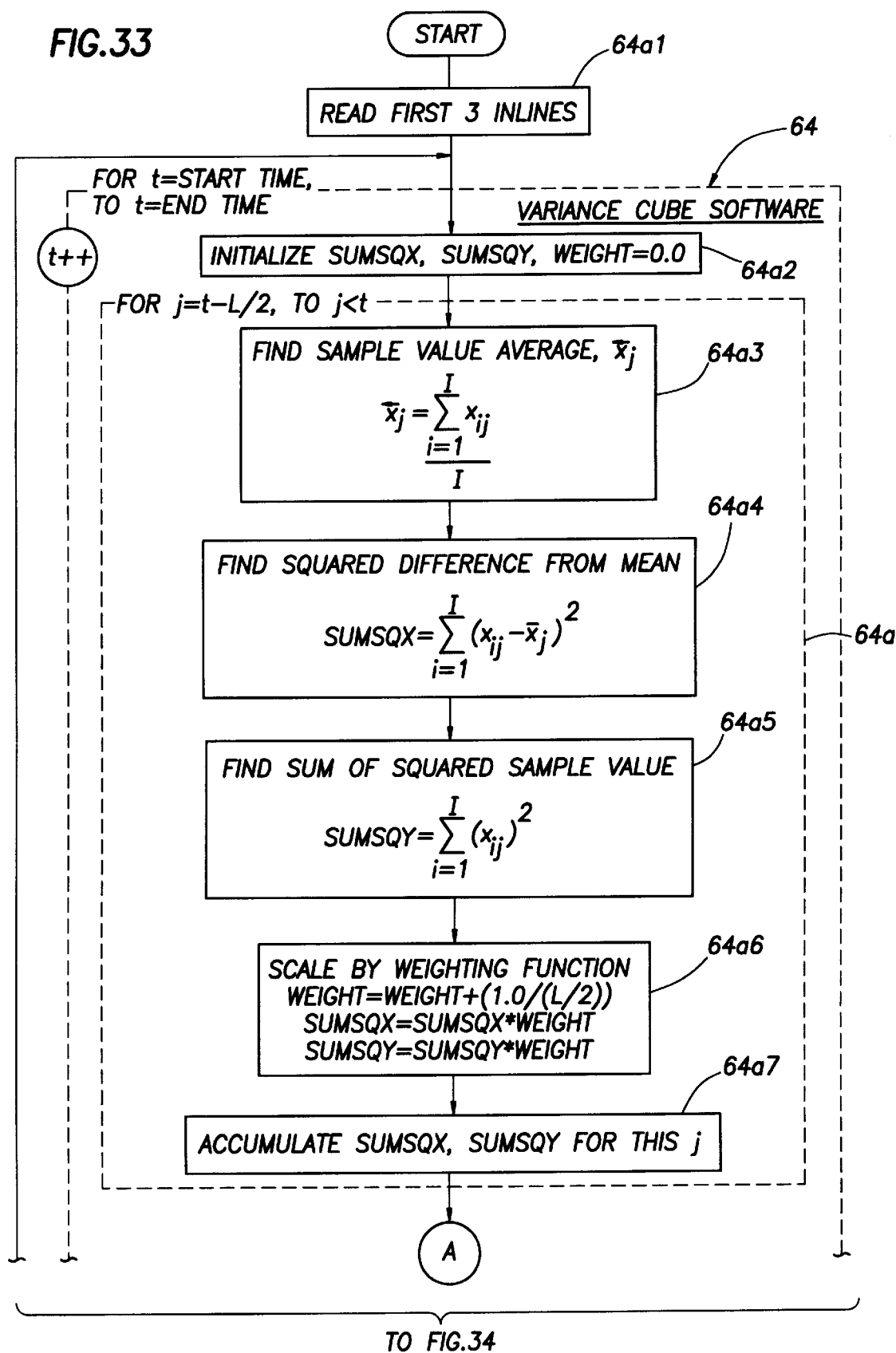
FIGS. 33 and 34 illustrate a flowchart depicting the structure of the "variance cube software" of the present invention.
Figure 34:
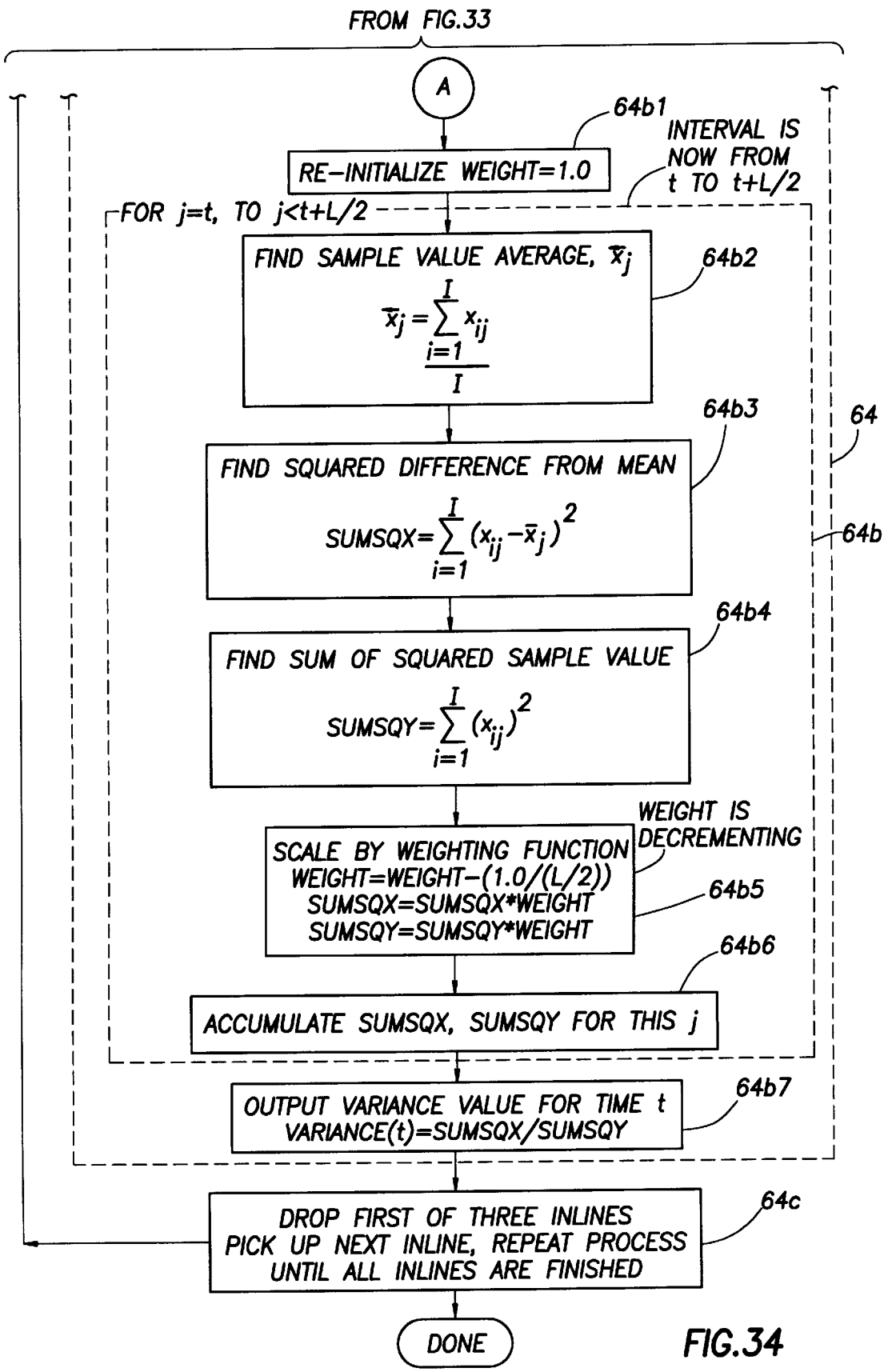
Figure 35:
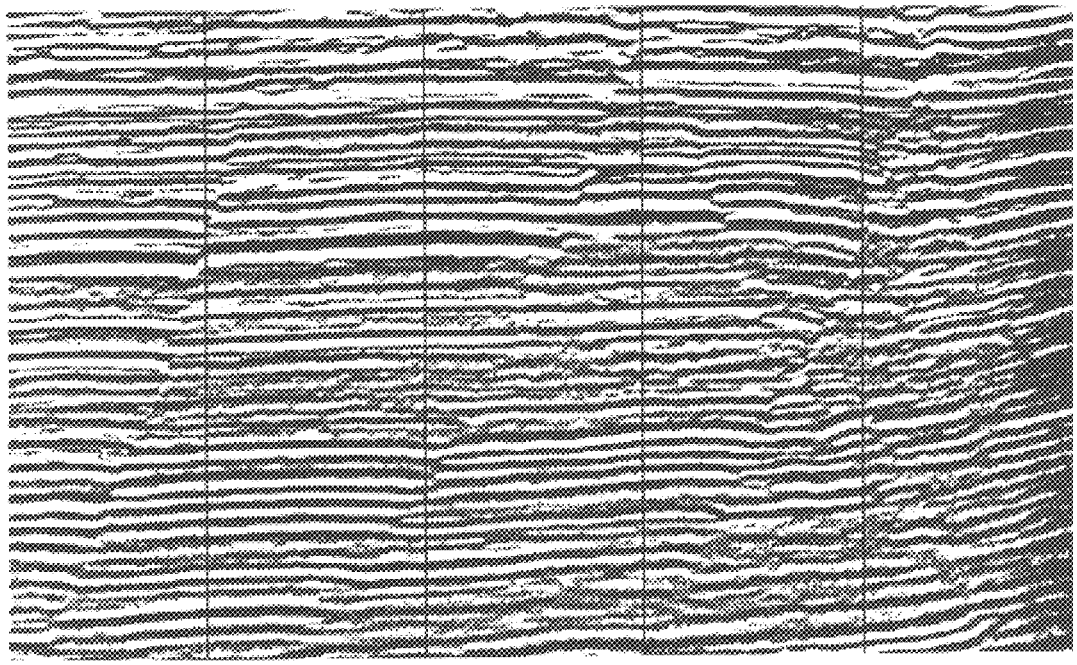
FIGS. 35 through 39 illustrate different "maps", such as time slice maps, which are generated by the recorder or display device of FIG. 24 when the "variance cube software" of the present invention is executed by the workstation processor of FIG. 24.
Figure 36:
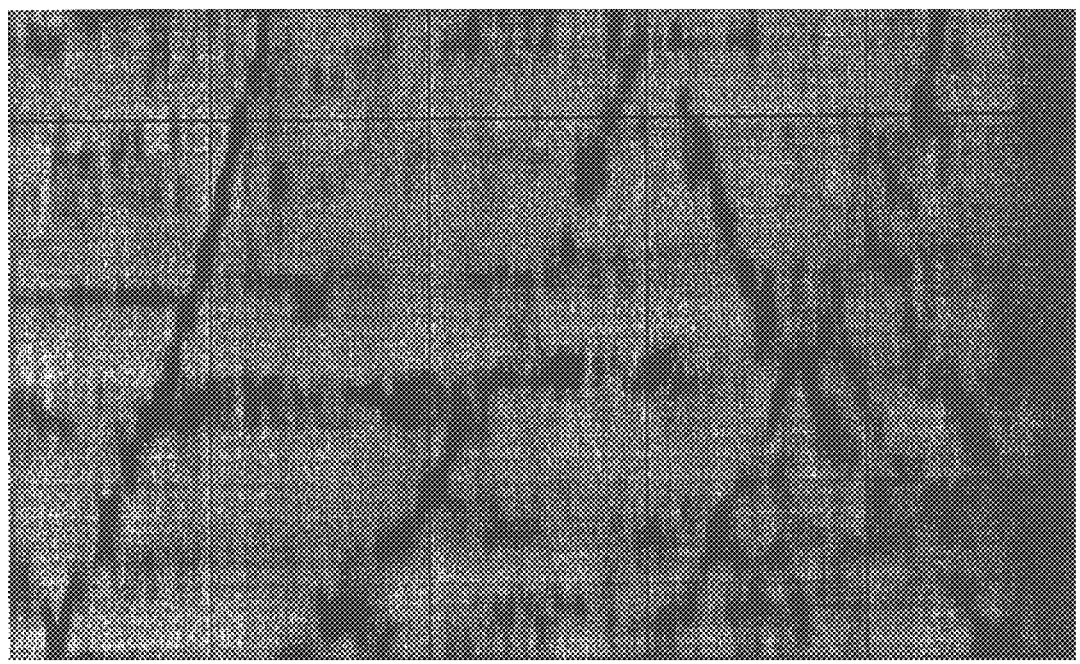
Figure 37:
Figure 38:
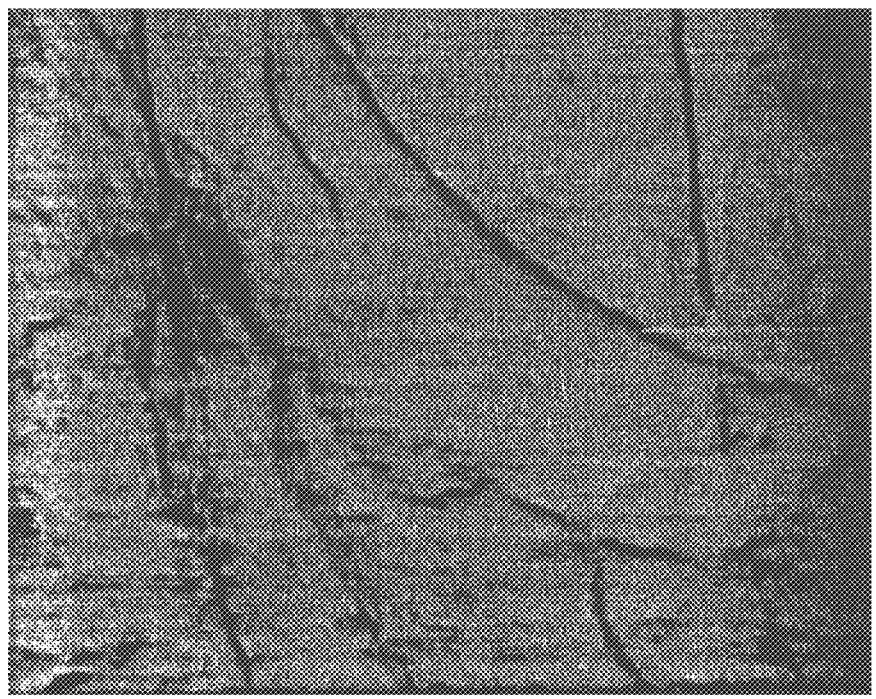
Figure 39:
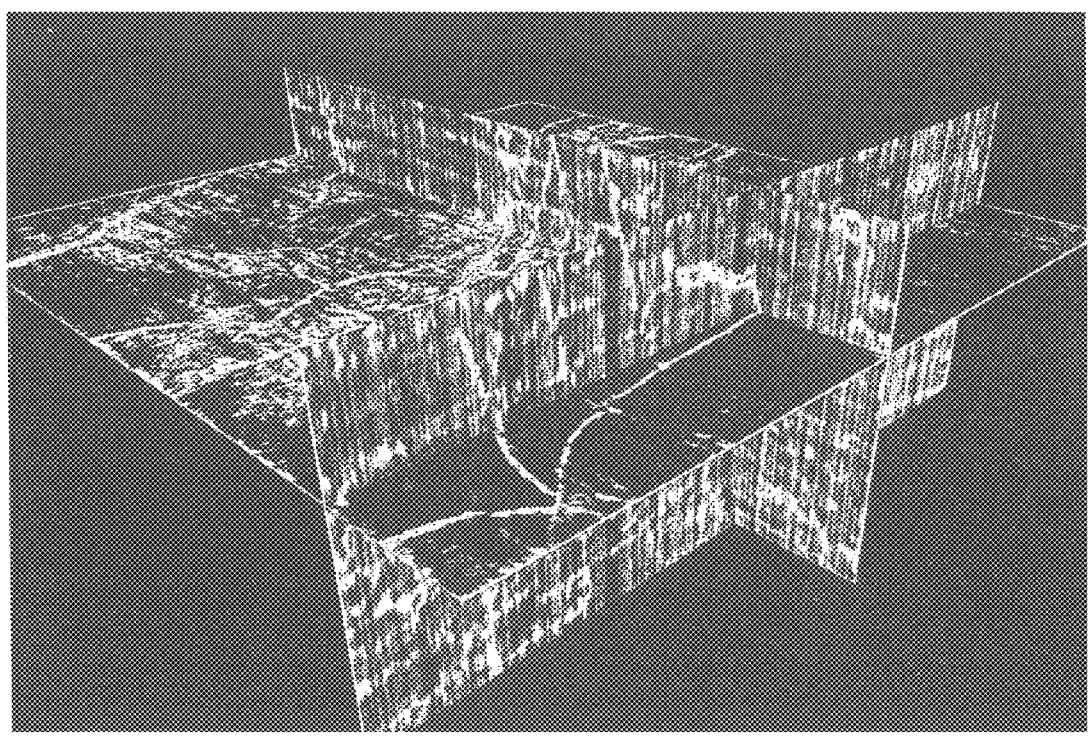

In FIG. 32, before beginning to discuss the flowcharts of FIGS. 33 and 34 which depict the structure of the "variance cube" software 64 of FIG. 24 of the present invention, FIG. 32 explains the two-part structure of the flowcharts, namely, the first flowchart of FIG. 33 and the second flowchart of FIG. 34. In FIG. 32, the triangular weighting part 86 and the variance part 88 of FIG. 28 is again illustrated; however, in FIG. 32, only the one triangular weighting part 90a and its one corresponding variance part 90b is illustrated for purposes of this discussion. Still referring to FIG. 32, recall from FIG. 28 that the variance part 90b undergoes a "cross multiply and add" operation 100 with respect to the triangular weighting part 90a to yield a "smoothing" variance "V1" which is assigned to the center seismic data sample "X1" of cell 76a of FIG. 28. Refer now to FIGS. 33 and 34 and note that this flowchart comprises a first flowchart of FIG. 33 and a second flowchart of FIG. 34. Referring back to FIG. 32, when the first flowchart of FIG. 33 is executed, the top half of the variance part 90b undergoes the cross multiply and add operation 100 with respect to the top half of the triangular weighting part 90a; and, when the flowchart of FIG. 34 is executed, the bottom half of the variance part 90b undergoes the cross multiply and add operation 100 with respect to the bottom half of the triangular weighting part 90a.

In addition, before beginning to discuss the flowcharts of FIGS. 33 and 34, recall again the following "second mathematical relation" in accordance with the present invention which was used to calculate the "smoothing variance values" $\sigma_t^2$ that are assigned to the center seismic data samples "X1–X5" of the cells (76a–84a in FIG. 28) on the time slices (76–84 of FIG. 28) for the purpose of generating the cube of FIG. 12 and the time slice maps of FIGS. 13–15, as follows:

$$\sigma_t^2 = \sum_{j=t-L/2}^{j=t+L/2} \left[ w_{j-t} \cdot \frac{\sum_{i=1}^{I}(x_{ij} - \bar{x}_j)^2}{\sum_{i=1}^{I}(x_{ij})^2} \right]$$

where:

$\sigma_t^2$ is a variance value, $W_{j-t}$ is a triangular weighting function, where the sum of said weighting functions is unity:

$$\sum_{l=-L/2}^{l=L/2} w_l = 1.0$$

$$\sum_{i=1}^{I}(x_{ij}-\bar{x}_j)^2$$

is the sum of the squares of each subtraction or the sum of the squares of a plurality of differences, $$\sum_{i=1}^{I}(x_{ij})^2$$

is a sum of the squares of a plurality of amplitudes of a corresponding plurality of seismic data samples in each cell (i.e., cells 25a, 25b, 25c of FIGS. 3–11),
$X_{ij}$ is the amplitude of each seismic data sample in a cell (25a–25c), and
$\bar{X}_j$ is the average of the amplitudes of all the seismic data samples in a cell.

The above "second mathematical relation" can also be expressed or set forth in a slightly different form (hereinafter called an "additional second mathematical relation") which can also be used to calculate the "smoothing variance values" $\sigma_t^2$ that are assigned to the center seismic data samples "X1–X5" of the cells (76a–84a in FIG. 28) on the time slices (76–84 in FIG. 28) for generating the time slice maps of FIGS. 13–15, the "additional second mathematical relation" being set forth below, as follows:

$$\sigma_t^2 = \frac{\sum_{j=t-L/2}^{j=t+L/2} w_{j-t} \sum_{i=1}^{I}(x_{ij}-\bar{x}_j)^2}{\sum_{j=t-L/2}^{j=t+L/2} w_{j-t} \sum_{i=1}^{I}(x_{ij})^2},$$

where:
$\sigma_t^2$ is the variance value,
$W_{j-t}$ is the triangular weighting function, $$\sum_{i=1}^{I}(x_{ij}-\bar{x}_j)^2$$

is a sum of the squares of each subtraction or the sum of the squares of a plurality of differences, $$\sum_{i=1}^{I}(x_{ij})^2$$

is a sum of the squares of a plurality of amplitudes of a corresponding plurality of seismic data samples in each cell (i.e., cells 25a, 25b, 25c of FIGS. 3–11),
$X_{ij}$ is the seismic amplitude at time "j" for trace "i"; and
$\bar{X}_j$ is the average amplitude at time "j" for all traces "i".

Refer now to FIGS. 33 and 34 wherein a flowchart 64 of the "variance cube" software 64 of FIG. 24 of the present invention is illustrated. The flowcharts of FIGS. 33 and 34 are divided into two parts, the first flowchart 64a of FIG. 33 and the second flowchart 64b of FIG. 34. The flowcharts of FIGS. 33 and 34 utilize the above referenced "additional second mathematical relation" which is set forth again below, as follows:

$$\sigma_t^2 = \frac{\sum_{j=t-L/2}^{j=t+L/2} w_{j-t} \sum_{i=1}^{I}(x_{ij}-\bar{x}_j)^2}{\sum_{j=t-L/2}^{j=t+L/2} w_{j-t} \sum_{i=1}^{I}(x_{ij})^2}$$

In FIG. 33, in the first flowchart 64a, the top half of the variance part 90b in FIG. 32 will undergo the "cross multiply and add operation" 100 with respect to the top half of the triangular weighting part 90a in FIG. 32. In FIG. 33, start by reading the first three inlines, block 64a1 and initialize "Sumsqx, Sumsqy, and Weight=0.0", block 64a2. Then, find the sample value average "$\bar{X}_j$", block 64a3, as follows, $$\bar{x}_j = \frac{\sum_{i=1}^{I} x_{ij}}{I}$$

Recall from FIG. 25 that the average of each of the amplitudes of the seismic traces "x(1)" through "x(9)" is defined to be $\bar{X}_j$, where the "j" is a time value which refers to the particular time slice, and that the average "$\bar{X}_j$" of each of these amplitudes is defined as follows:

$$\bar{X}_j=[x(1)+x(2)+x(3)+x(4)+x(5)+x(6)+x(7)+x(8)+x(9)]/9$$

In FIG. 33, find the squared difference from the mean, block 64a4, as follows:

$$Sumsqx = \sum_{i=1}^{I}(x_{ij}-\bar{x}_j)^2.$$

Recall from FIG. 25 that the sum of the squares of each 'subtraction' is calculated as follows:

$$\sum_{i=1}^{I}(x_{ij}-\bar{x}_j)^2 = (x(1)-\bar{x}_j)^2 + (x(2)-\bar{x}_j)^2 +$$
$$(x(3)-\bar{x}_j)^2 + \ldots + (x(9)-\bar{x}_j)^2$$

In FIG. 33, find the sum of the squared sample value, block 64a5, as follows:

$$Sumsqy = \sum_{i=1}^{I}(x_{ij})^2$$

Recall from FIG. 25 that the sum of the squares of each amplitude (of each seismic trace at the intersection) is calculated, as follows:

$$\sum_{i=1}^{I}(x_{ij})^2 = [x(1)]^2 + [x(2)]^2 + [x(3)]^2 + \ldots + [x(9)]^2$$

In FIG. 33, scale by weighting function, block 64a6, as follows:

Weight=Weight+(1.0/(L/2))
Sumsqx=Sumsqx*Weight
Sumsqy=Sumsqy*Weight

In connection with the "scale by weighting function" step, block 64a6, recall that the "weighting function" term $$\left(\sum_{j=t-L/2}^{j=t+L/2} w_{j-t}\right)$$

is multiplied by both the "normalized squared difference from the mean" term $$Sumsqx = \sum_{i=1}^{I}(x_{ij} - \overline{x}_j)^2$$

and the sum of the squared sample value term $$Sumsqy = \sum_{i=1}^{I}(x_{ij})^2$$

which appears in the "additional second mathematical relation", as follows:

$$\sigma_t^2 = \frac{\sum_{j=t-L/2}^{j=t+L/2} w_{j-t} \sum_{i=1}^{I}(x_{ij} - \overline{x}_j)^2}{\sum_{j=t-L/2}^{j=t+L/2} w_{j-t} \sum_{i=1}^{I}(x_{ij})^2}$$

In FIG. 33, accumulate Sumsqx, Sumsqy for this reflection time "j", block 64a7.

In FIG. 34, in the second flowchart 64b, the bottom half of the variance part 90b in FIG. 32 will undergo the "cross multiply and add operation" 100 with respect to the bottom half of the triangular weighting part 90a in FIG. 32. In FIG. 34, start by reinitializing the weight to be equal to 1.0, block 64b1. Then, in FIG. 34, repeat blocks 64a3, 64a4, 64a5, 64a6, and 64a7 of FIG. 34, as follows:

1. Find the sample value average "$\overline{X}_j$", block 64b2, as follows:

$$\overline{x}_j = \frac{\sum_{i=1}^{I} x_{ij}}{I}$$

2. Find the squared difference from the mean, block 64b3, as follows:

$$Sumsqx = \sum_{i=1}^{I}(x_{ij} - \overline{x}_j)^2$$

3. Find the sum of the squared sample value, block 64b4, as follows:

$$Sumsqy = \sum_{i=1}^{I}(x_{ij})^2$$

4. Scale by weighting function, block 64b5, as follows:

Weight=Weight+(1.0/(L/2))

Sumsqx=Sumsqx*Weight

Sumsqy=Sumsqy*Weight

5. Accumulate Sumsqx, Sumsqy for this reflection time "j", block 64b6

6. Output variance value for the reflection time "t", block 64b7, as follows:

Variance(t)=Sumsqx/Sumsqy

7. Drop the first of three inlines and pick up the next inline, repeat the process until all the inlines are finished, block 64c.

A "program listing" representing the execution portion of the Variance Cube software 64 of the present invention of FIG. 24 is set forth in the following pages. The "program listing" utilizes the "additional second mathematical relation" set forth above.

---

```
Program Listing
This listing is for the execution portion of the code, not the user interface etc. Function calls are
used which are components of the IESX application programming environment.
private int_t
coherency_execute (sp, status_ptr)
struct wav_extract_s * sp;
status_t         *status_ptr;
{
    struct  field_criteria_s  search_criteria [3];
    struct  db_seis_tracehead_s  header;
    struct  db_seis_tracehead_s  *header_ptr;
    int_t        n_found;
    int_t        nbytes;
    real_t       inline_first, inline_last;
    real_t       xline_first, xline_last;
    int_t        nsamps;
    db_token_t   * token_list_ptr = NULL;
    db_token_t   path_token_ptr;
    db_token_t   io_connection;
    db_token_t   io_write_connect;
    lcs_coord_t  nodes[2];
    lcs_coord_t  points[25];
    real_t       * trace_ptr = NULL;
    real_t       * out_trace_ptr = NULL;
    real_t       * operator_ptr = NULL;
```

-continued

```
real_t    sumx;
real_t    sumsqx;
real_t    sumsqy;
real_t    quotient;
real_t    max_quotient;
real_t    min_quotient;
real_t    big_quotient;
real_t    sample_rate;
real_t    * sorted;
real_t    b_0;
real_t    b_1;
real_t    time[9];
real_t    ampl[9];
real_t    time_1[9];
real_t    ampl_1[9];
real_t    time_2[9];
real_t    ampl_2[9];
real_t    t1, t2, t3;
real_t    x0, x1, y0, y1, a;
real_t    told, varmin, dipmax;
real_t    variance;
real_t    corcoef;
real_t    thres;
real_t    round_off;
real_t    xo_i_min, xo_i_max, xo_j_min, xo_j_max;
real_t    path_i_min, path_i_max,
real_t    path_j_min, path_j_max,
real_t    * i_ptr;
real_t    tb, te;
bool_t    op_value;
int_t     loop_start;
int_t     loop_end;
int_t     num_pts;
int_t     index;
int_t     index1;
int_t     method;
int_t     inc;
int_t     i_x, ibest;
int_t     num_i;
int_t     num_j;
int_t     i, j, i1, j1, ix, il;
int_t     im;
int_t     max_dip;
int_t     ntrc;
int_t     start_time, end_time;
int_t     time_window_length;
int_t     fft_length;
int_t     power_2;
int_t     fft_power_2;
int_t     data_format;
real_t    weight;
int_t     correlation_length;
int_t     line_name;
int_t     process_codes[20];
int_t     exponent;
int_t     vert_smooth;
int_t     operator;
int_t     good_one;
int_t     offset;
int_t     adj;
units_t   sample_units;
uns_t     temp_cursor;
db_token_t      cur_sclass_token ={ 0, 0, 0};
db_token_t      cur_seis_rep_token ={ 0, 0, 0};
rational_t  rcs_line;
rational_t  rcs_trace;
OPT_DECLARE(opt_list1,2);
char_t    sc_name[DB_SCLASS_NAME_LEN+1];
char_t    sc_desc[DB_SCLASS_DESC_LEN+1];
string_t sclass_name;
string_t sclass_desc;
STRING_CONSTANT (format, format_buf,, "%s");
static struct field_criteria_s lc_criteria[]=
{
  {DB_FID_LCLASS_NAME, FIELD_EQ, NULL, 1},
  {FIELD_END, 0, NULL, 0 }
};
static struct db_item_list_s path_items[] = {
                { DB_FID_P_I_START, 0, 1, 0, NULL},
```

-continued

```
                        { DB_FID_P_J_START, 0, 1, 0, NULL},
                        { DB_FID_P_I_END, 0, 1, 0, NULL},
                        { DB_FID_P_J_END, 0, 1, 0, NULL},
                        { DB_NULL_ITEM, 0, 0, 0, NULL });
    static struct db_item_list_s xo_item_list[] =
        {
                { DB_FID_XO_I_MIN, 0, 1, 0, NULL },
                { DB_FID_XO_I_MAX, 0, 1, 0, NULL },
                { DB_FID_XO_J_MIN, 0, 1, 0, NULL },
                { DB_FID_XO_J_MAX, 0, 1, 0, NULL },
                { DB_NULL_ITEM, 0, 1, 0, NULL }
        };
    STRING_CONSTANT ( newname, namebuf, "onight");
    STRING_MAKE( sclass_name, sc_name, DB_SCLASS_NAME_LEN);
    STRING_MAKE( sclass_desc, sc_desc, DB_SCLASS_DESC_LEN);
/* the above needs to be cleaned up, not everything used */
    err_debug_time_delay (−1.);
    *status_ptr = IES_E_OK;
    printf ("I'm inside the calculation portion\n");
    data_format = TYPE_REAL;
    OPT_INIT( opt_list1);
    OPT_PUT_INT( opt_list1,
        DB_FID_SEIS_DATA_FORMAT,
        data_format);
    /* pick up the user parameter settings */
    ui_scale_get_value ( sp->dialog_token,
            COH_VERT_AVERAGE,
            &thres,
            status_ptr);
    IF_ERROR_WRAP (*status_ptr);
    vert_smooth = thres;
    num_pts = 9;
    operator = 0;
    ui_toggle_get_value (sp->dialog_token,
            COH_CROSS_BUTTON,
            &op_value,
            status_ptr);
    IF_ERROR_WRAP (*status_ptr);
    if(op_value) operator = 1;
    ui_toggle_get_value ( sp->dialog_token,
            COH_FIVE_BUTTON,
            &op_value,
            status_ptr);
    IF_ERROR_WRAP (*status_ptr);
    if(op_value)
    {
       operator = 2;
       num_pts = 25;
    }
    tb = sp->time_begin * 1000.;
    te = sp->time_end * 1000.;
    sp->seisrep_token = db_null_token;
    trace_ptr = NULL;
    if (sp->work_path_token.id == 0)
    {
       path_i_min = path_i_max = path_j_min = path_j_max = 0;
       db_xo_get_range ( &sp->database_connect,
                &sp->xobj_token,
                &path_i_min, &path_i_max,
                &path_j_min, &path_j_max, status_ptr);
    IF_ERROR_WRAP(*status_ptr);
    DB_LCS_I(nodes[0]) = path_i_min;
    DB_LCS_I(nodes[1]) = path_i_max;
    DB_LCS_J(nodes[0]) = path_j_min;
    DB_LCS_J(nodes[1]) = path_j_max;
    db_path_create( &sp->database_connect,
                DB_P_TYPE_RECT,
                &sp->xobj_token,
                2, nodes,
                DB_DOMAIN_BOTH,
                NULL, &sp->work_path_token,
                status_ptr);
    IF_ERROR_WRAP(*status_ptr);
    db_put_numeric(&sp->database_connect,
        &sp->work_path_token,
        DB_FID_P_VERT_RANGE_MIN,
        (gptr_t)&sp->time_begin,
        status_ptr);
    IF_ERROR(*status_ptr) goto WRAP;
```

-continued

```
    db_put_numeric(&sp->database_connect,
    &sp->work_path_token,
    DB_FID_P_VERT_RANGE_MAX,
    (gptr_t)&sp->time_end,
    status_ptr);
    IF_ERROR(*status_ptr) goto WRAP;
}
    if (DB_TOKENS EQUAL(sp->work_path_token , db_null_token))
        ERR_SET_AND_WRAP ( *status_ptr, COH_E_NO_SEISMIC);
    printf ("I'm before cursor change\n");
    /* change cursor to inform user to take a break */
    ui_task_get_cursor ( sp->task_token,
            &temp_cursor,
            status_ptr);
    IF_ERROR(*status_ptr ) goto WRAP,
    ui_task_put_cursor (sp->task_token,
            XC_watch,
            status_ptr);
    IF_ERROR(*status_ptr ) goto WRAP;
    /* get xo if a path is selected. The other's come with an xo */
    db_get_numeric( &sp->database_connect,
            &sp->work_path_token,
            DB_FID_P_XOBJ,
            (gptr_t)&sp->xobj_token,
            status_ptr);
    IF_ERROR(*status_ptr) goto WRAP;
    n_found = 0;
    if (!DB_TOKENS_EQUAL (sp->xobj_token, db_null_token) )
    {
      search_criteria [0].item_code = DB_FID_SEIS_XO_TOKEN;
      search_criteria [0].operator = FIELD_EQ;
      search_criteria [0].operand_ptr= &sp->xobj_token;
      search_criteria [0].n_operand = 0;
      search_criteria [1].item_code = DB_FID_SEIS_CLASS_TOKEN;
      search_criteria [1].operator = FIELD_EQ;
      search_criteria [1].operand_ptr= &sp->class_token;
      search_criteria [1].n_operand = 0;
      search_criteria [2].item_code = FIELD_END;
      db_list (&sp->database_connect, DB_CAT_SEIS_REP, search_criteria,
            NULL, NULL, 0, NULL,
            &token_list_ptr, &n_found,    status_ptr);
      IF_ERROR_WRAP ( *status_ptr);
    }
    if (n_found > 0)
    {
      sp->seisrep_token = token_list_ptr[0];
      db_list_dealloc ( NULL, token_list_ptr, status_ptr );
    }
    else
    {
      ERR_SET_AND_WRAP ( *status_ptr, COH_E_NO_SEISMIC);
    }
    /*
     * Get the sample rate for the seismic data
     */
    db_get_numeric( &sp->(database_connect,
            &sp->seisrep_token,
            DB_FID_SEIS_NSAMPS,
            (gptr_t)&nsamps,
            status_ptr);
    IF_ERROR(*status_ptr ) goto WRAP;
    db_get_numeric( &sp->(database_connect,
            &sp->seisrep_token,
            DB_HD_SEIS_SI,
            (gptr_t)&sample_rate,
            status_ptr);
    IF_ERROR( *status_ptr) goto WRAP;
    db_get_numeric( &sp->(database_connect,
            &sp->seisrep_token,
            DB_FID_SEIS_SI_UNITS,
            (gptr_t)&sample_units,
            status_ptr);
    IF_ERROR( *status_ptr ) goto WRAP;
    db_get_numeric( &sp->(database_connect,
    &sp->work_path_token,
    DB_FID_P_TYPE,
    (gptr_t)&sp->path_type,
    status_ptr);
    IF_ERROR(*status_ptr) goto WRAP;
```

-continued

```
        db_get_numeric( &sp->(database_connect,
                &sp->work_path_token,
                DB_FID_P_VERT_RANGE_MIN,
                (gptr_t)&sp->time_begin,
                status_ptr);
    IF_ERROR(*status_ptr ) goto WRAP;
        db_get_numeric( &sp->(database_connect,
                &sp->work_path_token,
                DB_FID_P_VERT_RANGE_MAX,
                (gptr_t)&sp->time_end,
                status_ptr);
    IF_ERROR(*status_ptr ) goto WRAP;
    /* if it is a 3D path, get nodes and define multiple paths */
    /* get the limits of the exploration object (survey) */
    xo_item_list[0].data_ptr = &xo_i_min;
    xo_item_list[1].data_ptr = &xo_i_max;
    xo_item_list[2].data_ptr = &xo_j_min;
    xo_item_list[3].data_ptr = &xo_j_max;
    db_get_items( &sp->database_connect,
            &sp->xobj_token,
            xo_item_list,
            status_ptr );
    IF_ERROR_WRAP ( *status_ptr);
        /* get the limits of the selected path */
    path_items[0].data_ptr = &path_i_min;
    path_items[1].data_ptr = &path_i_min;
    path_items[2].data_ptr = &path_j_max;
    path_items[3].data_ptr = &path_j_max;
    db_get_items ( &sp->database_connect,
            &sp->work_path_token,
            path_items,
            status_ptr );
    IF_ERROR_WRAP ( *status_ptr);
     /*
      * Make sure incoming path is within survey bounds
      */
    sp->xline_begin = CLIP (path_i_min, xo_i_min, xo_i_max);
    sp->xline_end   = CLIP (path_i_max, xo_i_min, xo_i_max);
    sp->inline_begin = CLIP (path_j_min, xo_j_min, xo_j_max);
    sp->inline_end   = CLIP (path_j_max, xo_j_min, xo_j_max);
     /*
      * see if the size of the rectangle is within acceptable limits
      */
    if (ABS(sp->inline_end - sp->inline_begin) <= 0.0 &&
        ABS(sp->xline_end - sp->xline_begin) <= 0.0)
    {
      IF_ERROR_WRAP ( *status_ptr);
    }
    xline_first = sp->xline_begin;
    xline_last  = sp->xline_end;
    if (sp->path_type == DB_P_TYPE_RECT)
    {
        num_i = path_i_max - path_i_min + 1;
        num_j = path_j_max - path_j_min + 1;
    }
/* we now have our geometry for the seismic volume defined */
    /*
     * do some validity checking of values to make sure they're ok
     */
    if ( sp->time_begin < 0.0 ) sp->time_begin = 0.0;
    if ( sp->time_end > sample_rate * nsamps)
    {
    sp->time_end = sample_rate * nsamps;
    db_put_numeric(&sp->database_connect,
            &sp->work_path_token,
            DB_FID_P_VERT_RANGE_MAX,
            (gptr_t)&sp->time_end,
            status_ptr);
    IF_ERROR(*status_ptr) goto WRAP;
    }
    /*
     * Set up necessary variables for the main trace loop
     */
    sp->time_begin = sp->time_begin * 1000.
    sp->time_end   = sp->time_end * 1000.;
    /* compute the length in samples for 5% of the trace time range */
    round_off = sample_rate/2;
    time_window_length = ((sp->time_end - sp->time_begin)
            * 0.001 + round_off)/sample_rate;
```

-continued

```
/*
    start_time = (sp->time_begin *0.001+round_off)/sample_rate;
    end_time   = (sp->time_end *0.001+round_off)/sample_rate;
*/
    nbytes = nsamps * sizeof(real_t);
    correlation_length = end_time
    fft_length = power_of_2 (correlation_length);
    power_2 = what_power_of_2 ( fft_length);
    if(nbytes < fft_length) nbytes = fft_length;
    mem_alloc (num_pts*nbytes*sizeof(real_t),(gptr_t *)&trace_ptr,status_ptr);
    IF_ERROR( *status_ptr) goto WRAP;
    mem_set( NULL, trace_ptr,
        nbytes * sizeof ( real_t),
        status_ptr );
    IF_ERROR_WRAP(*status_ptr);
    mem_alloc (num_i*sizeof(struct db_seis_tracehead_s),
            (gptr_t *)&header_ptr,status_ptr);
    IF_ERROR( *status_ptr) goto WRAP;
    mem_alloc (num_pts * sizeof(real_t), (gptr_t *)&sorted, status_ptr);
    IF_ERROR( *status_ptr ) goto WRAP;
    mem_alloc (nbytes * sizeof(real_t), (gptr_t *)&operator_ptr, status_ptr);
    IF_ERROR( *status_ptr) goto WRAP;
    mem_alloc (nbytes * sizeof(real_t), (gptr_t *)&out_trace_ptr, status_ptr);
    IF_ERROR( *status_ptr ) goto WRAP;
    mem_set( NULL, out_trace_ptr,
        nbytes * sizeof ( real_t),
        status_ptr )
    IF_ERROR_WRAP(*status_ptr);
    mem_alloc (num_pts * sizeof(real_t), (gptr_t *)&i_ptr, status_ptr);
    IF_ERROR( *status_ptr) goto WRAP;
/*
 * create output all class and seisrep definitions
 */
    ui_text_get ( sp->dialog_token,
        COH_CLASS_NAME,
        &sclass_name,
        status_ptr);
    IF_ERROR_WRAP (*status_ptr);
    ui_text_get ( sp->dialog_token,
        COH_CLASS_DESC,
        &sclass_desc,
        status_ptr)
    IF_ERROR_WRAP (*status_ptr);
    process_codes[0] = 39;
    db_sclass_create( &sp->database_connect,
        &sclass_name,
        &sclass_desc,
        39,
        &sp->class_token,
        process_codes,
        &db_null_token,
        &opt_list1
        &cur_sclass_token,
        status_ptr );
    IF_ERROR_WRAP (*status_ptr);
    db_seis_create(&sp->database_connect,
        &sp->xobj_token,
        &cur_sclass_token,
        nsamps,
        sample_rate,
        &sample_units,
        DB_DOMAIN_TIME,
        &opt_list1,
        &cur_seis_rep_token,
        status_ptr);
    IF_ERROR_WRAP (*status_ptr);
    for (i=1; i<num_pts; i++)
        i_ptr[i-1] = i;
    printf ("Inline/Crossline ranges\n");
    printf ("first inline: %f\n", sp->inline_begin);
    printf ("last inline: %f\n", sp->inline_end);
    printf ("first xline: %f\n", sp->xline_begin);
    printf ("last xline: %f\n", sp->xline_end);
/*
 * top of seismic loop
 */
    offset = 2;
    if(operator == 0) offset = 1;
    for ( inline_first = sp->inline_begin+offset;
```

```
      inline_first < sp->inline_end-offset;
      inline_first++)
  {
    inline_last = inline_first;
/* operator path specific to user selection */
loop_start = xline_first + 1;
loop_end = xline_last - 2;
}
if (operator != 0)
{
    loop_start = xline_first + 2;
    loop_end = xline_last - 2;
}
for (i_x = loop_start; i_x <= loop_end; i_x++)
{
    if (operator = 0)
    {
        DB_LCS_I ( points[0]) = i_x-1;
        DB_LCS_J ( points[0]) = inline_first-1;
        DB_LCS_I ( points[1]) = i_x;
        DB_LCS_J ( points[1]) = inline_first-1;
        DB_LCS_I ( points[2]) = i_x+1;
        DB_LCS_J ( points[2]) = inline_first-1;
        DB_LCS_I ( points[3]) = i_x-1;
        DB_LCS_J ( points[3]) = inline_first;
        DB_LCS_I ( points[4]) = i_x;
        DB_LCS_J ( points[4]) = inline_first;
        DB_LCS_I ( points[5]) = i_x+1;
        DB_LCS_J ( points[5]) = inline_first;
        DB_LCS_I ( points[6]) = i_x-1;
        DB_LCS_J ( points[6]) = inline_first+1;
        DB_LCS_I ( points[7]) = i_x;
        DB_LCS_J ( points[7]) = inline_first+1;
        DB_LCS_I ( points[8]) = i_x+1;
        DB_LCS_J ( points[8]) = inline_first+1;
        good_one = 4;
    }
    if (operator == 1 )
    {
        DB_LCS_I ( points[0]) = i_x-2;
        DB_LCS_J ( points[0]) = inline_first;
        DB_LCS_I ( points[1]) = i_x-1;
        DB_LCS_J ( points[1]) = inline_first;
        DB_LCS_I ( points[2]) = i_x;
        DB_LCS_J ( points[2]) = inline_first;
        DB_LCS_I ( points[3]) = i_x+1;
        DB_LCS_J ( points[3]) = inline_first;
        DB_LCS_I ( points[4]) = i_x+2;
        DB_LCS_J ( points[4]) = inline_first;
        DB_LCS_I ( points[5]) = i_x;
        DB_LCS_J ( points[5]) = inline_first-2;
        DB_LCS_I ( points[6]) = i_x;
        DB_LCS_J ( points[6]) = inline_first-1;
        DB_LCS_I ( points[7]) = i_x;
        DB_LCS_J ( points[7]) = inline_first+1;
        DB_LCS_I ( points[8]) = i_x;
        DB_LCS_J ( points[8]) = inline_first+2;
        good_one = 2;
    }
    if (operator == 2)
    {
        DB_LCS_I ( points[0]) = i_x-2;
        DB_LCS_J ( points[0]) = inline_first-2;
        DB_LCS_I ( points[1]) = i_x-1;
        DB_LCS_J ( points[1]) = inline_first-2;
        DB_LCS_I ( points[2]) = i_x;
        DB_LCS_J ( points[2]) = inline_first-2;
        DB_LCS_I ( points[3]) = i_x+1;
        DB_LCS_J ( points[3]) = inline_first-2;
        DB_LCS_I ( points[4]) = i_x+2;
        DB_LCS_J ( points[4]) = inline_first-2;
        DB_LCS_I ( points[5]) = i_x-2;
        DB_LCS_J ( points[5]) = inline_first-1;
        DB_LCS_I ( points[6]) = i_x-1;
        DB_LCS_J ( points[6]) = inline_first-1;
        DB_LCS_I ( points[7]) = i_x;
        DB_LCS_J ( points[7]) = inline_first-1;
        DB_LCS_I ( points[8]) = i_x+1;
        DB_LCS_J ( points[8]) = inline_first-1;
```

```
            DB_LCS_I ( points[9]) = i_x+2;
            DB_LCS_J ( points[9]) = inline_first-1;
            DB_LCS_I ( points[10]) = i_x-2;
            DB_LCS_J ( points[10]) = inline_first;
            DB_LCS_I ( points[11]) = i_x-1;
            DB_LCS_J ( points[11]) = inline_first;
            DB_LCS_I ( points[12]) = i_x;
            DB_LCS_J ( points[12]) = inline_first;
            DB_LCS_I ( points[13]) = i_x+1;
            DB_LCS_J ( points[13]) = inline_first;
            DB_LCS_I ( points[14]) = i_x+2;
            DB_LCS_J ( points[14]) = inline_first;
            DB_LCS_I ( points[15]) = i_x-2;
            DB_LCS_J ( points[15]) = inline_first+1;
            DB_LCS_I ( points[16]) = i_x-1;
            DB_LCS_J ( points[16]) = inline_first+1;
            DB_LCS_I ( points[17]) = i_x;
            DB_LCS_J ( points[17]) = inline_first+1;
            DB_LCS_I ( points[18]) = i_x+1;
            DB_LCS_J ( points[18]) = inline_first+1;
            DB_LCS_I ( points[19]) = i_x+2;
            DB_LCS_J ( points[19]) = inline_first+1;
            DB_LCS_I ( points[20]) = i_x-2;
            DB_LCS_J ( points[20]) = inline_first+2;
            DB_LCS_I ( points[21]) = i_x-1;
            DB_LCS_J ( points[21]) = inline_first+2;
            DB_LCS_I ( points[22]) = i_x;
            DB_LCS_J ( points[22]) = inline_first+2
            DB_LCS_I ( points[23]) = i_x+1;
            DB_LCS_J ( points[23]) = inline_first+2;
            DB_LCS_I ( points[24]) = i_x+2;
            DB_LCS_J ( points[24]) = inline_first+2;
            good_one = 12;
        }
            db_path_create (&sp->database_connect,
                DB_P_TYPE_LIST,
                &sp->xobj_token,
                num_pts,
                points,
                DB_DOMAIN_BOTH,
                NULL,
                &path_token_ptr,
                status_ptr );
            IF_ERROR_WRAP ( *status_ptr);
/*
            sp->time_end = s_>time_end / 1000.;
*/
            db_put_numeric (&sp->database connect,
                &path_token_ptr,
                DB_FID_P_VERT_RANGE_MAX,
                (gptr_t)&sp->time_end,
                status_ptr);
            IF_ERROR(*status_ptr) goto WRAP;
/*
            sp->time_end = sp->time_end * 1000.;
*/
            /* check to make sure there is a valid path_token */
            db_seis_read_init (&sp-<database_connect,
                &sp->seisrep_token,
                &path_token_ptr,
                NULL,
                &io_connection,
                status_ptr);
            if ( IS_ERROR(*status_ptr) &&
                *status_ptr != DB_I_SC_NO_DATA)
            {
                io_connection = db_null_token;
                goto WRAP;
            }
            db_seis_write_init (&sp->database_connect,
                &cur_seis_rep_token,
                &opt_list1,
                &io_write_connect,
                status_ptr );
            if ( IS_ERROR(*status_ptr) &&
                *status_ptr != DB_I_SC_NO_DATA)
            {
                io_connection = db_null_token;
                goto WRAP;
```

```
            }
        /*
         * Trace read loop for each path
         */
        ntrc = −1
        do
{
          ntrc += 1;
          db_seis_read_data ( &sp−>database_connect,
            &io_connection,
            NULL,
            &header,
            out_trace_ptr,
            status_ptr );
          if (IS_ERROR(*status_ptr) &&
           *status ptr != DB_SC_NO_DATA ) continue;
          /* check for a non-zero extraction window */
          if ( header.n_live == 0 ) continue;
          if(ntrc == good_one)
          {
           header_ptr[0] = header;
          }
             index = nsamps*ntrc;
             for (i=0; i<nsamps; i++)
             {
           trace_ptr[index+i] = out_trace_ptr[i];
             }
        } while ( !IS_ERROR(*status_ptr));
        if (!IS_ERROR(*status_ptr) ||
          *status_ptr = DB_I_SC_READ_ALL)
        {
          NO_ERROR(*status_ptr);
        }
   db_seis_read_term (&sp−>database_connect,
          &io_connection,
          status_ptr)
   IF_ERROR_WRAP(*status_ptr);
   db_object_delete ( &sp−>database_connect,
          &path_token_ptr,
          status_ptr);
   IF_ERROR_WRAP ( *status_ptr);
   /*
    * Ok. We got the traces. Do stuff here.
    */
   for (i=0; i<=nsamps; i++) out_trace_ptr[i]=0.0;
                start_time  = (tb *0.001+round_off) / sample_rate;
                end_time  = (te *0.001+round_off) / sample_rate;
                told = 0.0;
                max_dip = 4;
   /* Weighted variance computation method */
   for (i=start_time; i< end_time i++) /* for all samples */
                sumsqx = 0.0;
                sumsqy = 0.0;
                weight = 0.0;
                for(im=−vert_smooth/2; im<i; im++)
    {
      sumx = trace_ptr[0*nsamps +i +im]
                    + trace_ptr[1 *nsamps +i +im]
                  + trace_ptr[2*nsamps +i +im]
                  + trace_ptr[3*nsamps +i +im]
                    + trace_ptr[4*nsamps +i +im]
                  + trace_ptr[5*nsamps +i +im]
                  + trace_ptr[6*nsamps +i +im]
                  + trace_ptr[7*nsamps +i +im]
                  + trace_ptr[8*nsamps +i +im];
                sumx /= 9.0;
                max_quotient = (trace_ptr[0*nsamps +i +im]−sumx)*(trace_ptr[0*nsamps +i +im]−sumx)
                  + (trace_ptr[1*nsamps +i +im]−sumx)*(trace_ptr[1*nsamps +i +im]−sumx)
                  + (trace_ptr[2*nsamps +i +im]−sumx)*(trace_ptr[2*nsamps +i +im]−sumx)
                  + (trace_ptr[3*nsamps +i +im]−sumx)*(trace_ptr[3*nsamps +i +im]−sumx)
                  + (trace_ptr[4*nsamps +i +im]−sumx)*(trace_ptr[4*nsamps +i +im]−sumx)
                  + (trace_ptr[5*nsamps +i +im]−sumx)*(trace_ptr[5*nsamps +i +im]−sumx)
                  + (trace_ptr[6*nsamps +i +im]−sumx)*(trace_ptr[6*nsamps +i +im]−sumx)
                  + (trace_ptr[7*nsamps +i +im]−sumx)*(trace_ptr[7*nsamps +i +im]−sumx)
                  + (trace_ptr[8*nsamps +i +im]−sumx)*(trace_ptr[8*nsamps +i +im]−sumx);
                max_quotient *= weight;
                sumsqx += max_quotient;
        max_quotient = trace_ptr[0*nsamps +i +im] * trace_ptr[0*nsamps +i +im]
                    + trace_ptr[1*nsamps +i +im] * trace_ptr[1*nsamps +i +im]
```

-continued

```
                            + trace_ptr[2*nsamps +i +im] * trace_ptr[2*nsamps +i +im]
                            + trace_ptr[3*nsamps +i +im] * trace_ptr[3*nsamps +i +im]
                            + trace_ptr[4*nsamps +i +im] * trace_ptr[4*nsamps +i +im]
                            + trace_ptr[5*nsamps +i +im] * trace_ptr[5*nsamps +i +im]
                            + trace_ptr[6*nsamps +i +im] * trace_ptr[6*nsamps +i +im]
                            + trace_ptr[7*nsamps +i +im] * trace_ptr[7*nsamps +i +im]
                            + trace_ptr[8*nsamps +i +im] * trace_ptr[8*nsamps +i +im];
                        max_quotient *= weight;
                        sumsqy += max_quotient;
                        weight += 1.0/(vert_smooth/2);
                    }
                    weight= 1.0;
                    for(im= 1; im<vert_smooth/2+1; im++)
            {
                sumx = trace_ptr[0*nsamps +i +im]
                            + trace_ptr[1*nsamps +i +im]
                        + trace_ptr[2*nsamps +i +im]
                        + trace_ptr[3*nsamps +i +im]
                        + trace_ptr[4*nsamps +i +im]
                        + trace_ptr[5*nsamps +i +im]
                        + trace_ptr[6*nsamps +i +im]
                        + trace_ptr[7*nsamps +i +im]
                        + trace_ptr[8*nsamps +i +im];
                    sumx /= 9.0;
                    max_quotient = (trace_ptr[0*nsamps +i +im]-sumx)*(trace_ptr[0*nsamps +i *im]-
sumx)
                            + (trace_ptr[1 *nsamps +i +im]-sumx)*(trace_ptr[1*nsamps +i +im]-sumx)
                        + (trace_ptr[2*nsamps +i +im]-sumx)*(trace_ptr[2*nsamps +i +im]-sumx)
                        + (trace_ptr[3*nsamps +i +im]-sumx)*(trace_ptr[3*nsamps +i +im]-sumx)
                        + (trace_ptr[4*nsamps +i +im]-sumx)*(trace_ptr[4*nsamps +i +im]-sumx)
                        + (trace_ptr[5*nsamps +i +im]-sumx)*(trace_ptr[5*nsamps +i +im]-sumx)
                        + (trace_ptr[6*nsamps +i +im]-sumx)*(trace_ptr[6*nsamps +i +im]-sumx)
                        + (trace_ptr[7*nsamps +i +im]-sumx)*(trace_ptr[7*nsamps +i +im]-sumx)
                        + (trace_ptr[8*nsamps +i +im]-sumx)*(trace_ptr[8*nsamps +i +im]-sumx);
                    max_quotient *= weight;
                    sumsqx += max_quotient;
        max_quotient = trace_ptr[0*nsamps +i +im] * trace_ptr[0*nsamps +i +im]
                            + trace_ptr[1 *nsamps +i +im] * trace_ptr[1 *nsamps +i +im]
                        + trace_ptr[2*nsamps +i +im] * trace_ptr[2*nsamps +i +im]
                        + trace_ptr[3*nsamps +i +im] * trace_ptr[3*nsamps +i +im]
                        + trace_ptr[4*nsamps +i +im] * trace_ptr[4*nsamps +i +im]
                        + trace_ptr[5*nsamps +i +im] * trace_ptr[5*nsamps +i +im]
                        + trace_ptr[6*nsamps +i +im] * trace_ptr[6*nsamps +i +im]
                            + trace_ptr[7*nsamps +i +im] * trace_ptr[7*nsamps +i +im]
                        + trace_ptr[8*nsamps +i +im] * trace_ptr[8*nsamps +i +im];
                        max_quotient *= weight;
                        sumsqy += max_quotient;
                        weight -= 1.O/(vert_smooth/2);
                    }
                    out_trace_ptr[i] = sumsqx/sumsqy;
            }
            /* output results for either method */
            db_seis_write_trace( &sp->database_connect,
                    &io_write_connect,
                    NULL,
                    &header_ptr[0],
                    out_trace_ptr,
                    status_ptr);
            IF_ERROR(*status_ptr);
            db_seis_write_term (&sp->database_connect,
                    &io_write_connect,
                    status_ptr);
            IF_ERROR_WRAP(*status_ptr);
        }
        printf( "SEISMIC line %f finished.\n", inline_first);
    }
        db_seis_update_statistics (&sp->database_connect,
                &cur_seis_rep_token,
                status_ptr);
WRAP:
    /* clean up memory */
    if ( trace_ptr != NULL)
        mem_dealloc ( (gptr_t)trace_ptr, status_ptr);
    ui_task_put_cursor ( sp->task_token,
            temp_cursor,
            status_ptr)
    ERR_WRAPUP ( *status_ptr, COH_EXECUTION_FAILED);
}
```

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of generating a cube for displaying a set of geologic features of a cubic volume of an earth formation, a plurality of seismic waves propagating through said cubic volume of said earth formation, a plurality of seismic traces being generated in response to said plurality of seismic waves, said plurality of seismic traces including a plurality of seismic data samples, a cube representing said cubic volume of said earth formation enclosing said plurality of seismic data samples, comprising the steps of:

(a) assigning a variance value to each seismic data sample in said cube; and (b) assigning a unique color to each variance value in said cube.

2. The method of claim 1, wherein said variance value assigned to each seismic data sample is defined to be a degree to which an amplitude of said each seismic data sample varies about an average seismic data sample amplitude value.

3. The method of claim 1, wherein said cube is divided into a plurality of time slices where each of the time slices include a first subset of said plurality of seismic data samples, each of said plurality of time slices enclosing a corresponding plurality of cells where each of the cells on each time slice include a second subset of said plurality of seismic data samples where said second subset represents a further subset of said first subset, and wherein the assigning step (a) for assigning a variance value to each seismic data sample in said cube comprises the steps of:

(a1) calculating, for a seismic data sample in each cell on each time slice of the cube, a variance value, and (a2) assigning the variance value to said seismic data sample in said each cell on said each time slice of the cube.

4. The method of claim 3, wherein the calculating step (a1), for calculating said variance value for a seismic data sample in each cell on each time slice of the cube, comprises the steps of:

calculating an average seismic data sample amplitude which represents an average of a plurality of amplitudes of the plurality of seismic data samples of said second subset in said each cell;

subtracting said average seismic data sample amplitude from each of said plurality of amplitudes of said plurality of seismic data samples of said second subset in each cell thereby producing a plurality of differences;

summing the squares of said plurality of differences to thereby produce a numerator;

summing the squares of said plurality of amplitudes to thereby produce a denominator;

dividing the numerator by the denominator to produce a quotient; and mathematically operating said quotient against a weighting function to produce said variance value.

5. The method of claim 4, wherein the calculating step (a1) further comprises the steps of:

performing the following mathematical operation, $$\sigma_t^2 = \sum_{j=t-L/2}^{j=t+L/2} \left[ w_{j-t} \cdot \frac{\sum_{i=1}^{I}(x_{ij}-\bar{x}_j)^2}{\sum_{i=1}^{I}(x_{ij})^2} \right]$$

where:

$\sigma_t^2$ is said variance value, $W_{j-t}$ is said weighting function, where the sum of said weighting functions is unity:

$$\sum_{l=L/2}^{l=L/2} w_l = 1.0,$$

$$\sum_{i=1}^{I}(x_{ij}-\bar{x}_j)^2$$

is said sum of the squares of said plurality of differences of said numerator, $$\sum_{i=1}^{I}(x_{ij})^2$$

is said sum of the squares of said plurality of amplitudes of said second subset of said plurality of seismic data samples in each cell of said denominator, $X_{ij}$ is said amplitude of each seismic data sample in said cell, and $\bar{X}_j$ is said average of the amplitudes of all said seismic data samples in the cell.

6. The method of claim 4, wherein the calculating step (a1) further comprises the steps of:

performing the following mathematical operation, $$\sigma_t^2 = \frac{\sum_{j=t-L/2}^{j=t+L/2} w_{j-t} \sum_{i=1}^{I}(x_{ij}-\bar{x}_j)^2}{\sum_{j=t-L/2}^{j=t+L/2} w_{j-t} \sum_{i=1}^{I}(x_{ij})^2}$$

where $\sigma_t^2$ is said variance value, $W_{j-t}$ is said weighting function, $$\sum_{i=1}^{I}(x_{ij}-\bar{x}_j)^2$$

is said sum of the squares of said plurality of the differences of said numerator, $$\sum_{i=1}^{I}(x_{ij})^2$$

is said sum of said squares of said plurality of amplitudes of said second subset of said plurality of seismic data samples in each cell of said denominator, $X_{ij}$ is said amplitude of each seismic data sample in said cell, and $\overline{X}_j$ is said average of the amplitudes of all said seismic data samples in the cell.

7. A program storage device readable by a machine, tangibly embodying a program of instructions executable by the machine to perform method steps for generating a cube that displays a set of geologic features of a cubic volume of an earth formation, a plurality of seismic waves propagating through said cubic volume of said earth formation, a plurality of seismic traces being generated in response to said plurality of seismic waves, said plurality of seismic traces including a plurality of seismic data samples, a cube representing said cubic volume of said earth formation enclosing said plurality of seismic data samples, said method steps comprising:

(a) assigning a variance value to each seismic data sample in said cube; and (b) assigning a unique color to each variance value in said cube.

8. The program storage device of claim 7, wherein said cube is divided into a plurality of time slices where each of the time slices include a first subset of said plurality of seismic data samples, each of said plurality of time slices enclosing a corresponding plurality of cells where each of the cells on each time slice include a second subset of said plurality of seismic data samples where said second subset represents a further subset of said first subset, and wherein the assigning step (a) for assigning a variance value to each seismic data sample in said cube comprises the steps of:

(a1) calculating, for a seismic data sample in each cell on each time slice of the cube, said variance value, and (a2) assigning the variance value to said seismic data sample in said each cell on said each time slice of the cube.

9. The program storage device of claim 8, wherein the calculating step (a1), for calculating said variance value for a seismic data sample in each cell on each time slice of the cube, comprises the steps of:

calculating an average seismic data sample amplitude which represents an average of a plurality of amplitudes of the plurality of seismic data samples of said second subset in said each cell;

subtracting said average seismic data sample amplitude from each of said plurality of amplitudes of said plurality of seismic data samples of said second subset in each cell thereby producing a plurality of differences;

summing the squares of said plurality of differences to thereby produce a numerator;

summing the squares of said plurality of amplitudes to thereby produce a denominator;

dividing the numerator by the denominator to produce a quotient; and mathematically operating said quotient against a weighting function to produce said variance value.

10. The program storage device of claim 9, wherein the calculating step (a1) further comprises the steps of:

performing the following mathematical operation, $$\sigma_t^2 = \sum_{j=t-L/2}^{j=t+L/2} \left[ w_{j-t} \cdot \frac{\sum_{i=1}^{I}(x_{ij} - \overline{x}_j)^2}{\sum_{i=1}^{I}(x_{ij})^2} \right]$$

where:

$\sigma_t^2$ said variance value, $W_{j-t}$ is said weighting function, where the sum of said weighting functions is unity:

$$\sum_{l=-L/2}^{l=L/2} w_l = 1.0,$$

$$\sum_{i=1}^{I}(x_{ij} - \overline{x}_j)^2$$

is said sum of the squares of said plurality of differences of said numerator, $$\sum_{i=1}^{I}(x_{ij})^2$$

is said sum of the squares of said plurality of amplitudes of said second subset of said plurality of seismic data samples in each cell of said denominator, $X_{ij}$ is said amplitude of each seismic data sample in said cell, and $\overline{X}_j$ is said average of the amplitudes of all said seismic data samples in the cell.

11. The program storage device of claim 9, wherein the calculating step (a1) further comprises the steps of:

performing the following mathematical operation, $$\sigma_t^2 = \frac{\sum_{j=t-L/2}^{j=t+L/2} w_{j-t} \sum_{i=1}^{I}(x_{ij} - \overline{x}_j)^2}{\sum_{j=t-L/2}^{j=t+L/2} w_{j-t} \sum_{i=1}^{I}(x_{ij})^2}$$

where $\sigma_t^2$ is said variance value, $W_{j-t}$ is said weighting function, $$\sum_{i=1}^{I}(x_{ij} - \overline{x}_j)^2$$

is said sum of the squares of said plurality of the differences of said numerator, $$\sum_{i=1}^{I}(x_{ij})^2$$

is said sum of said squares of said plurality of amplitudes of said second subset of said plurality of seismic data samples in each cell of said denominator, $X_{ij}$ is said amplitude of each seismic data sample in said cell, and $\overline{X}_j$ is said average of the amplitudes of all said seismic data samples in the cell.

12. A computer program product for generating a cube that displays geologic features of a cubic volume of an earth formation, a plurality of seismic waves propagating through said cubic volume of said earth formation, a plurality of seismic traces being generated in response to said plurality of seismic waves, said plurality of seismic traces including a plurality of seismic data samples, a cube representing said cubic volume of said earth formation enclosing said plurality of seismic data samples, said computer program product comprising:

a computer usable medium having a computer readable program code embodied in said medium for causing the generation of said cube, said computer readable program code including, a first computer readable program code adapted for causing said computer to assign a variance value to each seismic data sample in said cube; and a second computer readable program code adapted for causing said computer to assign a unique color to each variance value in said cube.

13. The computer program product of claim 12, wherein said cube includes into a plurality of time slices where each of the time slices include a first subset of said plurality of seismic data samples, each of said plurality of time slices enclosing a corresponding plurality of cells where each of the cells on each time slice include a second subset of said plurality of seismic data samples where said second subset represents a further subset of said first subset, and wherein said first computer readable program code causes said computer to assign said variance value to each seismic data sample in said cube by executing a plurality of method steps comprising the steps of:

(a1) calculating, for a seismic data sample in each cell on each time slice of the cube, said variance value, and (a2) assigning said variance value to said seismic data sample in said each cell on said each time slice of the cube.

14. The computer program product of claim 13, wherein said first computer readable program code causes said computer to assign a variance value to each seismic data sample in said cube by first executing the calculating step (a1), the calculating step (a1) comprising the steps of:

calculating an average seismic data sample amplitude which represents an average of a plurality of amplitudes of the plurality of seismic data samples of said second subset in said each cell;

subtracting said average seismic data sample amplitude from each of said plurality of amplitudes of said plurality of seismic data samples of said second subset in each cell thereby producing a plurality of differences;

summing the squares of said plurality of differences to thereby produce a numerator;

summing the squares of said plurality of amplitudes to thereby produce a denominator;

dividing the numerator by the denominator to produce a quotient; and mathematically operating said quotient against a weighting function to produce said variance value.

15. The computer program product of claim 14, wherein the calculating step (a1) further comprises the steps of:

performing the following mathematical operation, $$\sigma_t^2 = \sum_{j=t-L/2}^{j=t+L/2} \left[ w_{j-t} \cdot \frac{\sum_{i=1}^{I}(x_{ij}-\overline{x}_j)^2}{\sum_{i=1}^{I}(x_{ij})^2} \right]$$

where:

$\sigma_t^2$ is said variance value, $W_{j-t}$ is said weighting function, where the sum of said weighting functions is unity:

$$\sum_{l=-L/2}^{l=L/2} w_l = 1.0,$$

$$\sum_{i=1}^{I}(x_{ij}-\overline{x}_j)^2$$

is said sum of the squares of said plurality of differences of said numerator, $$\sum_{i=1}^{I}(x_{ij})^2$$

is said sum of the squares of said plurality of amplitudes of said second subset of said plurality of seismic data samples in each cell of said denominator, $X_{ij}$ is said amplitude of each seismic data sample in said cell, and $\overline{X}_j$ is said average of the amplitudes of all said seismic data samples in the cell.

16. The computer program product of claim 14, wherein the calculating step (a1) further comprises the steps of:

performing the following mathematical operation, $$\sigma_t^2 = \frac{\sum_{j=t-L/2}^{j=t+L/2} w_{j-t} \sum_{i=1}^{I}(x_{ij}-\overline{x}_j)^2}{\sum_{j=t-L/2}^{j=t+L/2} w_{j-t} \sum_{i=1}^{I}(x_{ij})^2}$$

where $\sigma_t^2$ is said variance value, $W_{j-t}$ is said weighting function, $$\sum_{i=1}^{I}(x_{ij}-\overline{x}_j)^2$$

is said sum of the squares of said plurality of the differences of said numerator, $$\sum_{i=1}^{I}(x_{ij})^2$$

is said sum of said squares of said plurality of amplitudes of said second subset of said plurality of seismic data samples in each cell of said denominator, $X_{ij}$ is said amplitude of each seismic data sample in said cell, and $\overline{X}_j$ is said average of the amplitudes of all said seismic data samples in the cell.

17. A seismic signal processing apparatus responsive to a plurality of seismic traces for generating a cube that displays a set of geologic features of a cubic volume of an earth formation, a plurality of seismic waves propagating through said cubic volume of said earth formation, a plurality of seismic traces being generated in response to said plurality of seismic waves, said plurality of seismic traces including a plurality of seismic data samples, said cube representing said cubic volume of said earth formation enclosing said plurality of seismic data samples, comprising:

variance value assignment apparatus adapted for assigning a variance value to each seismic data sample in said cube; and color assignment apparatus adapted for assigning a unique color to each variance value in said cube.

18. The seismic signal processing apparatus of claim 17, wherein said cube enclosing said plurality of seismic data samples includes a plurality of slices, said plurality of slices passing through said cube and intersecting corresponding ones of said plurality of seismic data samples in said cube, and wherein said variance value assignment apparatus, for assigning said variance value to each seismic data sample in said cube, comprises:

first apparatus adapted for disposing a cell on each of said slices passing through said cube, a plurality of the cells corresponding, respectively, to the plurality of slices, each of said cells on each of said slices enclosing at least one of said plurality of seismic data samples, said plurality of cells enclosing, respectively, a plurality of seismic data samples among the plurality of slices;

second apparatus adapted for calculating, within each of the cells on each of the slices, a variance value, said second apparatus assigning each said variance value to one of the seismic data samples enclosed by the cell, a plurality of the variance values being assigned, respectively, to a plurality of the seismic data samples in said plurality of cells among the plurality of slices in the cube, said variance value being a function of the degree to which an amplitude of each seismic data sample in the cell varies about an average amplitude of the seismic data samples in the cell;

third apparatus adapted for sequentially progressing in synchronism said plurality of cells across said plurality of slices in said cube until said plurality of cells each enclose at least one of another plurality of seismic data samples, said second apparatus calculating, within each of the cells on each of the slices, a variance value, another plurality of the variance values being assigned, respectively, to said another plurality of seismic data samples, said third apparatus sequentially progressing in synchronism said plurality of cells across said plurality of slices in said cube until a variance value is assigned to each of said plurality of seismic data samples in said cube.

19. The seismic signal processing apparatus of claim 18, wherein each of said cells on each of said slices enclose a plurality of the seismic data samples, said second apparatus assigning said variance value to one of said plurality of the seismic data samples enclosed by said cell, each said variance value being a function of a difference between an amplitude of each seismic data sample in the cell and an average of a plurality of amplitudes of all the plurality of seismic data samples in the cell.

20. The seismic signal processing apparatus of claim 19, wherein each of said seismic data samples in said cube have an amplitude and said plurality of seismic data samples enclosed by each of said cells have an average amplitude, and wherein said second apparatus calculates, within each of the cells on each of the slices, said variance value by:

(a) subtracting said average amplitude of all said plurality of seismic data samples enclosed by the cell from each of the amplitudes of each seismic data sample enclosed by the cell thereby producing a plurality of differences;

(b) summing the squares of said plurality of differences thereby producing a numerator;

(c) summing the squares of said amplitudes of all the seismic data samples enclosed by the cell thereby producing a denominator; and (d) dividing said numerator by said denominator to produce a quotient.

21. The seismic signal processing apparatus of claim 20, wherein each said variance value calculated by said second apparatus is a function of a weighting function, the sum of said squares of said plurality of said differences, and the sum of said squares of said amplitudes of all said seismic data samples enclosed by said cell.

22. The seismic signal processing apparatus of claim 21, wherein said second apparatus calculates, within each of the cells on each of the slices, said variance value by using the following mathematical relation:

$$\sigma_t^2 = \sum_{j=t-L/2}^{j=t+L/2} \left[ w_{j-t} \cdot \frac{\sum_{i=1}^{I}(x_{ij} - \overline{x}_j)^2}{\sum_{i=1}^{I}(x_{ij})^2} \right]$$

where:

$\sigma_t^2$ is said variance value, $W_{j-t}$ is said weighting function, where the sum of said weighting functions is unity:

$$\sum_{l=-L/2}^{l=L/2} w_l = 1.0,$$

$$\sum_{i=1}^{I}(x_{ij} - \overline{x}_j)^2$$

is said sum of the squares of said plurality of differences of said numerator, $$\sum_{i=1}^{I}(x_{ij})^2$$

is said sum of the squares of said plurality of amplitudes of said second subset of said plurality of seismic data samples in each cell of said denominator, $X_{ij}$ is said amplitude of each seismic data sample in said cell, and $\overline{X}_j$ is said average of the amplitudes of all said seismic data samples in the cell.

23. The seismic signal processing apparatus of claim 21, wherein said second apparatus calculates, within each of the cells on each of the slices, said variance value by using the following mathematical relation:

$$\sigma_t^2 = \frac{\sum_{j=t-L/2}^{j=t+L/2} w_{j-t} \sum_{i=1}^{I} (x_{ij} - \overline{x}_j)^2}{\sum_{j=t-L/2}^{j=t+L/2} w_{j-t} \sum_{i=1}^{I} (x_{ij})^2}$$

where $\sigma_t^2$ is said variance value,
$W_{j-t}$ is said weighting function, $$\sum_{i=1}^{I} (x_{ij} - \overline{x}_j)^2$$

is said sum of the squares of said plurality of the differences of said numerator,, $$\sum_{i=1}^{I} (x_{ij})^2$$

is said sum of said squares of said plurality of amplitudes of said second subset of said plurality of seismic data samples in each cell of said denominator, $X_{ij}$ is said amplitude of each seismic data sample in said cell, and $\overline{X}_j$ is said average of the amplitudes of all said seismic data samples in the cell.

24. A method of generating a cube including a plurality of seismic data samples and a plurality of variance values corresponding, respectively, to said plurality of seismic data samples in response to a set of seismic data, said set of seismic data including said plurality of seismic data samples, said seismic data being generated when an acoustic energy source generates acoustic energy, reflects said acoustic energy off a horizon in an earth formation, and propagates said acoustic energy through a cubic volume of said earth formation, said cube displaying a set of geologic features of said cubic volume of said earth formation, comprising the steps of:

(a) selecting a subset of said set of seismic data which represents said cubic volume of said earth formation thereby generating said cube;

(b) selecting a plurality of slices through said cube, each of the plurality of slices passing through corresponding ones of said plurality of seismic data samples in said set of seismic data, thereby generating a plurality of slices through said cube;

(c) enclosing a cell around at least one seismic data sample on each slice through said cube, thereby generating a plurality of cells enclosing, respectively, a plurality of seismic data samples on a respective plurality of slices through the cube;

(d) calculating a variance value for a particular seismic data sample in each cell on each slice in the cube thereby generating a plurality of variance values corresponding, respectively, to a plurality of seismic data samples in the respective plurality of cells on the respective plurality of slices in the cube, each said variance value being a function of the degree to which an amplitude of each seismic data sample in the cell varies about an average amplitude of the seismic data samples in the cell;

(e) assigning each variance value in each cell to a seismic data sample in the cell and assigning a unique color to said each variance value in said each cell;

(f) sequentially moving said cell from said at least one seismic data sample on said each slice through said cube to another adjacent seismic data sample on said each slice through said cube, and (g) repeating steps (a) through (f) until a variance value and a unique color has been assigned to each seismic data sample in the cube.

25. The method of claim 24, wherein each of said seismic data samples in the cube have an amplitude and wherein each of said plurality of seismic data samples enclosed by each cell on said slice has an average amplitude, wherein the calculating step (d) for calculating said variance value comprises the steps of:

(d1) subtracting said average amplitude of said plurality of seismic data samples enclosed by the cell from each of the amplitudes of each seismic data sample enclosed by the cell thereby producing a plurality of differences;

(d2) summing the squares of said plurality of differences thereby producing a numerator;

(d3) summing the squares of the amplitudes of said seismic data samples enclosed by the cell thereby producing a denominator; and (d4) dividing said numerator by said denominator to produce a quotient representative of said variance value.

26. The method of claim 25, wherein the calculating step (d) for calculating said variance value further comprises the steps of:

calculating said variance value by using the following mathematical relation:

$$\sigma_t^2 = \sum_{j=t-L/2}^{j=t+L/2} \left[ w_{j-t} \cdot \frac{\sum_{i=1}^{I} (x_{ij} - \overline{x}_j)^2}{\sum_{i=1}^{I} (x_{ij})^2} \right]$$

where:
$\sigma_t^2$ is said variance value,
$W_{j-t}$ is a weighting function, where the sum of said weighting functions is unity:

$$\sum_{l=-L/2}^{l=L/2} w_l = 1.0,$$

$$\sum_{i=1}^{I} (x_{ij} - \overline{x}_j)^2$$

is said sum of the squares of said plurality of differences of said numerator, $$\sum_{i=1}^{I} (x_{ij})^2$$

is said sum of the squares of said amplitudes of said seismic data samples enclosed by the cell of said denominator, $X_{ij}$ is said amplitude of each seismic data sample in said cell, and $\overline{X}_j$ is said average amplitude of said plurality of seismic data samples enclosed by the cell.

27. The method of claim 25, wherein the calculating step (d) for calculating said variance value further comprises the steps of:

calculating said variance value by using the following mathematical relation:

$$\sigma_t^2 = \frac{\sum_{j=t-L/2}^{j=t+L/2} w_{j-t} \sum_{i=1}^{I} (x_{ij} - \overline{x}_j)^2}{\sum_{j=t-L/2}^{j=t+L/2} w_{j-t} \sum_{i=1}^{I} (x_{ij})^2}$$

where $\sigma_t^2$ is said variance value, $W_{j-t}$ is a weighting function, $$\sum_{i=1}^{I} (x_{ij} - \overline{x}_j)^2$$

is said sum of the squares of said plurality of the differences of said numerator, $$\sum_{i=1}^{I} (x_{ij})^2$$

is said sum of the squares of said amplitudes of said seismic data samples enclosed by the cell of said denominator, $X_{ij}$ is said amplitude of each seismic data sample in said cell, and $\overline{X}_j$ is said average amplitude of said plurality of seismic data samples enclosed by the cell.

28. A method of generating a map displaying a set of geologic characteristics representative of the geologic characteristics of a time slice through a cube in an earth formation, a boundary enclosing a plurality of seismic data samples, comprising the steps of:

(a) assigning a variance value to each seismic data sample enclosed by said boundary, and (b) assigning a color to each variance value that is assigned to each seismic data sample.

29. The method of claim 28, wherein the assigning step (a) comprises the steps of:

calculating each said variance value by determining an amplitude for each seismic data sample in a cell disposed within said boundary, determining an average seismic data sample amplitude of the seismic data samples in the cell, subtracting the average seismic data sample amplitude from the amplitudes of the seismic data samples in the cell to produce a plurality of differences, summing the squares of the plurality of differences to produce a first value, summing the squares of a plurality of the amplitudes of the seismic data samples in the cell to produce a second value, dividing the first value by the second value to produce a quotient, and operating the quotient against a weighting function to produce each said variance value.

30. A program storage device including a plurality of instructions, the instructions adapted to be executed by a processor of a computer, said instructions when executed by said processor conducting a process which generates a map that displays a set of geologic characteristics representative of the geologic characteristics of a time slice through a cube in an earth formation, a boundary enclosing a plurality of seismic data samples, said process comprising the steps of:

(a) assigning a variance value to each seismic data sample enclosed by said boundary, and (b) assigning a color to each variance value that is assigned to each seismic data sample.

31. The program storage device of claim 30, wherein the assigning step (a) comprises the steps of:

calculating each said variance value by determining an amplitude for each seismic data sample in a cell disposed within said boundary, determining an average seismic data sample amplitude of the seismic data samples in the cell, subtracting the average seismic data sample amplitude from the amplitudes of the seismic data samples in the cell to produce a plurality of differences, summing the squares of the plurality of differences to produce a first value, summing the squares of a plurality of the amplitudes of the seismic data samples in the cell to produce a second value, dividing the first value by the second value to produce a quotient, and operating the quotient against a weighting function to produce each said variance value.

* * * * *